US012579234B2

(12) United States Patent
Watterson et al.

(10) Patent No.: US 12,579,234 B2
(45) Date of Patent: Mar. 17, 2026

(54) CONTROLLING ACCESS TO A STATIONARY EXERCISE MACHINE

(71) Applicant: iFIT Inc., Logan, UT (US)

(72) Inventors: Blake Watterson, Logan, UT (US); Mark D. Watterson, Logan, UT (US)

(73) Assignee: iFIT, Inc., Logan, UT (US)

( * ) Notice: Subject to any disclaimer, the term of this patent is extended or adjusted under 35 U.S.C. 154(b) by 94 days.

(21) Appl. No.: 17/730,081

(22) Filed: Apr. 26, 2022

(65) Prior Publication Data

US 2022/0342969 A1 Oct. 27, 2022

Related U.S. Application Data

(60) Provisional application No. 63/211,870, filed on Jun. 17, 2021, provisional application No. 63/182,452, (Continued)

(51) Int. Cl.
*G06F 21/32* (2013.01)
*A63B 22/02* (2006.01)
(Continued)

(52) U.S. Cl.
CPC .............. *G06F 21/32* (2013.01); *A63B 22/02* (2013.01); *A63B 24/0087* (2013.01);
(Continued)

(58) Field of Classification Search
CPC ........ A63B 2230/015; A63B 2230/062; A63B 2225/20; A63B 2225/50; A63B 24/0087;
(Continued)

(56) References Cited

U.S. PATENT DOCUMENTS

| | | |
|---|---|---|
| 3,123,646 A | 3/1964 | Easton |
| 3,579,339 A | 5/1971 | Chang et al. |

(Continued)

FOREIGN PATENT DOCUMENTS

| | | |
|---|---|---|
| CA | 3127656 | 8/2020 |
| CN | 110227233 | 9/2019 |
| WO | WO2020/176235 | 9/2020 |

OTHER PUBLICATIONS

How-To Geek article Security Questions Are Insecure: How to Protect Your Accounts by Chris Hoffman (https://www.howtogeek.com/185354/security-questions-are-insecure-how-to-protect-your-accounts/) published Mar. 28, 2014 (Year: 2014).*

(Continued)

*Primary Examiner* — Megan Anderson
*Assistant Examiner* — Jonathan A Dicuia
(74) *Attorney, Agent, or Firm* — Holland & Hart LLP

(57) ABSTRACT

In one aspect of the disclosure, a method may include establishing one or more authorized users of a stationary exercise machine having one or more moveable members, automatically locking the one or more moveable members of the stationary exercise machine, and receiving a request to perform a workout on the stationary exercise machine. In response to the receiving of the request to perform the workout on the stationary exercise machine, the method may include automatically determining whether any of the one or more authorized users is proximate to the stationary exercise machine. In response to automatically determining that one of the one or more authorized users is proximate to the stationary exercise machine, the method may include automatically unlocking the one or more moveable members of the stationary exercise machine to enable the workout to be performed on the stationary exercise machine.

33 Claims, 35 Drawing Sheets

Related U.S. Application Data filed on Apr. 30, 2021, provisional application No. 63/180,521, filed on Apr. 27, 2021.

(51) Int. Cl.

| | | |
|---|---|---|
| *A63B 24/00* | (2006.01) | |
| *A63B 71/06* | (2006.01) | |
| *G06F 21/31* | (2013.01) | |

(52) U.S. Cl.

CPC .......... *A63B 71/0619* (2013.01); *G06F 21/31* (2013.01); *A63B 2225/20* (2013.01); *A63B 2225/50* (2013.01); *A63B 2225/72* (2013.01); *A63B 2230/015* (2013.01); *A63B 2230/062* (2013.01)

(58) Field of Classification Search

CPC . A63B 22/02; A63B 225/72; A63B 2230/067; G06F 21/32; G06F 21/31; H04M 2203/60

USPC .......................................................... 482/4

See application file for complete search history.

(56) References Cited

U.S. PATENT DOCUMENTS

| | | |
|---|---|---|
| 4,023,795 A | 5/1977 | Pauls |
| 4,300,760 A | 11/1981 | Bobroff |
| D286,311 S | 10/1986 | Martinell et al. |
| 4,681,318 A | 7/1987 | Lay |
| 4,684,126 A | 8/1987 | Dalebout et al. |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,844,451 A | 7/1989 | Bersonnet et al. |
| 4,850,585 A | 7/1989 | Dalebout |
| D304,849 S | 11/1989 | Watterson |
| 4,880,225 A | 11/1989 | Lucas et al. |
| 4,883,272 A | 11/1989 | Lay |
| D306,468 S | 3/1990 | Watterson |
| D306,891 S | 3/1990 | Watterson |
| 4,913,396 A | 4/1990 | Dalebout et al. |
| D307,614 S | 5/1990 | Bingham et al. |
| D307,615 S | 5/1990 | Bingham et al. |
| 4,921,242 A | 5/1990 | Watterson |
| 4,932,650 A | 6/1990 | Bingham et al. |
| D309,167 S | 7/1990 | Griffin |
| D309,485 S | 7/1990 | Bingham et al. |
| 4,938,478 A | 7/1990 | Lay |
| D310,253 S | 8/1990 | Bersonnet et al. |
| 4,955,599 A | 9/1990 | Bersonnet et al. |
| 4,971,316 A | 11/1990 | Dalebout et al. |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout et al. |
| D315,765 S | 3/1991 | Measom et al. |
| 4,998,725 A | 3/1991 | Watterson et al. |
| 5,000,442 A | 3/1991 | Dalebout et al. |
| 5,000,443 A | 3/1991 | Dalebout et al. |
| 5,000,444 A | 3/1991 | Dalebout et al. |
| D316,124 S | 4/1991 | Dalebout et al. |
| 5,013,033 A | 5/1991 | Watterson et al. |
| 5,014,980 A | 5/1991 | Bersonnet et al. |
| 5,016,871 A | 5/1991 | Dalebout et al. |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,034,576 A | 7/1991 | Dalebout et al. |
| 5,058,881 A | 10/1991 | Measom |
| 5,058,882 A | 10/1991 | Dalebout et al. |
| D321,388 S | 11/1991 | Dalebout |
| 5,062,626 A | 11/1991 | Dalebout et al. |
| 5,062,627 A | 11/1991 | Bingham |
| 5,062,632 A | 11/1991 | Dalebout et al. |
| 5,062,633 A | 11/1991 | Engel et al. |
| 5,067,710 A | 11/1991 | Watterson et al. |
| 5,072,929 A | 12/1991 | Peterson et al. |
| D323,009 S | 1/1992 | Dalebout et al. |
| D323,198 S | 1/1992 | Dalebout et al. |
| D323,199 S | 1/1992 | Dalebout et al. |
| D323,863 S | 2/1992 | Watterson |
| 5,088,729 A | 2/1992 | Dalebout |
| 5,090,694 A | 2/1992 | Pauls et al. |
| 5,102,380 A | 4/1992 | Jacobson et al. |
| 5,104,120 A | 4/1992 | Watterson et al. |
| 5,108,093 A | 4/1992 | Watterson |
| D326,491 S | 5/1992 | Dalebout |
| 5,122,105 A | 6/1992 | Engel et al. |
| 5,135,216 A | 8/1992 | Bingham et al. |
| 5,147,265 A | 9/1992 | Pauls et al. |
| 5,149,084 A | 9/1992 | Dalebout et al. |
| 5,149,312 A | 9/1992 | Croft et al. |
| 5,171,196 A | 12/1992 | Lynch |
| D332,347 S | 1/1993 | Raadt et al. |
| 5,190,505 A | 3/1993 | Dalebout et al. |
| 5,192,255 A | 3/1993 | Dalebout et al. |
| 5,195,937 A | 3/1993 | Engel et al. |
| 5,203,826 A | 4/1993 | Dalebout |
| D335,511 S | 5/1993 | Engel et al. |
| D335,905 S | 5/1993 | Cutter et al. |
| D336,498 S | 6/1993 | Engel et al. |
| 5,217,487 A | 6/1993 | Engel et al. |
| D337,361 S | 7/1993 | Engel et al. |
| D337,666 S | 7/1993 | Peterson et al. |
| D337,799 S | 7/1993 | Cutter et al. |
| 5,226,866 A | 7/1993 | Engel et al. |
| 5,244,446 A | 9/1993 | Engel et al. |
| 5,247,853 A | 9/1993 | Dalebout |
| 5,259,611 A | 11/1993 | Dalebout et al. |
| D342,106 S | 12/1993 | Campbell et al. |
| 5,279,528 A | 1/1994 | Dalebout et al. |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis et al. |
| 5,302,161 A | 4/1994 | Loubert et al. |
| D347,251 S | 5/1994 | Dreibelbis et al. |
| 5,316,534 A | 5/1994 | Dalebout et al. |
| D348,493 S | 7/1994 | Ashby |
| D348,494 S | 7/1994 | Ashby |
| 5,328,164 A | 7/1994 | Soga |
| D349,931 S | 8/1994 | Bostic et al. |
| 5,336,142 A | 8/1994 | Dalebout et al. |
| 5,344,376 A | 9/1994 | Bostic et al. |
| D351,202 S | 10/1994 | Bingham |
| D351,435 S | 10/1994 | Peterson et al. |
| D351,633 S | 10/1994 | Bingham |
| D352,534 S | 11/1994 | Dreibelbis et al. |
| D353,422 S | 12/1994 | Bostic et al. |
| 5,372,559 A | 12/1994 | Dalebout et al. |
| 5,374,228 A | 12/1994 | Buisman et al. |
| 5,382,221 A | 1/1995 | Hsu et al. |
| 5,387,168 A | 2/1995 | Bostic |
| 5,393,690 A | 2/1995 | Fu et al. |
| D356,128 S | 3/1995 | Smith et al. |
| 5,409,435 A | 4/1995 | Daniels |
| 5,429,563 A | 7/1995 | Engel et al. |
| 5,431,612 A | 7/1995 | Holden |
| D360,915 S | 8/1995 | Bostic et al. |
| 5,468,205 A | 11/1995 | Mcfall et al. |
| 5,489,249 A | 2/1996 | Brewer et al. |
| 5,492,517 A | 2/1996 | Bostic et al. |
| D367,689 S | 3/1996 | Wilkinson et al. |
| 5,511,740 A | 4/1996 | Loubert et al. |
| 5,512,025 A | 4/1996 | Dalebout et al. |
| D370,949 S | 6/1996 | Furner |
| D371,176 S | 6/1996 | Furner |
| 5,527,245 A | 6/1996 | Dalebout et al. |
| 5,529,553 A | 6/1996 | Finlayson |
| 5,540,429 A | 7/1996 | Dalebout et al. |
| 5,549,533 A | 8/1996 | Olson et al. |
| 5,554,085 A | 9/1996 | Dalebout |

(56) References Cited

U.S. PATENT DOCUMENTS

| | | | |
|---|---|---|---|
| 5,569,128 A | 10/1996 | Dalebout |
| 5,591,105 A | 1/1997 | Dalebout et al. |
| 5,591,106 A | 1/1997 | Dalebout et al. |
| 5,595,556 A | 1/1997 | Dalebout et al. |
| 5,607,375 A | 3/1997 | Dalebout et al. |
| 5,611,539 A | 3/1997 | Watterson et al. |
| 5,622,527 A | 4/1997 | Watterson et al. |
| 5,626,538 A | 5/1997 | Dalebout et al. |
| 5,626,542 A | 5/1997 | Dalebout et al. |
| D380,024 S | 6/1997 | Novak et al. |
| 5,637,059 A | 6/1997 | Dalebout |
| D380,509 S | 7/1997 | Wilkinson et al. |
| 5,643,153 A | 7/1997 | Nylen et al. |
| 5,645,509 A | 7/1997 | Brewer et al. |
| D384,118 S | 9/1997 | Deblauw |
| 5,662,557 A | 9/1997 | Watterson et al. |
| 5,669,857 A | 9/1997 | Watterson et al. |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,683,331 A | 11/1997 | Dalebout |
| 5,683,332 A | 11/1997 | Watterson et al. |
| D387,825 S | 12/1997 | Fleck et al. |
| 5,695,433 A | 12/1997 | Buisman |
| 5,695,434 A | 12/1997 | Dalebout et al. |
| 5,695,435 A | 12/1997 | Dalebout et al. |
| 5,702,325 A | 12/1997 | Watterson et al. |
| 5,704,879 A | 1/1998 | Watterson et al. |
| 5,718,657 A | 2/1998 | Dalebout et al. |
| 5,720,200 A | 2/1998 | Anderson et al. |
| 5,720,698 A | 2/1998 | Dalebout et al. |
| D392,006 S | 3/1998 | Dalebout et al. |
| 5,722,922 A | 3/1998 | Watterson et al. |
| 5,733,229 A | 3/1998 | Dalebout et al. |
| 5,743,833 A | 4/1998 | Watterson et al. |
| 5,762,584 A | 6/1998 | Daniels |
| 5,762,587 A | 6/1998 | Dalebout et al. |
| 5,772,560 A | 6/1998 | Watterson et al. |
| 5,810,698 A | 9/1998 | Hullett et al. |
| 5,827,155 A | 10/1998 | Jensen et al. |
| 5,830,114 A | 11/1998 | Halfen et al. |
| 5,860,893 A | 1/1999 | Watterson et al. |
| 5,860,894 A | 1/1999 | Dalebout et al. |
| 5,899,834 A | 5/1999 | Dalebout et al. |
| D412,953 S | 8/1999 | Armstrong |
| D413,948 S | 9/1999 | Dalebout |
| 5,951,441 A | 9/1999 | Dalebout et al. |
| 5,951,448 A | 9/1999 | Bolland |
| D416,596 S | 11/1999 | Armstrong |
| 6,003,166 A | 12/1999 | Hald et al. |
| 6,019,710 A | 2/2000 | Dalebout et al. |
| 6,027,429 A | 2/2000 | Daniels |
| 6,033,347 A | 3/2000 | Dalebout et al. |
| D425,940 S | 5/2000 | Halfen et al. |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout et al. |
| 6,193,631 B1 | 2/2001 | Hickman |
| 6,228,003 B1 | 5/2001 | Hald et al. |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout et al. |
| 6,312,363 B1 | 11/2001 | Watterson et al. |
| D452,338 S | 12/2001 | Dalebout et al. |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris et al. |
| 6,422,980 B1 | 7/2002 | Simonson |
| 6,447,424 B1 | 9/2002 | Ashby et al. |
| 6,458,060 B1 | 10/2002 | Watterson et al. |
| 6,458,061 B2 | 10/2002 | Simonson |
| 6,471,622 B1 | 10/2002 | Hammer et al. |
| 6,563,225 B2 | 5/2003 | Soga et al. |
| 6,601,016 B1 | 7/2003 | Brown et al. |
| 6,623,140 B2 | 9/2003 | Watterson et al. |
| 6,626,799 B2 | 9/2003 | Watterson |
| 6,652,424 B2 | 11/2003 | Dalebout |
| 6,685,607 B1 | 2/2004 | Olson |
| 6,695,581 B2 | 2/2004 | Wasson et al. |
| 6,701,271 B2 | 3/2004 | Willner et al. |
| 6,702,719 B1 | 3/2004 | Brown et al. |
| 6,712,740 B2 | 3/2004 | Simonson |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson et al. |
| 6,808,472 B1 | 10/2004 | Hickman |
| 6,821,230 B2 | 11/2004 | Dalebout et al. |
| 6,830,540 B2 | 12/2004 | Watterson et al. |
| 6,863,641 B1 | 3/2005 | Brown et al. |
| 6,866,613 B1 | 3/2005 | Brown et al. |
| 6,875,160 B2 | 4/2005 | Watterson et al. |
| D507,311 S | 7/2005 | Butler et al. |
| 6,918,858 B2 | 7/2005 | Watterson |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout et al. |
| D520,085 S | 5/2006 | Willardson et al. |
| 7,044,897 B2 | 5/2006 | Myers et al. |
| 7,052,442 B2 | 5/2006 | Watterson et al. |
| 7,060,006 B1 | 6/2006 | Watterson et al. |
| 7,060,008 B2 | 6/2006 | Watterson et al. |
| 7,070,539 B2 | 7/2006 | Brown et al. |
| 7,097,588 B2 | 8/2006 | Watterson et al. |
| D527,776 S | 9/2006 | Willardson et al. |
| 7,112,168 B2 | 9/2006 | Dalebout et al. |
| 7,128,693 B2 | 10/2006 | Brown et al. |
| 7,166,062 B1 | 1/2007 | Watterson et al. |
| 7,166,064 B2 | 1/2007 | Watterson et al. |
| 7,169,087 B2 | 1/2007 | Ercanbrack et al. |
| 7,169,093 B2 | 1/2007 | Simonson et al. |
| 7,192,388 B2 | 3/2007 | Dalebout et al. |
| 7,250,022 B2 | 7/2007 | Dalebout et al. |
| 7,282,016 B2 | 10/2007 | Simonson |
| 7,285,075 B2 | 10/2007 | Cutler et al. |
| 7,344,481 B2 | 3/2008 | Watterson et al. |
| 7,377,882 B2 | 5/2008 | Watterson et al. |
| 7,425,188 B2 | 9/2008 | Ercanbrack et al. |
| 7,429,236 B2 | 9/2008 | Dalebout et al. |
| 7,455,622 B2 | 11/2008 | Watterson et al. |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout et al. |
| 7,540,828 B2 | 6/2009 | Watterson et al. |
| 7,549,947 B2 | 6/2009 | Hickman et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,601,105 B1 | 10/2009 | Gipson et al. |
| 7,604,573 B2 | 10/2009 | Dalebout et al. |
| D604,373 S | 11/2009 | Dalebout et al. |
| 7,618,350 B2 | 11/2009 | Dalebout et al. |
| 7,618,357 B2 | 11/2009 | Dalebout et al. |
| 7,625,315 B2 | 12/2009 | Hickman |
| 7,625,321 B2 | 12/2009 | Simonson et al. |
| 7,628,730 B1 | 12/2009 | Watterson et al. |
| 7,628,737 B2 | 12/2009 | Kowallis et al. |
| 7,637,847 B1 | 12/2009 | Hickman |

(56) References Cited

U.S. PATENT DOCUMENTS

| | | | |
|---|---|---|---|
| 7,645,212 | B2 | 1/2010 | Ashby et al. |
| 7,645,213 | B2 | 1/2010 | Watterson et al. |
| 7,658,698 | B2 | 2/2010 | Pacheco et al. |
| 7,674,205 | B2 | 3/2010 | Dalebout et al. |
| 7,713,171 | B1 | 5/2010 | Hickman |
| 7,713,172 | B2 | 5/2010 | Watterson et al. |
| 7,713,180 | B2 | 5/2010 | Wickens et al. |
| 7,717,828 | B2 | 5/2010 | Simonson et al. |
| 7,736,279 | B2 | 6/2010 | Dalebout et al. |
| 7,740,563 | B2 | 6/2010 | Dalebout et al. |
| 7,749,144 | B2 | 7/2010 | Hammer |
| 7,766,797 | B2 | 8/2010 | Dalebout et al. |
| 7,771,329 | B2 | 8/2010 | Dalebout |
| 7,775,940 | B2 | 8/2010 | Dalebout et al. |
| 7,789,800 | B1 | 9/2010 | Watterson et al. |
| 7,798,946 | B2 | 9/2010 | Dalebout et al. |
| 7,815,550 | B2 | 10/2010 | Watterson et al. |
| 7,857,731 | B2 | 12/2010 | Hickman et al. |
| 7,862,475 | B2 | 1/2011 | Watterson et al. |
| 7,862,478 | B2 | 1/2011 | Watterson et al. |
| 7,862,483 | B2 | 1/2011 | Hendrickson et al. |
| D635,207 | S | 3/2011 | Dalebout et al. |
| 7,901,330 | B2 | 3/2011 | Dalebout et al. |
| 7,909,740 | B2 | 3/2011 | Dalebout et al. |
| 7,980,996 | B2 | 7/2011 | Hickman |
| 7,981,000 | B2 | 7/2011 | Watterson et al. |
| 7,985,164 | B2 | 7/2011 | Ashby |
| 8,029,415 | B2 | 10/2011 | Ashby et al. |
| 8,033,960 | B1 | 10/2011 | Dalebout et al. |
| D650,451 | S | 12/2011 | Olson et al. |
| D652,877 | S | 1/2012 | Dalebout et al. |
| 8,152,702 | B2 | 4/2012 | Pacheco |
| D659,775 | S | 5/2012 | Olson et al. |
| D659,777 | S | 5/2012 | Watterson et al. |
| D660,383 | S | 5/2012 | Watterson et al. |
| D664,613 | S | 7/2012 | Dalebout et al. |
| 8,251,874 | B2 | 8/2012 | Ashby et al. |
| 8,298,123 | B2 | 10/2012 | Hickman |
| 8,298,125 | B2 | 10/2012 | Colledge et al. |
| D671,177 | S | 11/2012 | Sip |
| D671,178 | S | 11/2012 | Sip |
| D673,626 | S | 1/2013 | Olson et al. |
| 8,690,735 | B2 | 4/2014 | Watterson et al. |
| D707,763 | S | 6/2014 | Cutler |
| 8,740,753 | B2 | 6/2014 | Olson et al. |
| 8,758,201 | B2 | 6/2014 | Ashby et al. |
| 8,771,153 | B2 | 7/2014 | Dalebout et al. |
| 8,784,270 | B2 | 7/2014 | Ashby et al. |
| 8,808,148 | B2 | 8/2014 | Watterson et al. |
| 8,814,762 | B2 | 8/2014 | Butler et al. |
| D712,493 | S | 9/2014 | Ercanbrack et al. |
| 8,840,075 | B2 | 9/2014 | Dalebout et al. |
| 8,845,493 | B2 | 9/2014 | Watterson et al. |
| 8,870,726 | B2 | 10/2014 | Watterson et al. |
| 8,876,668 | B2 | 11/2014 | Hendrickson et al. |
| 8,894,549 | B2 | 11/2014 | Colledge |
| 8,894,555 | B2 | 11/2014 | Colledge et al. |
| 8,911,330 | B2 | 12/2014 | Watterson et al. |
| 8,920,288 | B2 | 12/2014 | Dalebout et al. |
| 8,986,165 | B2 | 3/2015 | Ashby |
| 8,992,364 | B2 | 3/2015 | Law et al. |
| 8,992,387 | B2 | 3/2015 | Watterson et al. |
| D726,476 | S | 4/2015 | Ercanbrack |
| 9,028,368 | B2 | 5/2015 | Ashby et al. |
| 9,028,370 | B2 | 5/2015 | Watterson et al. |
| 9,039,578 | B2 | 5/2015 | Dalebout |
| D731,011 | S | 6/2015 | Buchanan |
| 9,072,930 | B2 | 7/2015 | Ashby et al. |
| 9,119,983 | B2 | 9/2015 | Rhea |
| 9,123,317 | B2 | 9/2015 | Watterson et al. |
| 9,126,071 | B2 | 9/2015 | Smith |
| 9,126,072 | B2 | 9/2015 | Watterson |
| 9,138,615 | B2 | 9/2015 | Olson et al. |
| 9,142,139 | B2 | 9/2015 | Watterson et al. |
| 9,144,703 | B2 | 9/2015 | Dalebout et al. |
| 9,149,683 | B2 | 10/2015 | Watterson et al. |
| 9,186,535 | B2 | 11/2015 | Ercanbrack |
| 9,186,549 | B2 | 11/2015 | Watterson et al. |
| 9,254,409 | B2 | 2/2016 | Dalebout et al. |
| 9,254,416 | B2 | 2/2016 | Ashby |
| 9,278,248 | B2 | 3/2016 | Tyger et al. |
| 9,278,249 | B2 | 3/2016 | Watterson |
| 9,278,250 | B2 | 3/2016 | Buchanan |
| 9,289,648 | B2 | 3/2016 | Watterson |
| 9,339,691 | B2 | 5/2016 | Brammer |
| 9,352,185 | B2 | 5/2016 | Hendrickson et al. |
| 9,352,186 | B2 | 5/2016 | Watterson |
| 9,375,605 | B2 | 6/2016 | Tyger et al. |
| 9,381,394 | B2 | 7/2016 | Mortensen et al. |
| 9,387,387 | B2 | 7/2016 | Dalebout |
| 9,393,453 | B2 | 7/2016 | Watterson |
| 9,403,047 | B2 | 8/2016 | Olson et al. |
| 9,403,051 | B2 | 8/2016 | Cutler |
| 9,421,416 | B2 | 8/2016 | Mortensen et al. |
| 9,457,219 | B2 | 10/2016 | Smith |
| 9,457,220 | B2 | 10/2016 | Olson |
| 9,457,222 | B2 | 10/2016 | Dalebout |
| 9,460,632 | B2 | 10/2016 | Watterson |
| 9,463,356 | B2 | 10/2016 | Rhea |
| 9,468,794 | B2 | 10/2016 | Barton |
| 9,468,798 | B2 | 10/2016 | Dalebout |
| 9,480,874 | B2 | 11/2016 | Cutler |
| 9,492,704 | B2 | 11/2016 | Mortensen et al. |
| 9,498,668 | B2 | 11/2016 | Smith |
| 9,517,378 | B2 | 12/2016 | Ashby et al. |
| 9,521,901 | B2 | 12/2016 | Dalebout |
| 9,533,187 | B2 | 1/2017 | Dalebout |
| 9,539,461 | B2 | 1/2017 | Ercanbrack |
| 9,579,544 | B2 | 2/2017 | Watterson |
| 9,586,086 | B2 | 3/2017 | Dalebout et al. |
| 9,586,090 | B2 | 3/2017 | Watterson et al. |
| 9,604,099 | B2 | 3/2017 | Taylor |
| 9,616,276 | B2 | 4/2017 | Dalebout et al. |
| 9,616,278 | B2 | 4/2017 | Olson |
| 9,623,281 | B2 | 4/2017 | Hendrickson et al. |
| 9,636,567 | B2 | 5/2017 | Brammer et al. |
| 9,675,839 | B2 | 6/2017 | Dalebout et al. |
| 9,682,307 | B2 | 6/2017 | Dalebout |
| 9,694,242 | B2 | 7/2017 | Ashby et al. |
| 9,737,755 | B2 | 8/2017 | Dalebout |
| 9,757,605 | B2 | 9/2017 | Olson et al. |
| 9,764,186 | B2 | 9/2017 | Dalebout et al. |
| 9,767,785 | B2 | 9/2017 | Ashby et al. |
| 9,795,822 | B2 | 10/2017 | Smith et al. |
| 9,808,672 | B2 | 11/2017 | Dalebout |
| 9,844,699 | B2 | 12/2017 | Volerink et al. |
| 9,849,326 | B2 | 12/2017 | Smith |
| 9,878,210 | B2 | 1/2018 | Watterson |
| 9,889,334 | B2 | 2/2018 | Ashby et al. |
| 9,889,339 | B2 | 2/2018 | Douglass |
| 9,937,376 | B2 | 4/2018 | Mcinelly et al. |
| 9,937,377 | B2 | 4/2018 | Mcinelly et al. |
| 9,937,378 | B2 | 4/2018 | Dalebout et al. |
| 9,937,379 | B2 | 4/2018 | Mortensen et al. |
| 9,943,719 | B2 | 4/2018 | Smith et al. |
| 9,943,722 | B2 | 4/2018 | Dalebout |
| 9,948,037 | B2 | 4/2018 | Ashby |
| 9,968,816 | B2 | 5/2018 | Olson et al. |
| 9,968,821 | B2 | 5/2018 | Finlayson et al. |
| 9,968,823 | B2 | 5/2018 | Cutler |
| 10,010,755 | B2 | 7/2018 | Watterson |
| 10,010,756 | B2 | 7/2018 | Watterson |
| 10,029,145 | B2 | 7/2018 | Douglass |
| D826,350 | S | 8/2018 | Hochstrasser |
| 10,046,196 | B2 | 8/2018 | Ercanbrack et al. |
| D827,733 | S | 9/2018 | Hochstrasser |
| 10,065,064 | B2 | 9/2018 | Smith et al. |
| 10,071,285 | B2 | 9/2018 | Smith et al. |
| 10,085,586 | B2 | 10/2018 | Smith et al. |
| 10,086,254 | B2 | 10/2018 | Watterson |
| 10,136,842 | B2 | 11/2018 | Ashby |
| 10,186,161 | B2 | 1/2019 | Watterson |
| 10,188,890 | B2 | 1/2019 | Olson et al. |
| 10,207,143 | B2 | 2/2019 | Dalebout et al. |

(56)                References Cited

U.S. PATENT DOCUMENTS

| | | | |
|---|---|---|---|
| 10,207,145 | B2 | 2/2019 | Tyger et al. |
| 10,207,147 | B2 | 2/2019 | Ercanbrack et al. |
| 10,207,148 | B2 | 2/2019 | Powell et al. |
| 10,212,994 | B2 | 2/2019 | Watterson et al. |
| 10,220,259 | B2 | 3/2019 | Brammer |
| 10,226,396 | B2 | 3/2019 | Ashby |
| 10,226,664 | B2 | 3/2019 | Dalebout et al. |
| 10,252,109 | B2 | 4/2019 | Watterson |
| 10,258,828 | B2 | 4/2019 | Dalebout et al. |
| 10,272,317 | B2 | 4/2019 | Watterson |
| 10,279,212 | B2 | 5/2019 | Dalebout et al. |
| 10,293,211 | B2 | 5/2019 | Watterson et al. |
| D852,292 | S | 6/2019 | Cutler |
| 10,343,017 | B2 | 7/2019 | Jackson |
| 10,376,736 | B2 | 8/2019 | Powell et al. |
| 10,388,183 | B2 | 8/2019 | Watterson |
| 10,391,361 | B2 | 8/2019 | Watterson |
| D864,320 | S | 10/2019 | Weston |
| D864,321 | S | 10/2019 | Weston |
| 10,426,989 | B2 | 10/2019 | Dalebout |
| 10,433,612 | B2 | 10/2019 | Ashby et al. |
| 10,441,840 | B2 | 10/2019 | Dalebout |
| 10,441,844 | B2 | 10/2019 | Powell |
| 10,449,416 | B2 | 10/2019 | Dalebout et al. |
| 10,471,299 | B2 | 11/2019 | Powell |
| D868,909 | S | 12/2019 | Cutler et al. |
| 10,492,519 | B2 | 12/2019 | Capell et al. |
| 10,493,349 | B2 | 12/2019 | Watterson |
| 10,500,473 | B2 | 12/2019 | Watterson |
| 10,537,764 | B2 | 1/2020 | Smith et al. |
| 10,543,395 | B2 | 1/2020 | Powell et al. |
| 10,561,877 | B2 | 2/2020 | Workman |
| 10,561,893 | B2 | 2/2020 | Chatterton et al. |
| 10,561,894 | B2 | 2/2020 | Dalebout et al. |
| 10,569,121 | B2 | 2/2020 | Watterson |
| 10,569,123 | B2 | 2/2020 | Hochstrasser et al. |
| 10,625,114 | B2 | 4/2020 | Ercanbrack |
| 10,625,137 | B2 | 4/2020 | Dalebout et al. |
| 10,661,114 | B2 | 5/2020 | Watterson et al. |
| 10,668,320 | B2 | 6/2020 | Watterson |
| 10,671,705 | B2 | 6/2020 | Capell et al. |
| 10,688,346 | B2 | 6/2020 | Brammer |
| 10,702,736 | B2 | 7/2020 | Weston et al. |
| 10,709,925 | B2 | 7/2020 | Dalebout et al. |
| 10,726,730 | B2 | 7/2020 | Watterson |
| 10,729,965 | B2 | 8/2020 | Powell |
| 10,758,767 | B2 | 9/2020 | Olson et al. |
| 10,786,706 | B2 | 9/2020 | Smith |
| 10,864,407 | B2 | 12/2020 | Watterson et al. |
| 10,918,905 | B2 | 2/2021 | Powell et al. |
| 10,932,517 | B2 | 3/2021 | Ashby et al. |
| 10,940,360 | B2 | 3/2021 | Dalebout et al. |
| 10,953,268 | B1 | 3/2021 | Dalebout et al. |
| 10,953,305 | B2 | 3/2021 | Dalebout et al. |
| 10,967,214 | B1 | 4/2021 | Olson et al. |
| 10,994,173 | B2 | 5/2021 | Watterson |
| 11,000,730 | B2 | 5/2021 | Dalebout et al. |
| 11,013,960 | B2 | 5/2021 | Watterson et al. |
| 11,033,777 | B1 | 6/2021 | Watterson et al. |
| 11,058,913 | B2 | 7/2021 | Dalebout et al. |
| 11,058,914 | B2 | 7/2021 | Powell |
| 11,058,918 | B1 | 7/2021 | Watterson et al. |
| 11,130,022 | B1 * | 9/2021 | LoDuca ............. A63B 21/4029 |
| 11,187,285 | B2 | 11/2021 | Wrobel |
| 2002/0082142 | A1 * | 6/2002 | Cannon .............. A63B 71/0697 |
| | | | 482/1 |
| 2015/0231447 | A1 * | 8/2015 | Hsu ........................ G16H 20/40 |
| | | | 482/4 |
| 2016/0058335 | A1 | 3/2016 | Ashby |
| 2016/0346595 | A1 | 12/2016 | Dalebout et al. |
| 2017/0144025 | A1 * | 5/2017 | Abbondanza ...... A63B 24/0087 |
| 2018/0056131 | A1 * | 3/2018 | Nakazawa ........... A61B 5/1118 |
| 2018/0178059 | A1 * | 6/2018 | Kim .................. A63B 24/0006 |
| 2019/0143191 | A1 | 5/2019 | Ran et al. |
| 2020/0179789 | A1 * | 6/2020 | Fima .................. A63B 24/0087 |
| 2020/0398112 | A1 * | 12/2020 | Lu ........................ A61B 5/7275 |
| 2021/0138299 | A1 * | 5/2021 | Li ...................... A63B 24/0087 |
| 2021/0322820 | A1 * | 10/2021 | Burke ............... A63B 24/0087 |
| 2022/0212060 | A1 * | 7/2022 | Davis ................ A63B 24/0087 |

OTHER PUBLICATIONS

How to geek article from Jun. 8, 2017: the Different Forms of Two-Factor Authentication: SMS, Autheticator Apps, and More by Chris Hoffman. https://www.howtogeek.com/232598/5-different-two-step-authentication-methods-to-secure-your-online-accounts/ (Year: 2017).*

Identity automation blog post from 0/May 30, 2018: Two-Factor authentication (2FA) explained: Biometric Authentication by Kathleen Garska. https://blog.identityautomation.com/mfa-face-off-series-biometric-authentication (Year: 2018).*

Swoop article Apr. 24, 2020 No author listed: Two-Factor Authentication: a definitive guide for websites. https://swoopnow.com/two-factor-authentication-guide/ (Year: 2020).*

International Search Report and Written Opinion for PCT/US2022/026404, mailed Sep. 2, 2022, 10 pages.

U.S. Appl. No. 63/316,890.

Office Action for Taiwanese Application No. 112143586, mailed Feb. 29, 2024, 7 pages.

* cited by examiner

CONTROLLING ACCESS TO A STATIONARY EXERCISE MACHINE

RELATED APPLICATIONS

This application claims the benefit of and priority to U.S. Provisional Patent Application No. 63/211,870, filed Jun. 17, 2021, and also claims the benefit of and priority to U.S. Provisional Patent Application No. 63/180,521, filed Apr. 27, 2021, and also claims the benefit of and priority to U.S. Provisional Patent Application No. 63/182,452, filed Apr. 30, 2021, each of which is incorporated herein by reference in its entirety for all that it discloses.

BACKGROUND

Stationary exercise machines have become an increasingly popular way to exercise. Although stationary exercise machines generally stay stationary during use, they often include moveable parts that automatically move, or that a user moves, during performance of a workout on the stationary exercise machines.

In some situation, it may be desirable to control who has access to a stationary exercise machine.

The subject matter claimed herein is not limited to embodiments that solve any disadvantages or that operate only in environments such as those described above. Rather, this background is only provided to illustrate one example technology area where some embodiments described herein may be practiced.

SUMMARY

In one aspect of the disclosure, a method for controlling access to a stationary exercise machine may include various actions. For example, the method may include establishing one or more authorized users of a stationary exercise machine having one or more moveable members. The method may also include automatically locking the one or more moveable members of the stationary exercise machine. The method may further include receiving a request to perform a workout on the stationary exercise machine. The method may also include, in response to the receiving of the request to perform the workout on the stationary exercise machine, automatically determining whether any of the one or more authorized users is proximate to the stationary exercise machine. The method may further include, in response to automatically determining that one of the one or more authorized users is proximate to the stationary exercise machine, automatically unlocking the one or more moveable members of the stationary exercise machine to enable the workout to be performed on the stationary exercise machine.

Another aspect of the disclosure may include any combination of the above-mentioned features and may further include that the automatically determining that one of the one or more authorized users is proximate to the stationary exercise machine includes automatically sending an electronic proximity confirmation request to one or more electronic addresses of the one or more authorized users, and automatically determining that one of the one or more authorized users is proximate to the stationary exercise machine if a positive electronic proximity confirmation response is received from any of the one or more electronic addresses.

Another aspect of the disclosure may include any combination of the above-mentioned features and may further include that the one or more electronic addresses of the one or more authorized users includes one or more cellular telephone numbers of the one or more authorized users, the electronic proximity confirmation request is included in a text message sent to the one or more cellular telephone numbers, and the positive electronic proximity confirmation response is included in a reply text message received from one of the one or more cellular telephone numbers.

Another aspect of the disclosure may include any combination of the above-mentioned features and may further include that the one or more electronic addresses of the one or more authorized users includes one or more email addresses of the one or more authorized users, the electronic proximity confirmation request is included in an email sent to the one or more email addresses, and the positive electronic proximity confirmation response is included in a replay email received from one of the one or more email addresses.

Another aspect of the disclosure may include any combination of the above-mentioned features and may further include that the automatically determining that one of the one or more authorized users is proximate to the stationary exercise machine includes automatically sending a confirmation hyperlink to the one or more authorized users, and automatically determining that one of the one or more authorized users is proximate to the stationary exercise machine if the confirmation hyperlink is selected.

Another aspect of the disclosure may include any combination of the above-mentioned features and may further include that the automatically determining that one of the one or more authorized users is proximate to the stationary exercise machine includes automatically sending an electronic proximity confirmation request to one or more apps of the one or more authorized users, and automatically determining that one of the one or more authorized users is proximate to the stationary exercise machine if a positive electronic proximity confirmation response is received from any of the one or more apps.

Another aspect of the disclosure may include any combination of the above-mentioned features and may further include that the automatically determining that one of the one or more authorized users is proximate to the stationary exercise machine includes, automatically sending a one-time-passcode to the one or more authorized users, and automatically determining that one of the one or more authorized users is proximate to the stationary exercise machine if the one-time-passcode is manually entered at the stationary exercise machine.

Another aspect of the disclosure may include any combination of the above-mentioned features and may further include that the automatically determining that one of the one or more authorized users is proximate to the stationary exercise machine includes automatically determined whether any of one or more wireless mobile devices of the one or more authorized users is paired with the stationary exercise machine over a wireless personal area network (WPAN), and automatically determining that one of the one or more authorized users is proximate to the stationary exercise machine if it is determined that any of the one or more wireless mobile devices of the one or more authorized users is paired with the stationary exercise machine over the WPAN.

Another aspect of the disclosure may include any combination of the above-mentioned features and may further include that the one or more wireless mobile devices of the one or more authorized users include one or more wireless mobile heart rate monitors of the one or more authorized users.

Another aspect of the disclosure may include any combination of the above-mentioned features and may further include that the automatically determining whether any of the one or more wireless mobile devices of the one or more authorized users is paired with the stationary exercise machine over the WPAN further includes automatically determining whether any of the one or more wireless mobile devices of the one or more authorized users that is paired with the stationary exercise machine is also in an unlocked state.

Another aspect of the disclosure may include any combination of the above-mentioned features and may further include that the one or more wireless mobile devices of the one or more authorized users include one or more smartphones of the one or more authorized users.

Another aspect of the disclosure may include any combination of the above-mentioned features and may further include that the automatically determining that one of the one or more authorized users is proximate to the stationary exercise machine includes automatically gathering, at the stationary exercise machine, biometric data of a user that is proximate to the stationary exercise machine, and automatically determining, at the stationary exercise machine, that the biometric data matches the one of the one or more authorized users.

Another aspect of the disclosure may include any combination of the above-mentioned features and may further include that the automatically gathering of the biometric data of the user that is proximate to the stationary exercise machine includes automatically gathering voice recognition data of the user that is proximate to the stationary exercise machine using a microphone that is proximate to the stationary exercise machine and that is in communication with the stationary exercise machine.

Another aspect of the disclosure may include any combination of the above-mentioned features and may further include that the automatically gathering of the biometric data of the user that is proximate to the stationary exercise machine includes automatically gathering facial recognition data or iris recognition data of the user that is proximate to the stationary exercise machine using a camera that is proximate to the stationary exercise machine and that is in communication with the stationary exercise machine.

Another aspect of the disclosure may include any combination of the above-mentioned features and may further include that the automatically gathering of the biometric data of the user that is proximate to the stationary exercise machine includes automatically gathering fingerprint data of the user that is proximate to the stationary exercise machine using a fingerprint scanner that is proximate to the stationary exercise machine and that is in communication with the stationary exercise machine.

Another aspect of the disclosure may include any combination of the above-mentioned features and may further include that the automatically gathering of the biometric data of the user that is proximate to the stationary exercise machine includes automatically gathering handprint data of the user that is proximate to the stationary exercise machine using a handprint scanner that is proximate to the stationary exercise machine and that is in communication with the stationary exercise machine.

Another aspect of the disclosure may include any combination of the above-mentioned features and may further include that the automatically gathering of the biometric data of the user that is proximate to the stationary exercise machine includes automatically gathering weight data of the user that is proximate to the stationary exercise machine using a scale that is proximate to the stationary exercise machine and that is in communication with the stationary exercise machine.

Another aspect of the disclosure may include any combination of the above-mentioned features and may further include that the automatically gathering of the biometric data of the user that is proximate to the stationary exercise machine includes automatically gathering height data of the user that is proximate to the stationary exercise machine using an camera that is proximate to the stationary exercise machine and that is in communication with the stationary exercise machine.

Another aspect of the disclosure may include any combination of the above-mentioned features and may further include that the automatically determining that one of the one or more authorized users is proximate to the stationary exercise machine includes automatically presenting, at the stationary exercise machine, an identity confirming challenge question, and automatically determining that one of the one or more authorized users is proximate to the stationary exercise machine if a correct response to the identity confirming challenge, corresponding to any of the one or more authorized users, is received.

Another aspect of the disclosure may include any combination of the above-mentioned features and may further include that the automatically determining that one of the one or more authorized users is proximate to the stationary exercise machine includes automatically determining that one of the one or more authorized users is proximate to the stationary exercise machine if a login credential corresponding to any of the one or more authorized users is entered at the stationary exercise machine.

Another aspect of the disclosure may include any combination of the above-mentioned features and may further include querying a user for an age verification input, receiving the age verification input on an input device, determining whether the user is above a threshold age based on the age verification input, and unlocking the stationary exercise machine if the user is above the threshold age.

In another aspect of the disclosure, a stationary exercise machine may include a console having a display and an input device. The stationary exercise machine may also include a movable portion and a lockout manager. The lockout manager may provide an age verification prompt on the display and receive an age verification input from the input device in response to the age verification prompt. An age determiner may determine if the age verification input is associated with a threshold age. If the age verification input is associated with the threshold age, the lockout manager may unlock the movable portion.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

Throughout the drawings, identical reference numbers designate similar, but not necessarily identical, elements.

DETAILED DESCRIPTION

Figure 1:
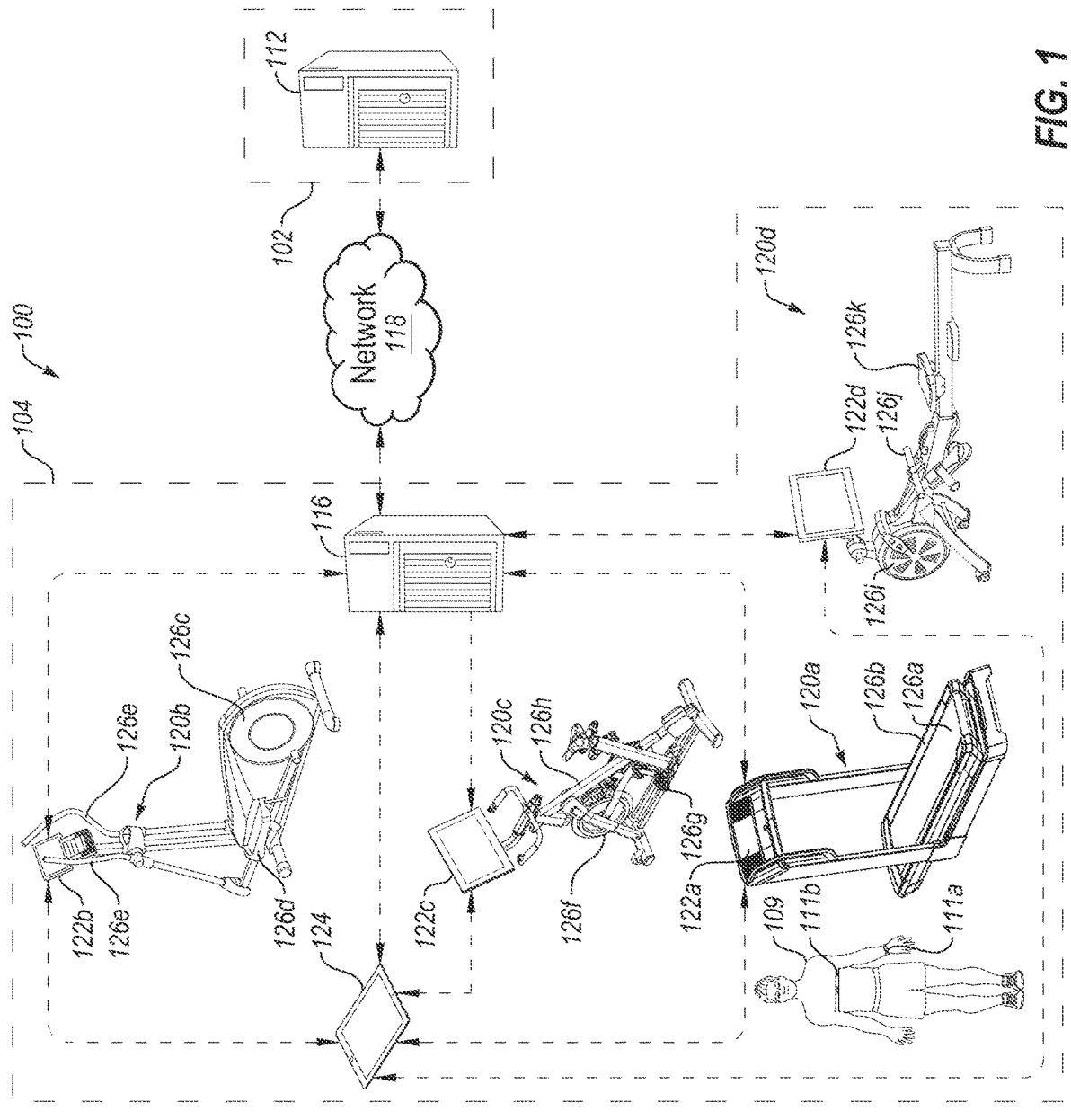
FIG. 1 illustrates an example exercise system for controlling access to a stationary exercise machine.

While conventional stationary exercise machines generally stay stationary during use, they often include moveable parts that automatically move, or that a user moves, during performance of a workout on the stationary exercise machines. In some situation, it may be desirable to control who has access to a stationary exercise machine. For example, when a stationary exercise machine is used in the home of a user, it may be desirable to only allow the user to access the stationary exercise machine, but prevent other occupants of the home or visitors to the home from operating the moving parts of the stationary exercise machine. In the case of a treadmill, for example, it may be desirable to only allow the user to cause the running belt of the treadmill to be rotated, but prevent children and/or pets who live in the home from intentionally or unintentionally causing the running belt of the treadmill to be rotated.

Some embodiments disclosed herein may include methods for controlling access to a stationary exercise machine. For example, a method may include establishing one or more authorized users of a stationary exercise machine having one or more moveable members. The method may also include automatically locking the one or more moveable members of the stationary exercise machine. The method may further include receiving a request to perform a workout on the stationary exercise machine. The method may also include, in response to the receiving of the request to perform the workout on the stationary exercise machine, automatically determining whether any of the one or more authorized users is proximate to the stationary exercise machine. The method may further include, in response to automatically determining that one of the one or more authorized users is proximate to the stationary exercise machine, automatically unlocking the one or more moveable members of the stationary exercise machine to enable the workout to be performed on the stationary exercise machine.

In this manner, by only allowing one or more authorized users in proximity to a stationary exercise machine to unlock the one or more movable members of the stationary exercise machine, embodiments disclosed herein can prevent unauthorized users in close proximity to the stationary exercise machine from causing the one or more movable members to automatically move or to be moved by the unauthorized user. For example, when a stationary exercise machine is used in the home of an authorized user, example embodiments disclosed herein may only allow the authorized user to access the stationary exercise machine, but prevent other occupants of the home or visitors to the home from operating the moving parts of the stationary exercise machine. In the case of a treadmill, for example, example embodiments disclosed herein only allow the authorized user to cause the running belt of the treadmill to be rotated, but prevent children and/or pets who live in the home from intentionally or unintentionally causing the running belt of the treadmill to be rotated.

Further, some embodiments generally relate to devices, systems, and methods for a child lock on a stationary exercise machine. When the stationary exercise machine senses that a user has mounted, or otherwise has attempted to begin using, the stationary exercise machine, the stationary exercise machine may prompt the user to verify his or her age. If the user verifies his or her age, the stationary exercise machine may be unlocked and the user may begin an exercise. If the user fails to verify his or her age, the stationary exercise machine may remain locked until the user is able to verify his or her age. This may help to prevent a child from playing on the stationary exercise machine.

In some embodiments, the age verification prompt may be any mechanism for age verification. For example, the age verification prompt may be a prompt for the user to enter his or her age. In some examples, the age verification prompt may be a prompt for the user to enter a password. In some examples, the age verification prompt may be a quiz, such as a knowledge-based and/or a logic-based quiz. In some embodiments, the age verification prompt may be a biometric prompt, such as a retinal scan, a voice analyzer, a fingerprint analyzer, any other biometric prompt, and combinations thereof. In some embodiments, the age verification prompt may be any other prompt, and any combination of the prompts discussed herein.

Providing age verification before use of the stationary exercise machine may help control access to the stationary exercise machine. For example, the stationary exercise machine may be locked out such that any moving part on the stationary exercise machine is prevented from moving. Thus, while the stationary exercise machine is not in use, accidental or unintended movement of the stationary exercise machine by a child may be prevented. This may help to prevent the child from gaining access to the stationary exercise machine. In this manner, a home user may be able to store the stationary exercise machine without worry about children gaining access to the stationary exercise machine.

Turning now to the drawings, FIG. 1 illustrates an example exercise system 100 for controlling access to a stationary exercise machine. The exercise system 100 may include a remote location 102 and a local location 104 connected by a network 118.

In some embodiments, the network 118 may be configured to communicatively couple any two devices in the exercise system 100 to one another, and/or to other devices. In some embodiments, the network 118 may be any wired or wireless network, or combination of multiple networks, configured to send and receive communications between systems and devices. In some embodiments, the network 118 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 118 may also be coupled to, or may include, portions of a telecommunications network, such as a cellular network, for sending data in a variety of different communication protocols.

In the remote location 102, the exercise system 100 may include a remote server 112. The remote server may store workout programs, such as video workout programs, that can be downloaded to the local location 104. These video workout programs may be employed to control exercise machines 120a, 120b, 120c, and 120d at the local location 104. For example, a video workout program may be transmitted from the remote server 112 (e.g., via a local server 116 or via a direct connection over the network 118) to be used in connection with one of the exercise machines 120a, 120b, 120c, and 120d. For example, the video workout program may be transmitted from the remote server 112 to a console 122a, 122b, 122c, or 122d of the exercise machine 120a, 120b, 120c, or 120d, which may include a display, such as a touchscreen display. Alternatively, a separate wireless mobile device, such as a smartphone 124, may function as a console, or may function in connection with a console, of the exercise machine 120a, 120b, 120c, or 120d, and may also include a display, such as a touchscreen display. The smartphone 124 may communicate with the console 122a, 122b, 122c, or 122d, and/or with the exercise machine 120a, 120b, 120c, or 120d, via a network connection, such as a Wireless Personal Area Network (WPAN) connection, such as a Bluetooth connection. In either example, video and the control commands of the video workout program may be decoded and/or accessed. Then, the console 122a, 122b, 122c, or 122d and/or the smartphone 124 may display the video from the video workout program (e.g., of a trainer performing a workout at a remote location) while simultaneously controlling one or more moveable members of the exercise machine 120a, 120b, 120c, or 120d using the control commands.

Further, during performance of a workout by a user 109 using the video workout program on the exercise machine 120a, 120b, 120c, or 120d, a heart rate of the user 109 may be monitored by the console 122a, 122b, 122c, or 122d, and/or the smartphone 124. This heart rate monitoring may be accomplished by receiving continuous heart rate measurements wirelessly over a WPAN connection (such as over Bluetooth connection or Ant+ connection) from a heart rate monitoring device worn by the user 109, such as a heart rate strap 111b or a heart rate watch 111a, or other wearable heart rate monitor. Alternatively, the heart rate monitoring device may be built into another device, such as being built into handlebars or handgrips of the exercise machine 120a, 120b, 120c, or 120d.

In some embodiments in which biological parameters are collected (such as heart rate), a probability that the biological data is accurate may be determined. For example, when gathering heart rate data from a heart-rate strap or heart rate watch (such as the heart rate strap 111b or the heart rate watch 111a) worn by the user, it is possible that the heart rate data is inaccurate due to improper positioning of the strap, some debris or other object or material blocking all or part of a sensor of the heart rate watch or strap, poor connectivity with the receiver, etc. To account for this possibility, some embodiments may analyze the probability of the heart rate data being accurate, and where the probability of accuracy is below some threshold may discard, ignore, or otherwise not rely on the heart rate data.

The exercise machine 120a is illustrated in FIG. 1 as a treadmill. The treadmill 120a may include multiple different moveable members, including a running belt 126a and a running deck 126b, which may include one or more operating parameters that are selectively adjustable within a limited range. During performance of a workout using a video workout program on the treadmill 120a, the running belt 126a may rotate and the running deck 126b may incline. One example of an operating parameter on the treadmill 120a is a speed of the running belt 126a. The running belt 126a may rotate at different speeds within a limited range. An actuator (see FIG. 2), for example a belt motor, may selectively adjust the speed at which the running belt 126a rotates within the limited range. Another example of an operating parameter on the treadmill 120a is the inclination of running deck 126b. The running deck 126b may be selectively inclinable to different angles within a limited range. An actuator, for example an incline motor, may selectively adjust the incline of the running deck 126b within the limited range.

The exercise machine 120b is illustrated in FIG. 1 as an elliptical machine. The elliptical machine 120b may include multiple different moveable members, including a flywheel 126c, foot rails or pedals 126d, and handles 126e, which include one or more operating parameters that are selectively adjustable within a limited range. During performance of a workout using a video workout program on the elliptical machine 120b, movement of the foot rails or pedals 126d and the handles 126e may cause the flywheel 126c to rotate. One example of an operating parameter on the elliptical machine 120b is the amount of resistance applied to the flywheel 126c. A differing amount of resistance can be applied to the flywheel 126c to make the movement of the foot rails or pedals 126d and the handles 126e more difficult or less difficult. An actuator, such as a brake, may be used to selectively adjust the amount of resistance that is applied to the flywheel 126c. Another example of an operating parameter on the elliptical machine 120b is the inclination of foot rails or pedals 126d. The foot rails or pedals 126d may be inclinable to different angles within a limited range. An actuator, such as an incline motor, may selectively adjust the incline of the foot rails or pedals 126d within the limited range. Yet another example of an operating parameter on exercise machine 120b is the stride length of the foot rails or pedals 126d and/or the handles 126e. The stride length of the foot rails or pedals 126d and/or the handles 126e may be adjustable to different distances within a limited range. An actuator, for example a stride length motor, may selectively adjust the stride length of the foot rails or pedals 126d and/or the handles 126e within the limited range.

The exercise machine 120c is illustrated in FIG. 1 as an exercise bike. The exercise bike 120c may include multiple different moveable members, including a flywheel 126f, pedals 126g, and a frame 126h, which include one or more operating parameters that are selectively adjustable within a limited range. During performance of a workout using a video workout program on the exercise bike 120c, movement of the pedals 126g may cause the flywheel 126f to rotate. One example of an operating parameter on the exercise bike 120c is the amount of resistance applied to the flywheel 126f. A differing amount of resistance can be applied to the flywheel 126f to make rotation of the pedals 126g more difficult or less difficult. An actuator, such as a brake, may be used to selectively adjust the amount of resistance that is applied to the flywheel 126*f* within the limited range. Another example of an operating parameter on the exercise bike 120*c* is the position of the frame 126*h*. The frame 126*h* may tilt forward, backward, or from side to side within a limited range. An actuator, such as a tilt motor, may selectively adjust the position of the frame 126*h* within the limited range.

The exercise machine 120*d* is illustrated in FIG. 1 as a rower machine. The rower machine 120*d* may include multiple different moveable members, including a flywheel 126*i*, a rowbar 126*j*, and a seat 126*k*, which include one or more operating parameters that are selectively adjustable within a limited range. During performance of a workout using a video workout program on the rower machine 120*d*, movement of the rowbar 126*j* may cause the flywheel 126*i* to rotate. One example of an operating parameter on the rower machine 120*d* is the amount of resistance applied to the flywheel 126*i*. A differing amount of resistance can be applied to the flywheel 126*i* to make pulling on the rowbar 126*j* more difficult or less difficult. An actuator, such as a brake, may be used to selectively adjust the amount of resistance that is applied to the flywheel 126*i* within the limited range.

The remote server 112 may also be employed to control access to the stationary exercise machines at the local location 104. For example, an authorized user of the exercise machines 120*a*, 120*b*, 120*c*, and 120*d*, such as the user 109, may create an account on the remote server 112, such as an IFIT.com account, and may establish on a user profile of the account that the only authorized user on any of the exercise machines 120*a*, 120*b*, 120*c*, and 120*d* is the user 109 (or one or more other users). The remote server 112 may then periodically and automatically lock the one or more moveable members of the exercise machines 120*a*, 120*b*, 120*c*, and 120*d*, such as at the conclusion of each workout, or whenever the exercise machine loses power. Later, whenever any user attempts to access any of the exercise machines 120*a*, 120*b*, 120*c*, and 120*d*, such as where any user attempts to begin a workout on the exercise machine, the exercise machine may send a request to the remote server 112 to perform a workout on the exercise machine. In response to the receiving of the request to perform the workout on the exercise machine, the remote server 112 may automatically determine whether any authorized user is proximate to the exercise machine, which may be determined in a number of different ways, as disclosed herein. If so, the remote server 112 may automatically unlock the one or more moveable members of the exercise machine to enable the workout to be performed on the exercise machine. But if not, the remote server 112 may automatically keep the one or more moveable members of the exercise machine locked to prevent the workout from being performed on the exercise machine. In this example, since the only authorized user is the user 109, if the remote server 112 determines that the user 109 is proximate the exercise machine, the remote server 112 may unlock the exercise machine. On the other hand, if the remote server 112 is unable to determine that the sole authorized user 109 is proximate the exercise the machine, the remote server 112 may keep the exercise machine locked to prevent any unauthorized user from accessing the exercise machine, such as by performing a workout on the exercise machine.

In this manner, by only allowing only authorized users in proximity to an exercise machine to unlock the one or more movable members of the exercise machine, the remote server 112 can prevent unauthorized users in close proximity to the exercise machine from causing the one or more movable members to automatically move or to be moved by the unauthorized user. For example, when the local location 104 is the home of the authorized user 109, the remote server 112 may only allow the authorized user 109 to access the exercise machines 120*a*, 120*b*, 120*c*, and 120*d*, but prevent other occupants of the home or visitors to the home from operating the moving parts of the stationary exercise machine. In the case of the treadmill 120*a*, for example, the remote server 112 may only allow the authorized user 109 to cause the running belt 126*a* of the treadmill 120*a* to be rotated, but prevent unauthorized children and/or pets who live in the home from intentionally or unintentionally causing the running belt 126*a* of the treadmill 120*a* to be rotated. Thus, the treadmill 120*a* may only be operated when the authorized user 109 is proximate to the treadmill 120*a* (e.g., on the treadmill 120*a*, within reach of the treadmill 120*a*, in the same room or a building as the treadmill 120*a*, or within sight of the treadmill 120*a*).

Figure 2:
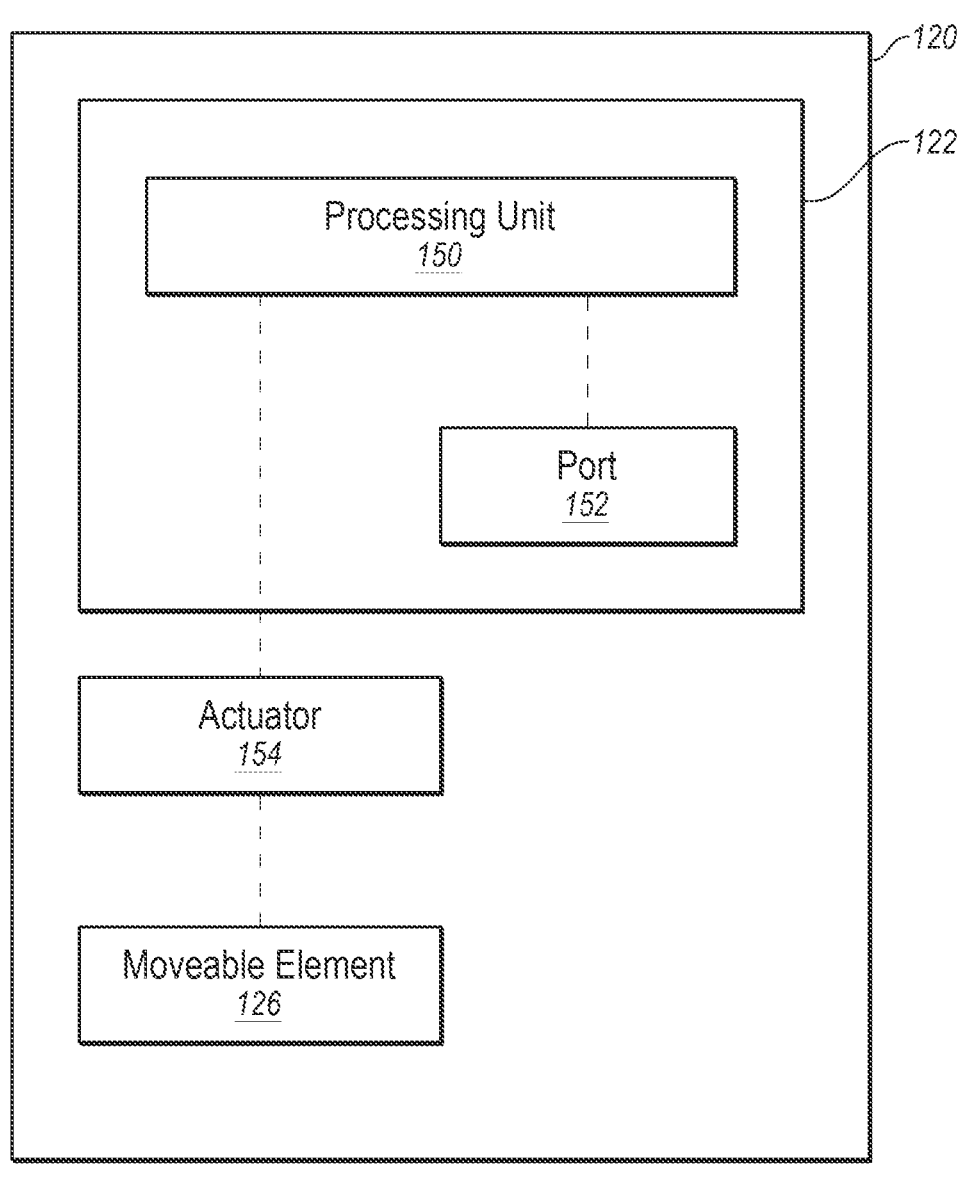
FIG. 2 illustrates an example stationary exercise machine to which access may be controlled.

FIG. 2 illustrates an example stationary exercise machine to which access may be controlled. The exercise machine 120 of FIG. 2 may represent, and may include similar components to, any of the exercise machine 120*a*, 120*b*, 120*c*, or 120*d* of FIG. 1, for example.

As disclosed in FIG. 2, the exercise machine 120 may include a processing unit 150, a receiving port 152, an actuator 154, and a moveable member 126. The moveable member 126, which may be similar to any of the moveable members 126*a*-126*k* of FIG. 1, for example. The processing unit 150 may be communicatively connected to the receiving port 152 and may be included within a console 122, which may be similar to any of the consoles 122*a*, 122*b*, 122*c*, or 122*d* of FIG. 1, for example. The processing unit 150 may also be communicatively connected to the actuator 154. In response to control commands executed by the processing unit 150, the actuator 154 may selectively adjust one or more operating parameters of the moveable member 126 within a limited range.

Data, including data in a video workout program, can be received by the exercise machine 120 through the receiving port 152. As stated previously, a video workout program may include video as well as control commands. Control commands may provide control instructions to an exercise machine (such as a treadmill, an elliptical machine, an exercise bike, or a rower machine). Control commands may include, for example, control commands for a belt motor, an incline motor, and other actuators. In addition to actuator control commands, control commands may further include distance control commands, time control commands, and/or heart rate zone control commands. These control commands may provide a series of actuator control commands for execution at specific times or at specific distances. For example, a control command for an actuator to be at a certain level for a specific amount of time or for a specific distance. These control commands may also provide a series of actuator control commands for execution at specific times or at specific distances based on a user's monitored heart rate or heart rate trends over time. For example, a control command for an actuator may dictate a certain heart rate zone for a certain amount of time or distance, and a difficulty level of this control command may be dynamically scaled based on a user's monitored heart rate in order to get or keep the user in the certain heart rate zone for the certain amount of time or distance.

Using a control command, received at the receiving port 152 in a video workout program, such as a control command that is decoded from a subtitle stream of a video of a video workout program for example, the processing unit 150 may control the actuator 154 on the exercise machine 120 in the sequence and at the times or distances specified by the control command. For example, actuator control commands that provide the processing unit 150 with commands for controlling a belt motor, an incline motor, a flywheel brake, stride length motor, or another actuator may be included in the control commands received in a video workout program at the exercise machine 120.

The control commands received in a video workout program at the exercise machine 120 may be executed by the processing unit 150 in a number of different ways. For example, the control commands may be received and then stored into a read/write memory that is included in the processing unit 150. Alternatively, the control commands may be streamed to the exercise machine 120 in real-time. The control commands may also be received and/or executed from a portable memory device, such as a USB memory stick or an SD card.

Other types of control signals that can be received by the exercise machine 120 through the receiving port 152 are lock signals and unlock signals. For example, where the remote server 112 determines that an authorized user has finished a workout on the exercise machine 120, the remote server 112 may send a lock signal to the receiving port 152, which may be executed by the processing unit 150 to cause the actuator to lock the moveable member 126. In this manner, the remote server 112 can use a lock signal to prevent any unauthorized user from operating the moving parts of the exercise machine 120. Later, where the remote server 112 determines that an authorized user is proximate to, and has requested to perform a workout on, the exercise machine 120, the remote server 112 may send an unlock signal to the receiving port 152, which may be executed by the processing unit 150 to cause the actuator to unlock the moveable member 126. In this manner, the remote server 112 can use an unlock signal to allow an authorized user to operate the moving parts of the exercise machine 120.

Figure 3:
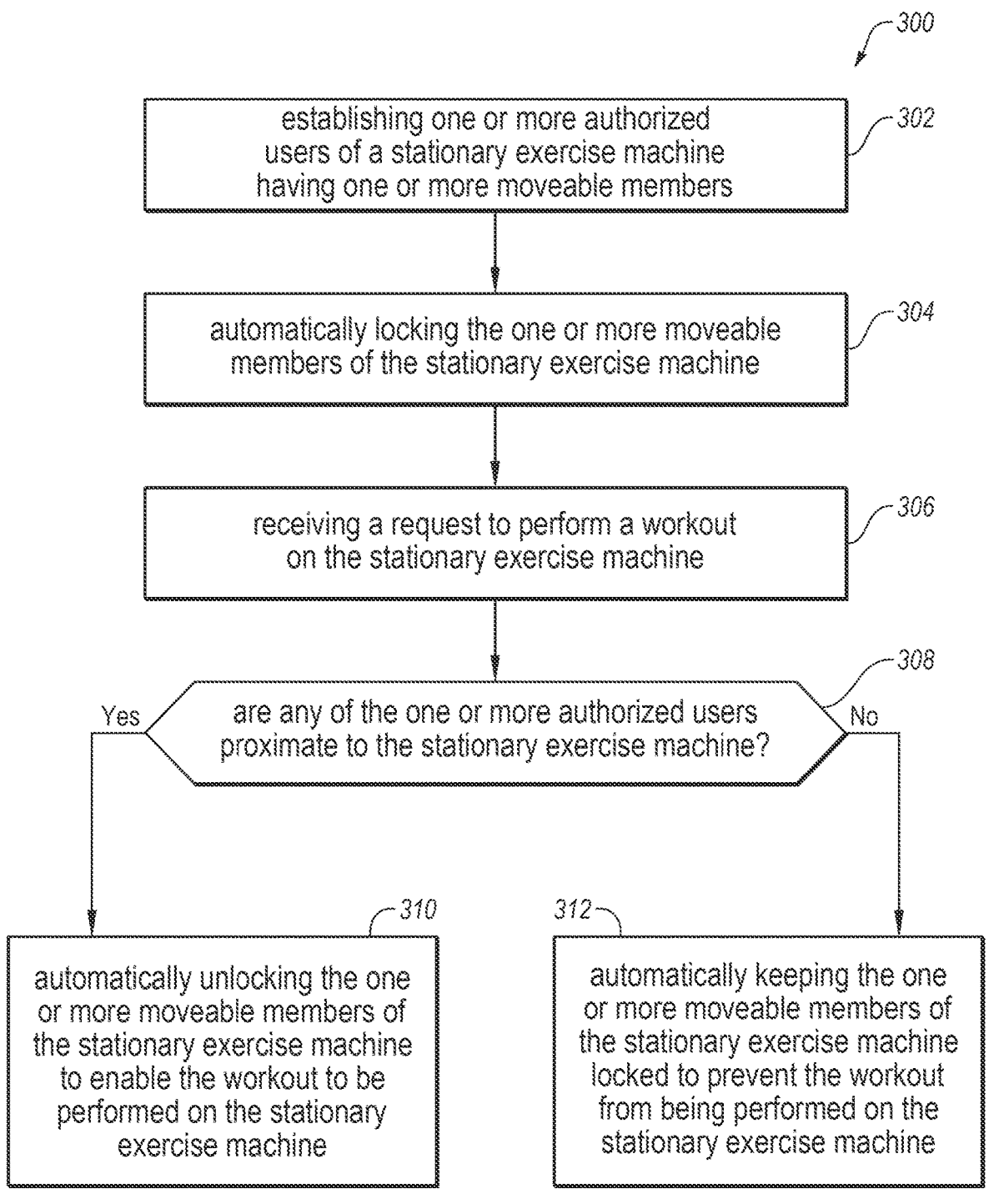
FIG. 3 illustrates an example method for controlling access to a stationary exercise machine.

FIG. 3 illustrates an example method 300 for controlling access to a stationary exercise machine. The method 300 may be performed, in some embodiments, by one or more applications, devices, or systems, such as by an application running on the remote server 112, on the smartphone 124, on the consoles 122a-122d, or on the exercise machines 120a-120d, or on some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

Prior to the method 300, a user may be subscribed to a subscription service (e.g., an IFIT.com account on the remote server 112) that allows the user to have access to video workout programs. This subscription service may store a user profile, which may include a list or one or more authorized users, as well as profile information and history information related to a user's sleep, nutrition, stress levels, exercise, wellness, and activity levels (which may be gathered automatically via sensors, or manually entered by the user). This profile and history information may be accessed to recommend particular video workout programs that will best help a user to achieve fitness goals set by the user or automatically generated for the user. By providing high quality video workout programs, a user may be incentivized to continue subscribing, and a retention rate for subscribers may be positively impacted. Further, some video workout programs may be accessed by user using a pay-per-view model rather than an ongoing subscription model. For example, a pay-per-view model may be appropriate for rare events or classes, or for one-on-one training sessions between a single trainer and a single user.

The method 300 may include, at action 302, establishing one or more authorized users of a stationary exercise machine having one or more moveable members. For example, the user 109 may store a user profile on an account (e.g., an IFIT.com account) at the remote server 112 which includes a list or one or more authorized users for the treadmill 120a (e.g., may establish that the only authorized user is the user 109).

The method 300 may include, at action 304, automatically locking the one or more moveable members of the stationary exercise machine. For example, at the conclusion of each workout on the treadmill 120a, or at any other appropriate time, the remote server 112 may lock the running belt 126a and the running deck 126b of the treadmill 120a.

The method 300 may include, at action 306, receiving a request to perform a workout on the stationary exercise machine. For example, the remote server 112 may receive a request from the console 122a of the treadmill 120a, or from the smartphone 124, to perform a workout on the treadmill 120a. This request may be automatically sent, such as whenever a video workout program is selected to be performed on the treadmill 120a.

The method 300 may include, at action 306, determining whether any of the one or more authorized users is proximate to the stationary exercise machine. If so (yes at action 306), the method 300 may include, at action 308, automatically unlocking the one or more moveable members of the stationary exercise machine to enable the workout to be performed on the stationary exercise machine. If not (no at action 306), the method 300 may include, at action 310, automatically keeping the one or more moveable members of the stationary exercise machine locked to prevent the workout from being performed on the stationary exercise machine.

In some embodiments, automatically determining that one of the one or more authorized users is proximate to the stationary exercise machine may include automatically sending an electronic proximity confirmation request to one or more electronic addresses of the one or more authorized users, and automatically determining that one of the one or more authorized users is proximate to the stationary exercise machine if a positive electronic proximity confirmation response is received from any of the one or more electronic addresses. In these embodiments, the one or more electronic addresses of the one or more authorized users may include one or more cellular telephone numbers of the one or more authorized users, the electronic proximity confirmation request may be included in a text message sent to the one or more cellular telephone numbers, and the positive electronic proximity confirmation response may be included in a reply text message received from one of the one or more cellular telephone numbers. Additionally or alternatively, in these embodiments, the one or more electronic addresses of the one or more authorized users includes one or more email addresses of the one or more authorized users, the electronic proximity confirmation request is included in an email sent to the one or more email addresses, and the positive electronic proximity confirmation response is included in a replay email received from one of the one or more email addresses. For example, the authorized user 109 may include in his profile his cellular telephone number and/or his email address. Then, whenever anyone attempts to perform a workout on the treadmill 120a, the remote server 112 may automatically send a text message to the cellular telephone number of the user 109, and/or an email to the email address of the user 109, with an electronic proximity confirmation request (e.g., "Please confirm with the word 'yes' if you are attempting to perform a workout on your treadmill."). If the user 109 reply to this text message and/or this email with a positive electronic proximity confirmation response (e.g., "yes"), then the remote server 112 may automatically unlock the running belt 126*a* and the running deck 126*b* of the treadmill 120*a*. But if no such reply is received, then the remote server 112 may automatically keep the running belt 126*a* and the running deck 126*b* locked.

In some embodiments, automatically determining that one of the one or more authorized users is proximate to the stationary exercise machine may include automatically sending a confirmation hyperlink to the one or more authorized users, and automatically determining that one of the one or more authorized users is proximate to the stationary exercise machine if the confirmation hyperlink is selected. For example, the authorized user 109 may include in his profile his cellular telephone number and/or his email address and/or one or more social media profiles. Then, whenever anyone attempts to perform a workout on the treadmill 120*a*, the remote server 112 may automatically send a text message, email, or social media message (e.g., "Please confirm that you are attempting to perform a workout on your treadmill by clicking on the following link: www.ifit.com/user109/treadmill_confirmation"). If the user 109 selects this hyperlink (e.g., by clicking on, tapping on, or otherwise selecting the hyperlink), then the remote server 112 may automatically unlock the running belt 126*a* and the running deck 126*b* of the treadmill 120*a*. But if the hyperlink is not selected by the user 109, then the remote server 112 may automatically keep the running belt 126*a* and the running deck 126*b* locked.

In some embodiments, automatically determining that one of the one or more authorized users is proximate to the stationary exercise machine may include automatically sending an electronic proximity confirmation request to one or more apps of the one or more authorized users, and automatically determining that one of the one or more authorized users is proximate to the stationary exercise machine if a positive electronic proximity confirmation response is received from any of the one or more apps. For example, the authorized user 109 may include in his profile one or more apps of the user 109, such as social media apps and/or fitness apps (e.g., the IFIT app). Then, whenever anyone attempts to perform a workout on the treadmill 120*a*, the remote server 112 may automatically send a message through one or more of these apps ("Please confirm or deny that you are attempting to perform a workout on your treadmill" with a "confirm" button/link and a "deny" button/link). If the user 109 selects the "confirm" button/link, then the remote server 112 may automatically unlock the running belt 126*a* and the running deck 126*b* of the treadmill 120*a*. But if the user 109 selects the "deny" button link, then the remote server 112 may automatically keep the running belt 126*a* and the running deck 126*b* locked.

In some embodiments, automatically determining that one of the one or more authorized users is proximate to the stationary exercise machine may include, automatically sending a one-time-passcode to the one or more authorized users, and automatically determining that one of the one or more authorized users is proximate to the stationary exercise machine if the one-time-passcode is manually entered at the stationary exercise machine. For example, the authorized user 109 may include in his profile his cellular telephone number and/or his email address. Then, whenever anyone attempts to perform a workout on the treadmill 120*a*, the remote server 112 may automatically send a text message to the cellular telephone number of the user 109, and/or an email to the email address of the user 109, with a one-time-passcode (e.g., "Your one-time-passcode to unlock your treadmill is 495837."). If the user 109 then enters this one-time-passcode at the treadmill 120*a* (e.g., into an app at the console 122*a* of the treadmill 120*a*, or into an app at the smartphone 124 that is paired with the treadmill 120*a*), then the remote server 112 may automatically unlock the running belt 126*a* and the running deck 126*b* of the treadmill 120*a*. But if no such one-time-password is entered at the treadmill 120*a*, then the remote server 112 may automatically keep the running belt 126*a* and the running deck 126*b* locked.

In some embodiments, automatically determining that one of the one or more authorized users is proximate to the stationary exercise machine includes automatically determined whether any of one or more wireless mobile devices of the one or more authorized users is paired with the stationary exercise machine over a wireless personal area network (WPAN), and automatically determining that one of the one or more authorized users is proximate to the stationary exercise machine if it is determined that any of the one or more wireless mobile devices of the one or more authorized users is paired with the stationary exercise machine over the WPAN. In some embodiments, the one or more wireless mobile devices of the one or more authorized users include one or more wireless mobile heart rate monitors of the one or more authorized users. In some embodiments, the one or more wireless mobile devices of the one or more authorized users include one or more smartphones or tablets of the one or more authorized users. For example, the authorized user 109 may include in his profile his devices, such as his smartphone 124, heart rate strap 111*b*, and heart rate watch 111*a* (e.g., by entering the cellular telephone number, MAC address of his device, or other identifier of the device). Then, whenever anyone attempts to perform a workout on the treadmill 120*a*, the remote server 112 may automatically detect whether the smartphone 124, the heart rate strap 111*b*, or the heart rate watch 111*a* (or other user device such as wireless headphones) is paired with treadmill 120*a* (e.g., by being paired with some component of the treadmill 120*a* such as the console 122*a*) over a WPAN (e.g., over Bluetooth or Ant+). If one of the devices of the user 109 is paired with the treadmill 120*a*, then the remote server 112 may automatically unlock the running belt 126*a* and the running deck 126*b* of the treadmill 120*a*. But if none of the devices of the user 109 is paired with the treadmill 120*a*, then the remote server 112 may automatically keep the running belt 126*a* and the running deck 126*b* locked.

In some embodiments, determining whether any of the one or more wireless mobile devices of the one or more authorized users is paired with the stationary exercise machine over the WPAN may further include automatically determining whether any of the one or more wireless mobile devices of the one or more authorized users that is paired with the stationary exercise machine is also in an unlocked state. Continuing with the example in the preceding paragraph, in order for the remote server 112 to determine that the user 109 is proximate to the treadmill 120*a*, one of the devices of the user 109 (e.g., the smartphone 124, the heart rate strap 111*b*, or the heart rate watch 111*a*) must not only be paired with the treadmill 120*a*, but must also itself be in an unlocked state (e.g., the smartphone 124 must be both paired and unlocked).

In some embodiments, automatically determining that one of the one or more authorized users is proximate to the stationary exercise machine includes automatically gathering, at the stationary exercise machine, biometric data of a user that is proximate to the stationary exercise machine, and automatically determining, at the stationary exercise machine, that the biometric data matches the one of the one or more authorized users. In these embodiments, the biometric data may include voice recognition data gathered using a microphone, facial recognition data or iris recognition data or height data gathered using a camera, fingerprint data or handprint data gathered using a fingerprint scanner or a handprint scanner, weight data gathered using a scale, heart rate data gathered using a heart rate monitor, or DNA data gathered using a DNA analysis machine that analyze one or more cells of the user (e.g., skin cells or blood cells). For example, the authorized user 109 may include in his profile biometric data (e.g., voice recognition data, facial recognition data, iris recognition data, height data, fingerprint data, handprint data, weight data, other types of biometric data, or some combination thereof). Then, whenever anyone attempts to perform a workout on the treadmill 120*a*, the remote server 112 may automatically gather biometric data of the user 109 (e.g., using a microphone, a camera, a fingerprint scanner, a handprint scanner, or a scale that is that is proximate to the treadmill 120*a* and that is in communication with the treadmill 120*a*) to determine whether the gathered biometric data matches the biometric data stored in the profile of the user 109. If the gathered biometric data matches, then the remote server 112 may automatically unlock the running belt 126*a* and the running deck 126*b* of the treadmill 120*a*. But if the gathered biometric data does not match, then the remote server 112 may automatically keep the running belt 126*a* and the running deck 126*b* locked.

In some embodiments, automatically determining that one of the one or more authorized users is proximate to the stationary exercise machine may include automatically presenting, at the stationary exercise machine, an identity confirming challenge question, and automatically determining that one of the one or more authorized users is proximate to the stationary exercise machine if a correct response to the identity confirming challenge, corresponding to any of the one or more authorized users, is received. For example, whenever anyone attempts to perform a workout on the treadmill 120*a*, the remote server 112 may automatically generate (e.g., from the profile of the user 109) an identity confirming challenge question (e.g., "What is your mother's maiden name?" or "What is the name of your first pet?") and send the challenge question to be presented on the console 122*a* or the smartphone 124. If the user 109 responds to the challenge question with the correct answer, then the remote server 112 may automatically unlock the running belt 126*a* and the running deck 126*b* of the treadmill 120*a*. But if the user 109 does not responds to the challenge question with the correct answer, then the remote server 112 may automatically keep the running belt 126*a* and the running deck 126*b* locked.

In some embodiments, automatically determining that one of the one or more authorized users is proximate to the stationary exercise machine includes automatically determining that one of the one or more authorized users is proximate to the stationary exercise machine if a login credential corresponding to any of the one or more authorized users is entered at the stationary exercise machine. For example, the authorized user 109 may include in his profile login credentials (e.g., a user name and a password). Then, whenever anyone attempts to perform a workout on the treadmill 120*a*, the remote server 112 may automatically require login credentials to be entered at the treadmill 120*a*. If the login credentials are entered correctly at the treadmill 120*a*, then the remote server 112 may automatically unlock the running belt 126*a* and the running deck 126*b* of the treadmill 120*a*. But if the login credentials are not entered correctly at the treadmill 120*a*, then the remote server 112 may automatically keep the running belt 126*a* and the running deck 126*b* locked.

In some embodiments, any combination of the above actions may be performed together to automatically determine that one of the one or more authorized users is proximate to the stationary exercise machine. For example, a user may be required to both enter credentials as well as enter a one-time passcode (e.g., which may constitute two-factor authentication). In another example, a user may be required to both enter credentials as well as confirm biometric data. Any other combination is also possible and contemplated.

In some embodiments, the method 300 may result in controlling access to a stationary machine. Unlike conventional methods of controlling access to a stationary exercise machine that may be easily circumvented by unauthorized users, the method 300 may reliably establish that an authorized user is proximate to the stationary exercise machine prior to unlocking the moveable members of the stationary exercise machine.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 306-310 may be performed without performing the other actions of the method 300. Further, in some embodiments, actions 306, 308, and 312 may be performed without performing the other actions of the method 300.

Figure 4A:
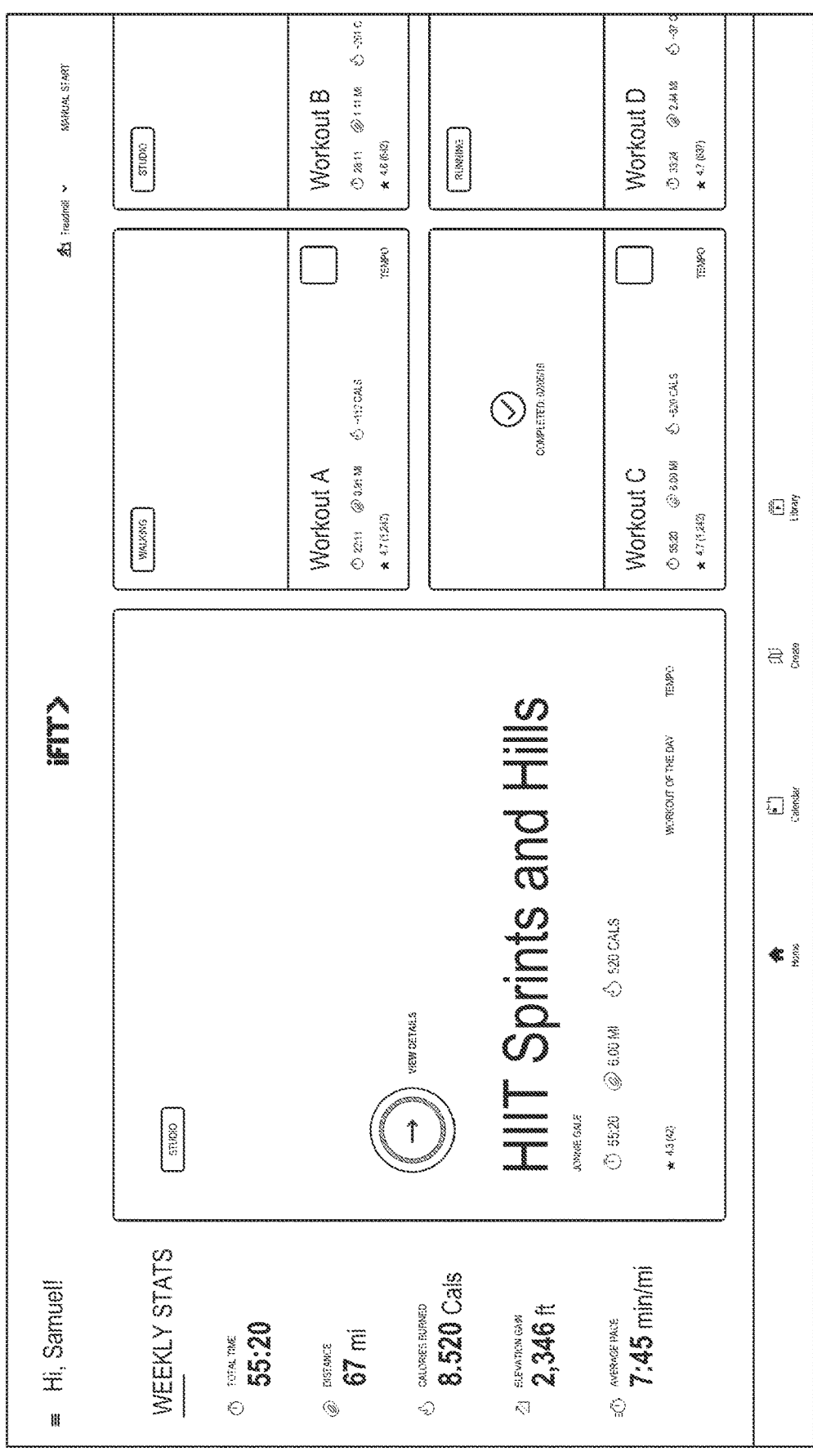
FIGS. 4A-4V illustrate example graphical user interfaces related to a passcode used in controlling access to a treadmill.
Figure 4B:
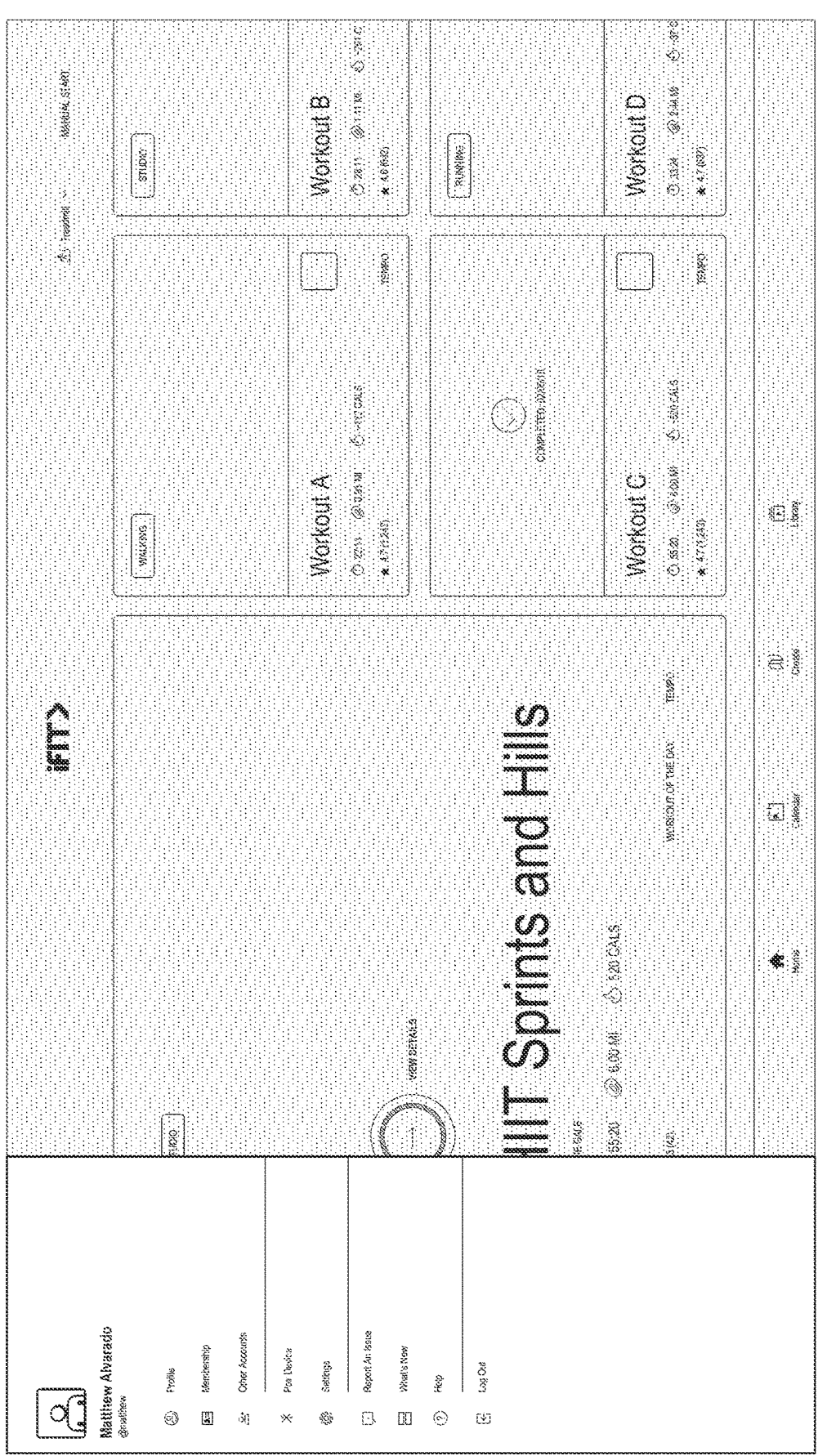
Figure 4C:
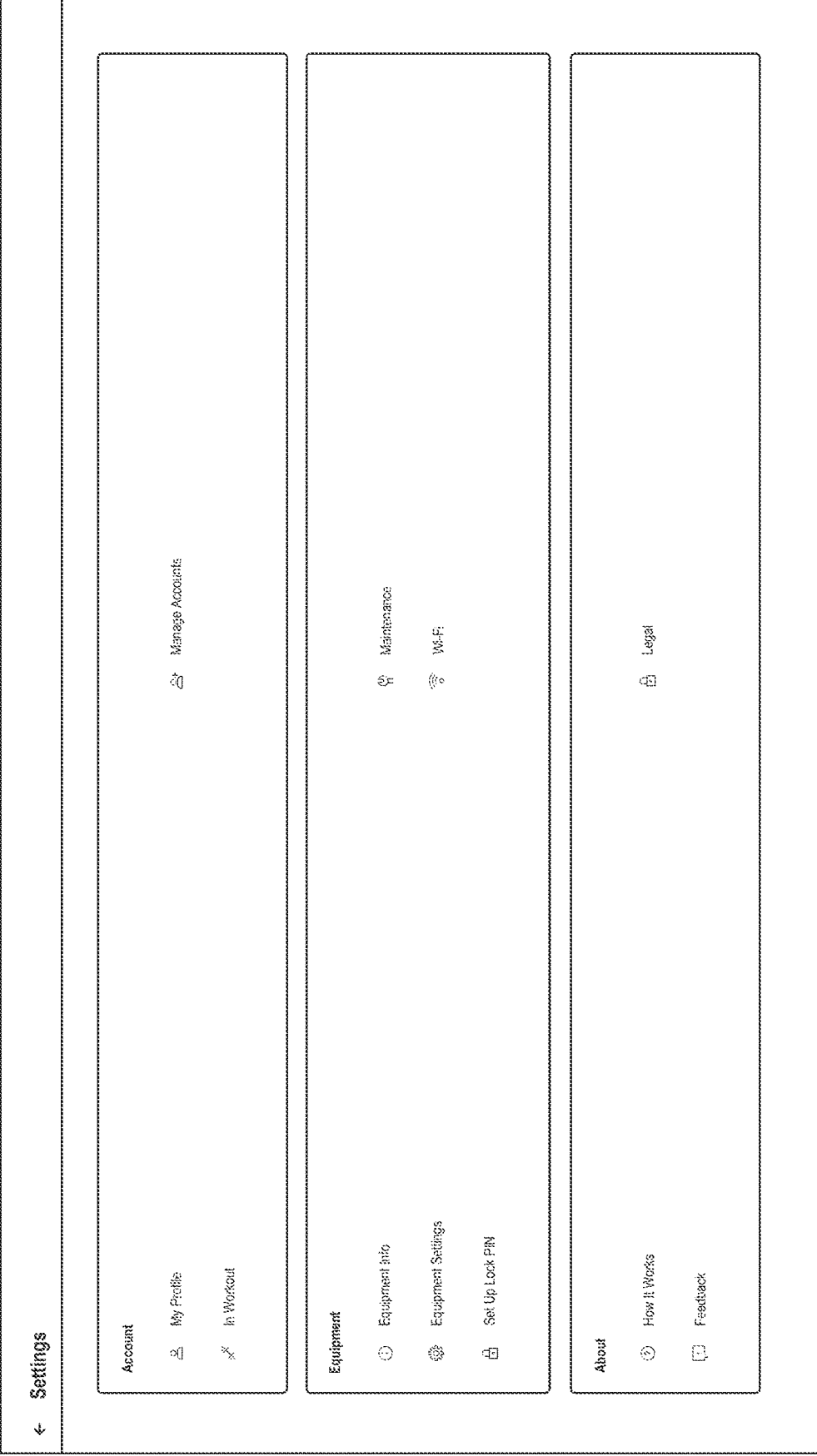
Figure 4D:
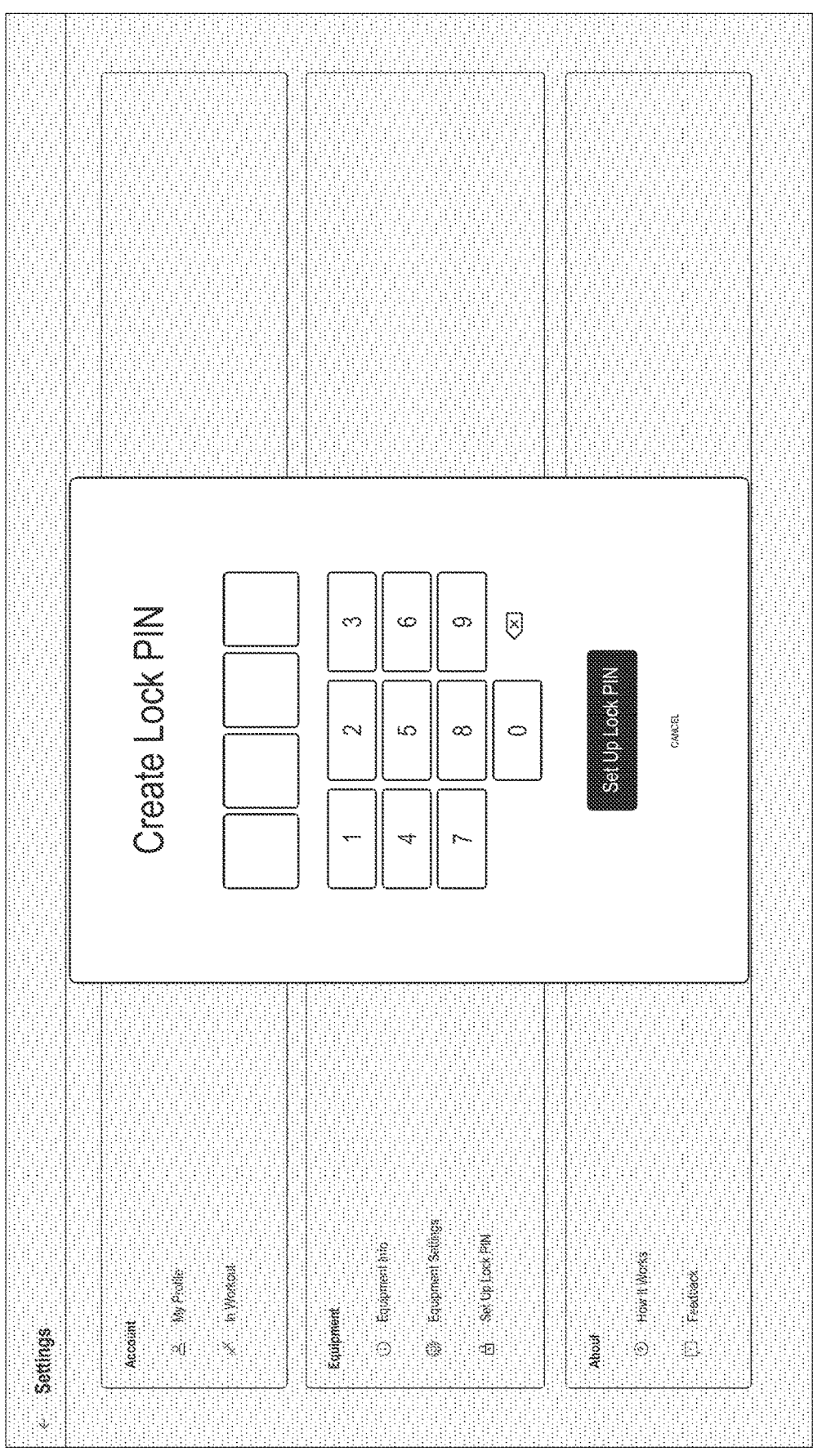
Figure 4E:
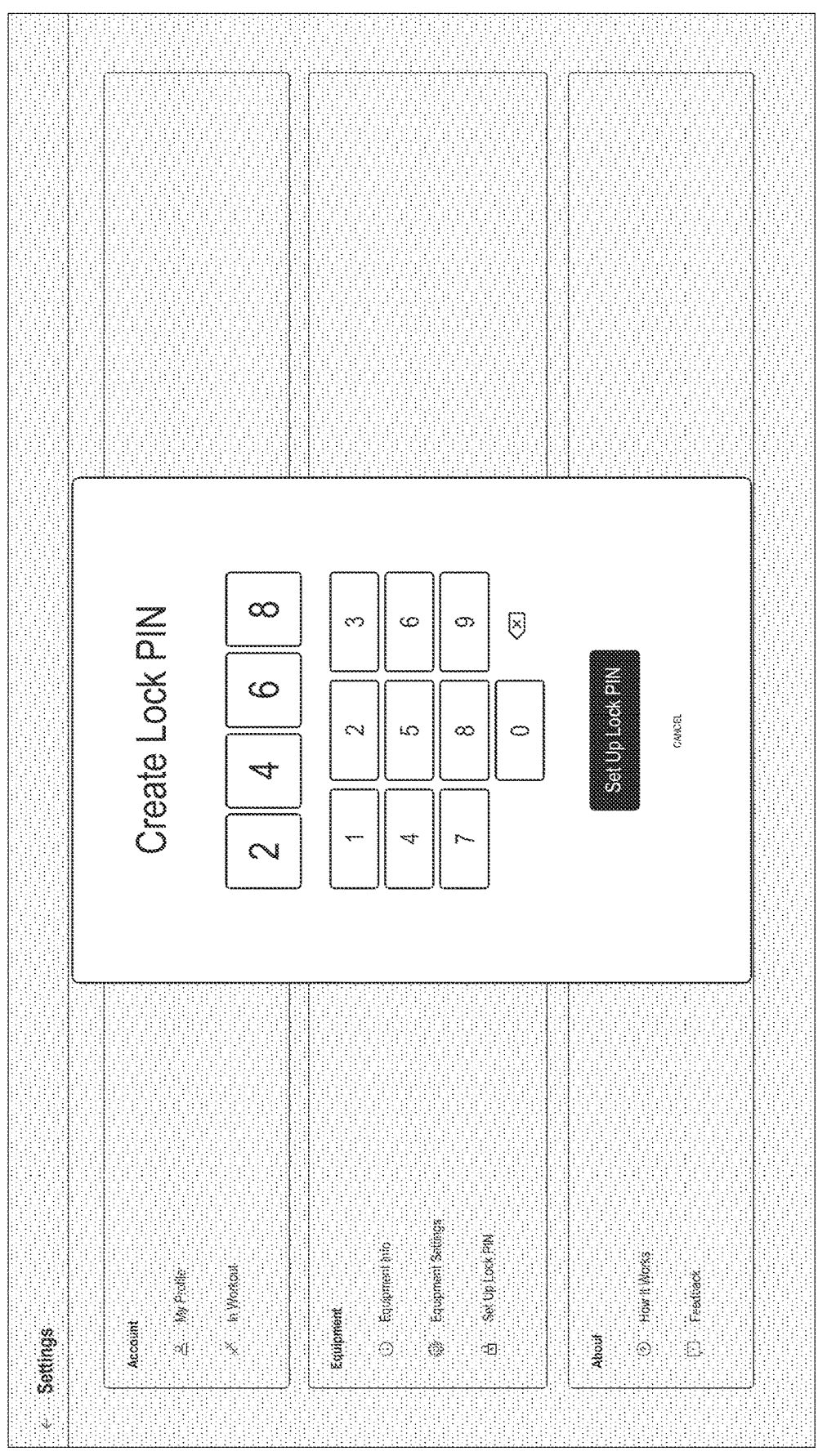
Figure 4F:
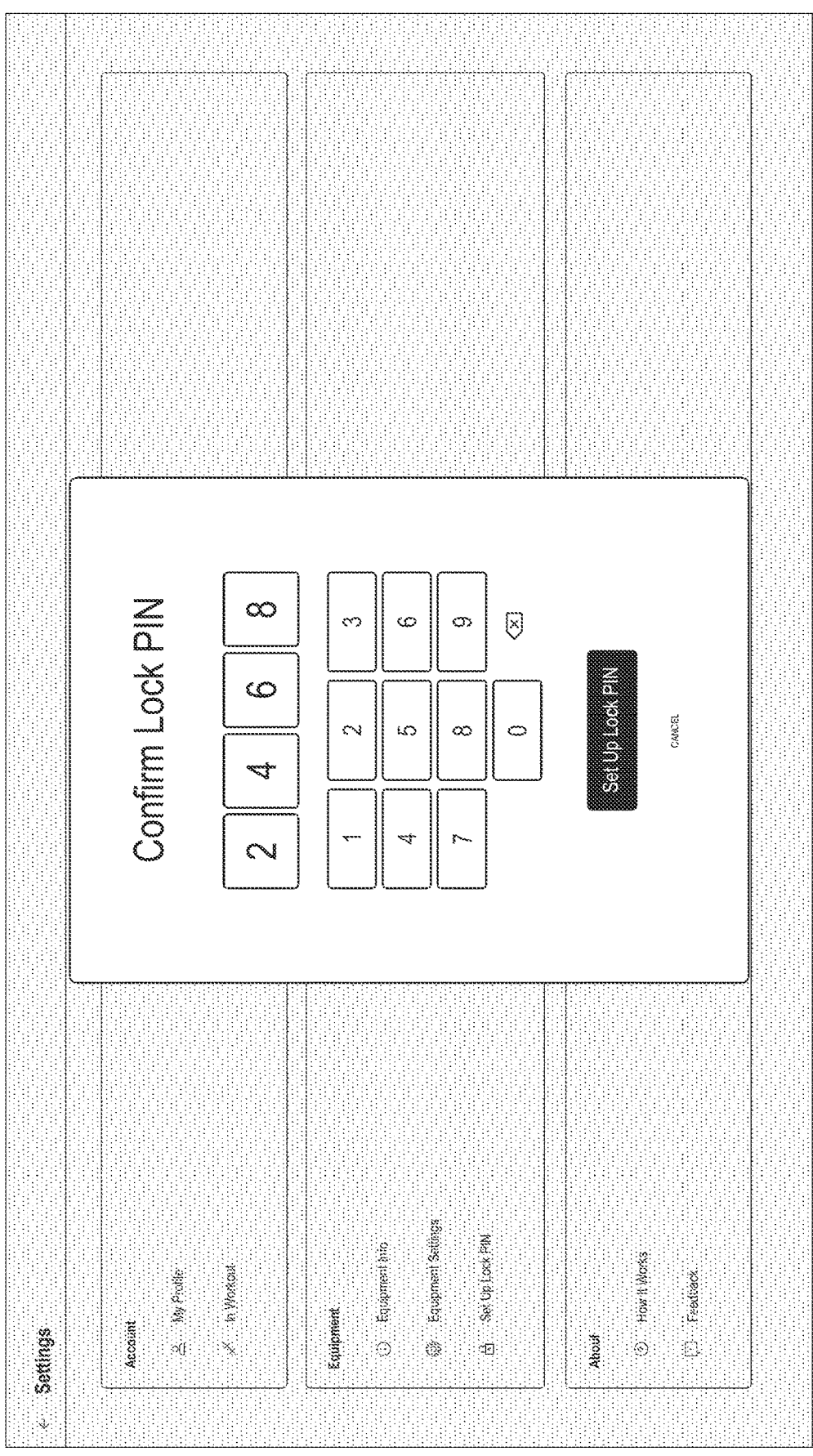
Figure 4G:
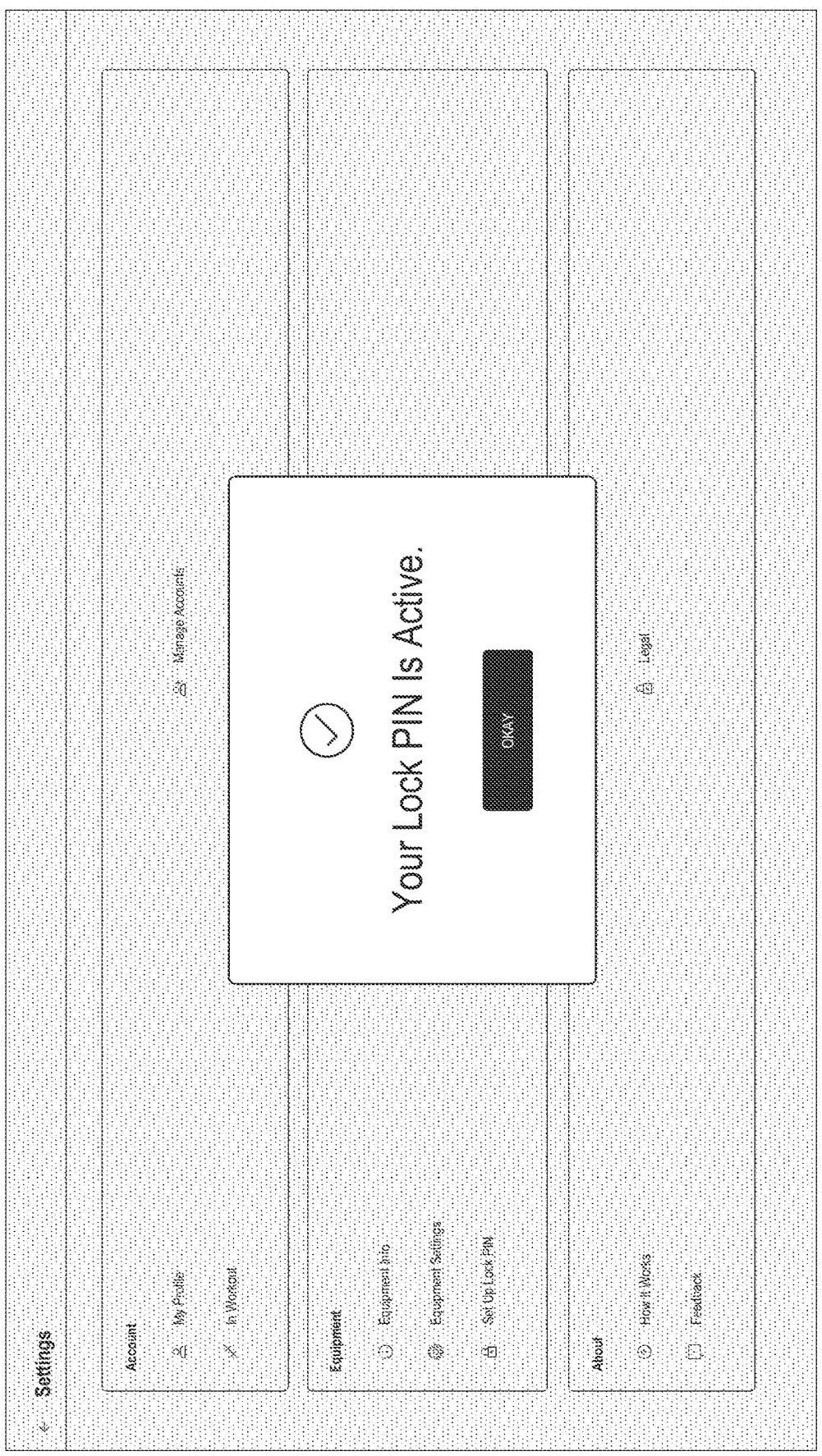
Figure 4H:
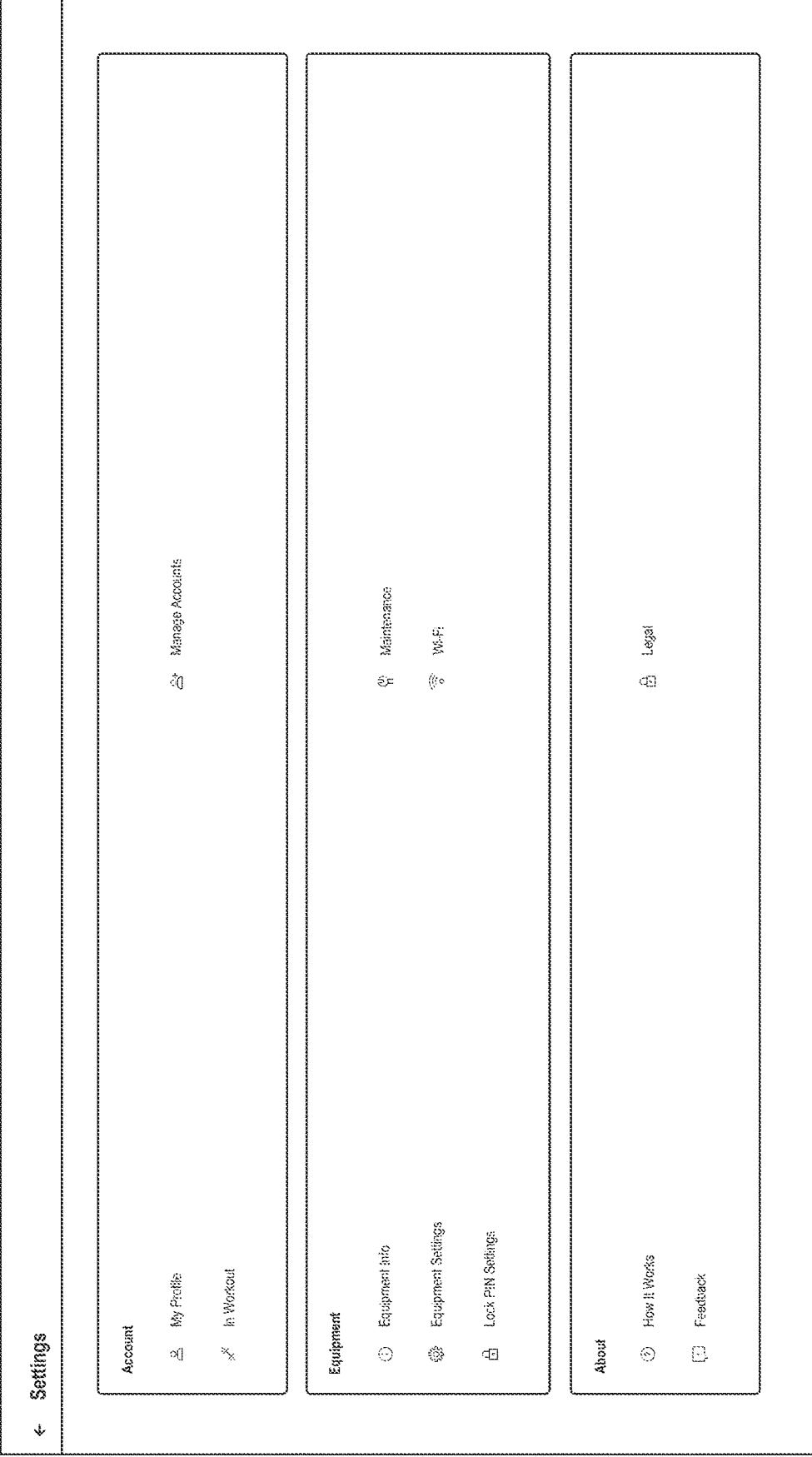
Figure 4I:
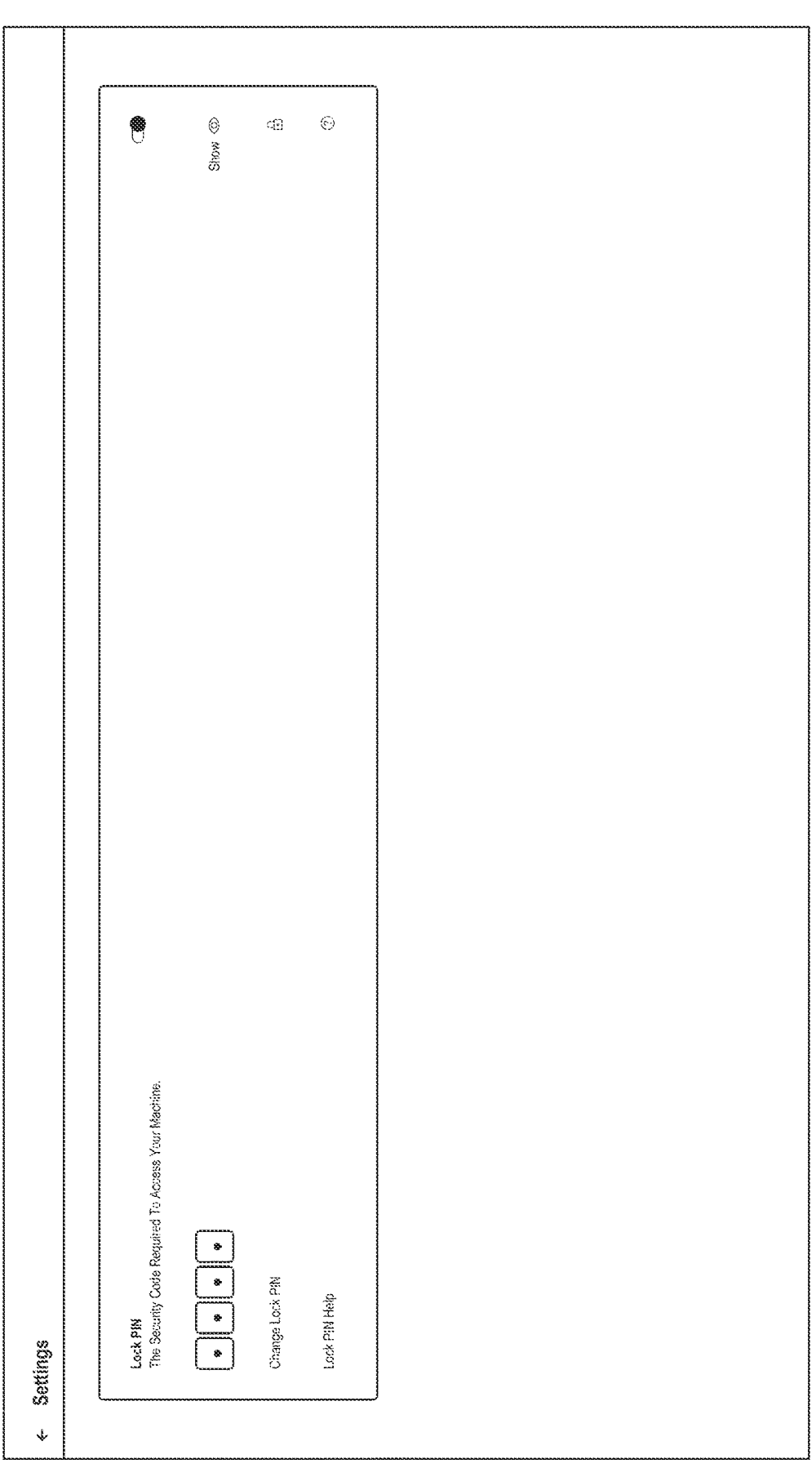
Figure 4J:
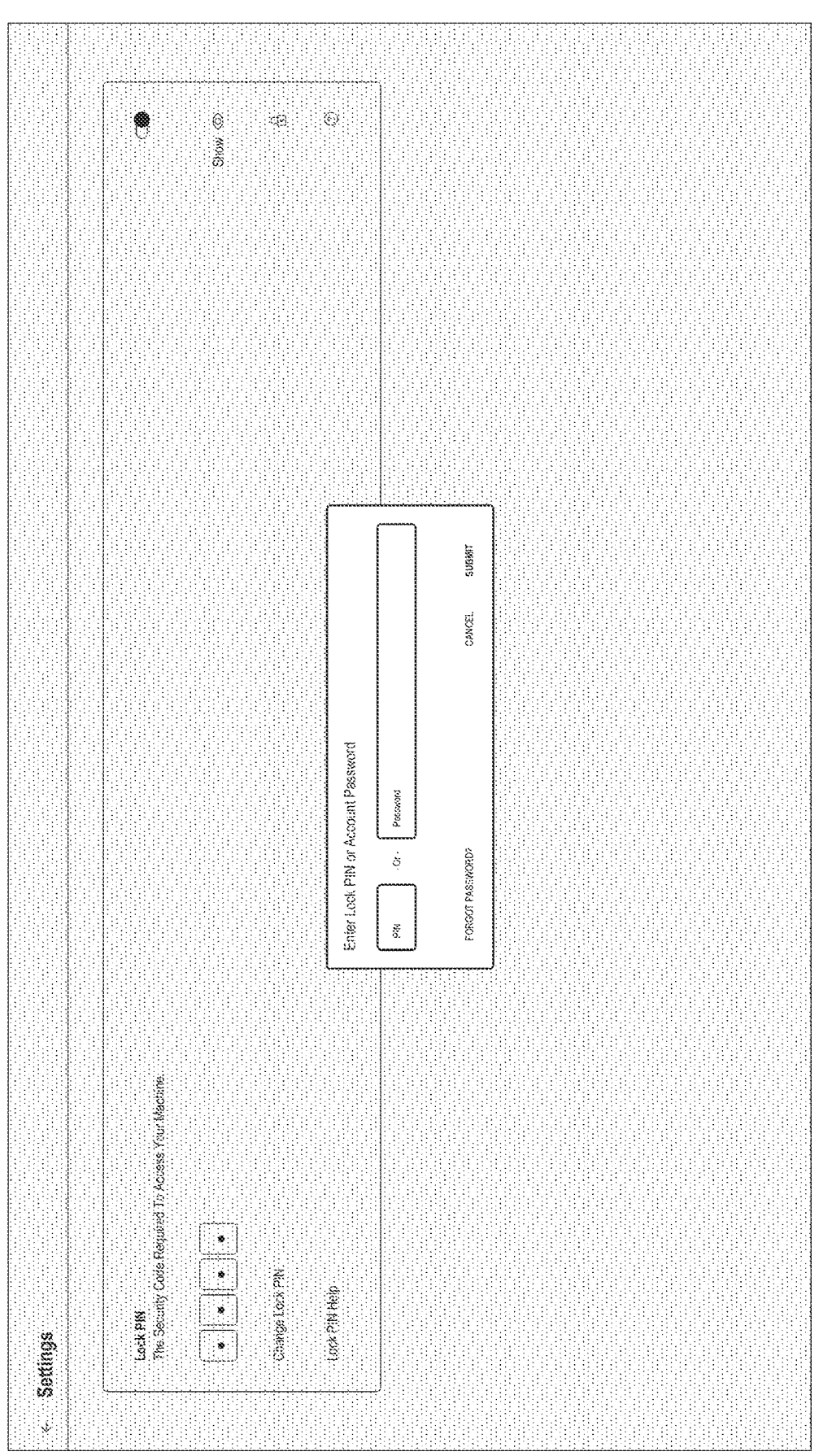
Figure 4K:
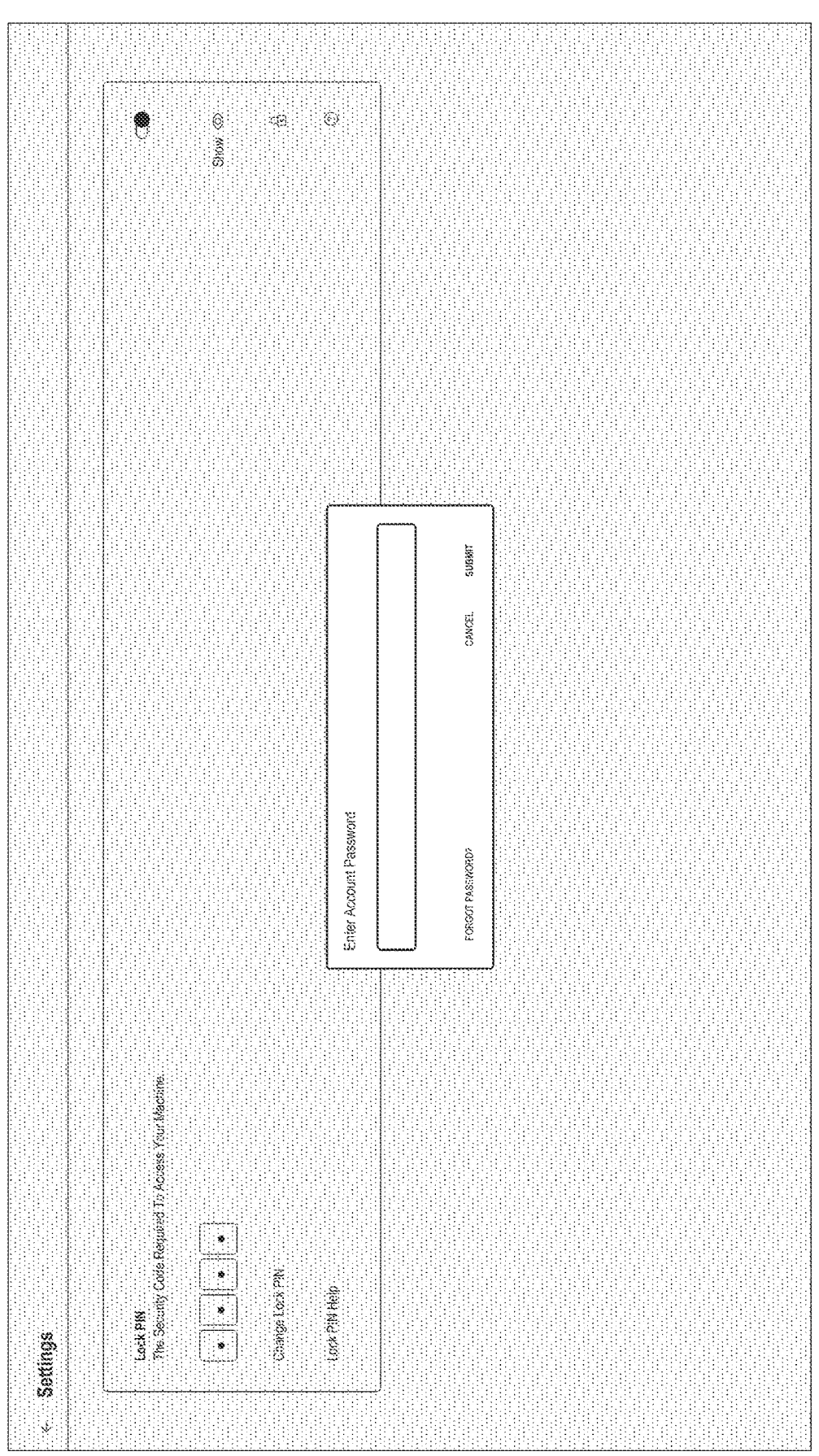
Figure 4L:
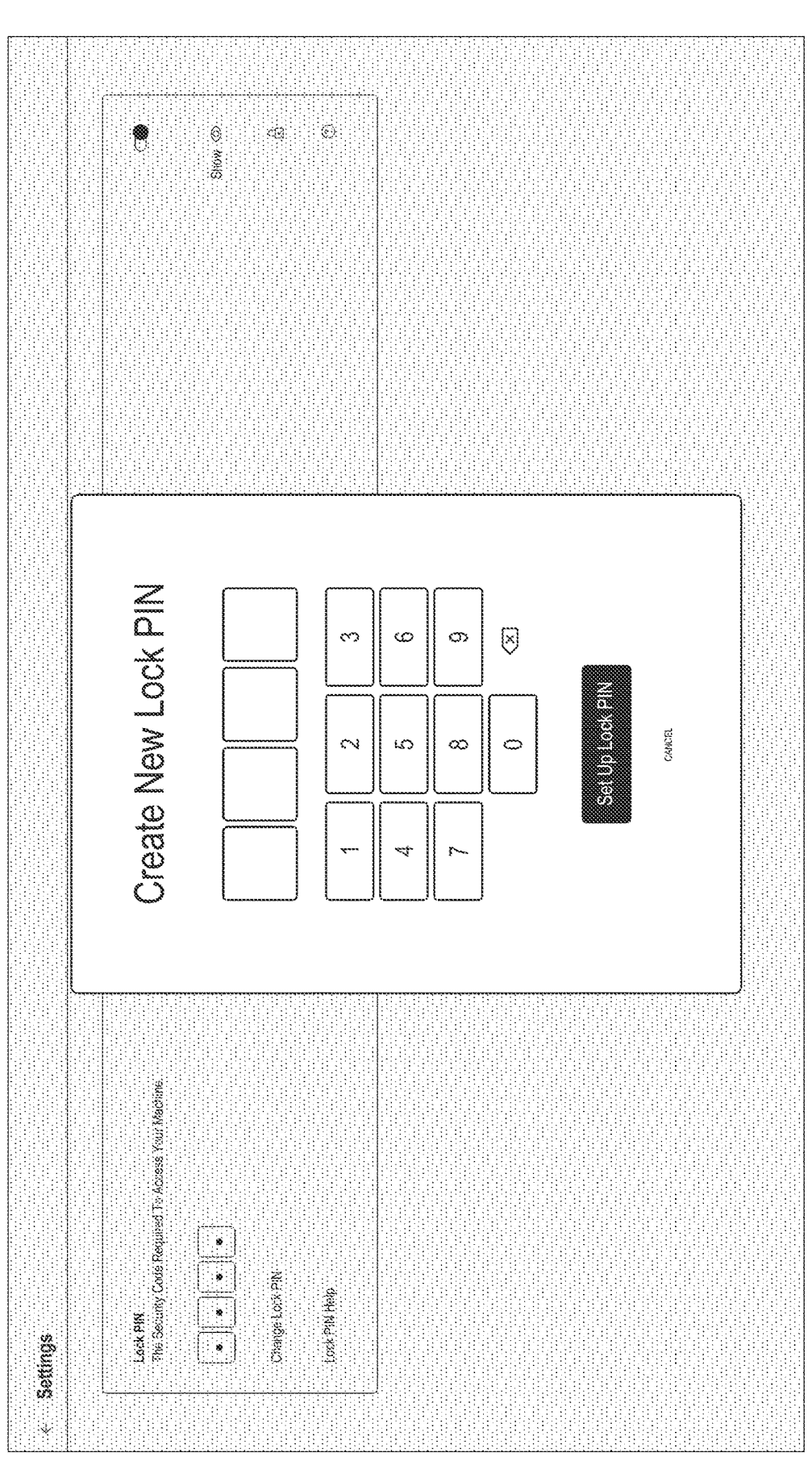
Figure 4M:
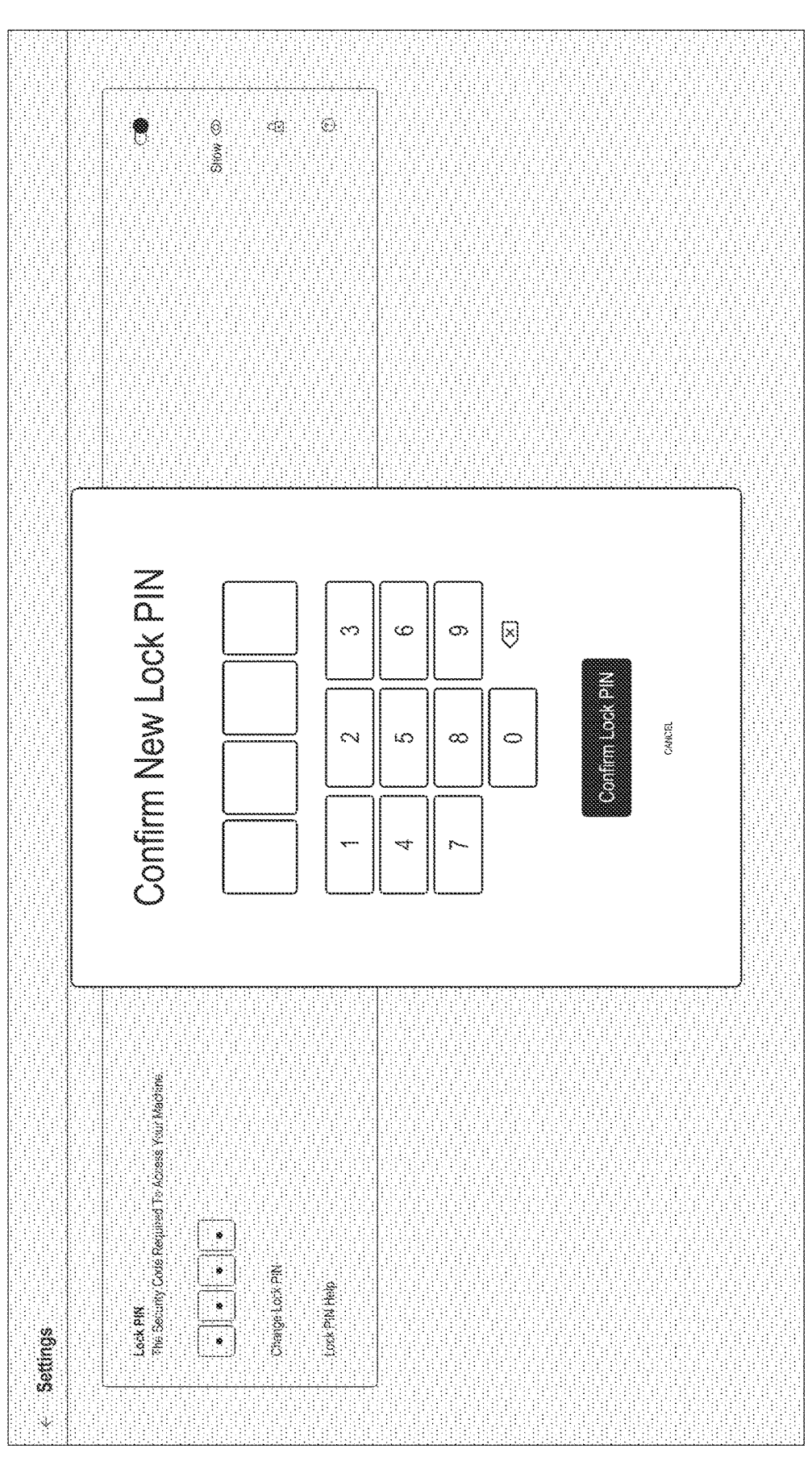
Figure 4N:
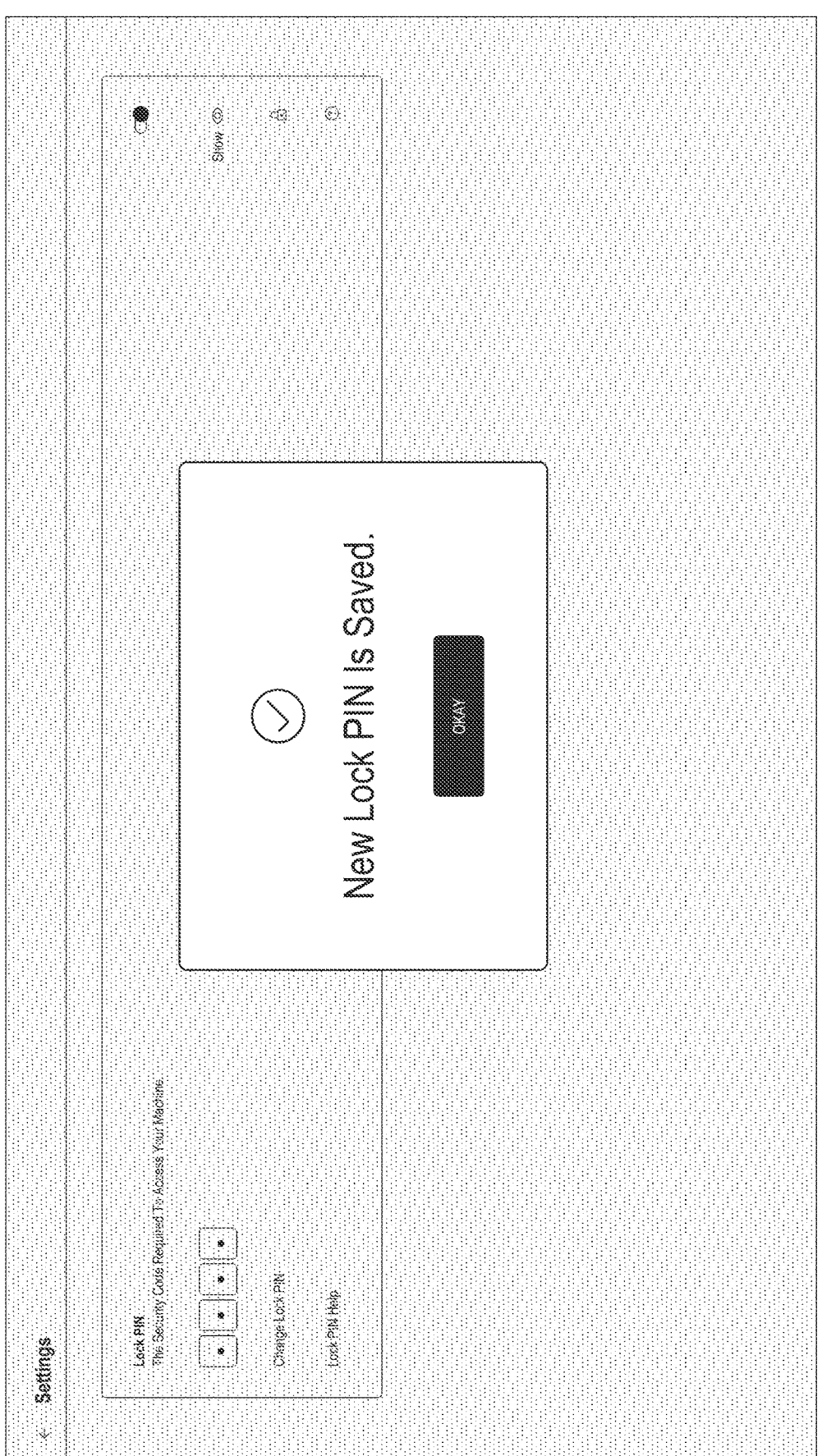
Figure 40:
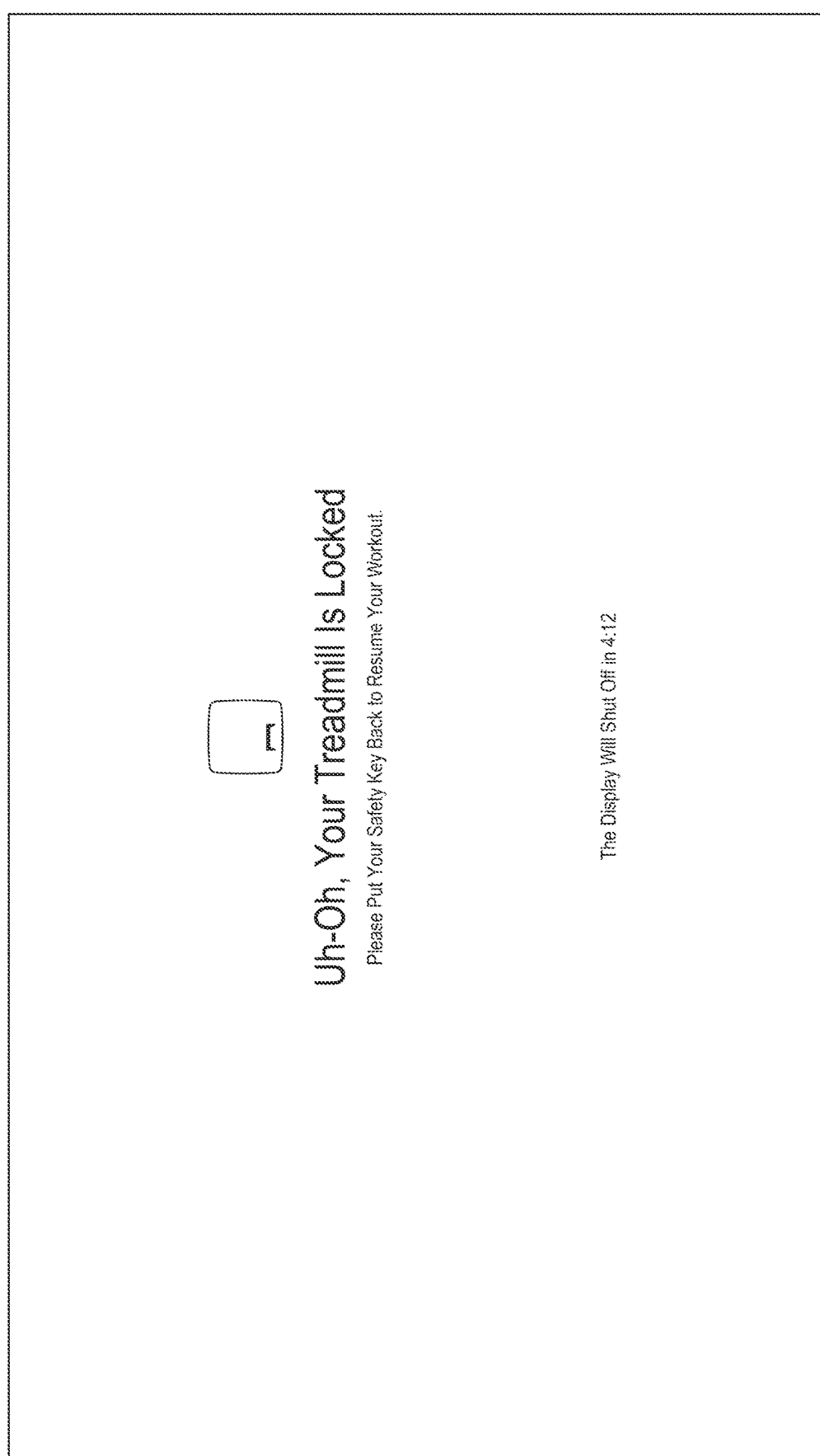

In some embodiments, the method 300 may be performed in connection with a treadmill lock PIN. For example, in a treadmill lock PIN example, in connection with one or more authorized users have being established at action 302, a lock pin can be established for the treadmill 120*a*. For example, from the home screen of the treadmill 120*a* illustrated in FIG. 4A, the user 109 may select the icon next to the "Hi, Samuel!" label, which may result in the screen of the treadmill 120*a* illustrated in FIG. 4B that gives account information specific to the user 109. Then, from the screen illustrated in FIG. 4B, the user 109 may select the "Settings" option, which may take the user 109 to the screen illustrated in FIG. 4C. The, from the screen illustrated in FIG. 4C, the user 109 may select the "Set up Lock PIN" option, which may take the user 109 to the screen illustrated in FIG. 4D. Then, from the screen illustrated in FIG. 4D, the user 109 may select an initial four-digit lock PIN (e.g., a lock PIN of "2468"), as the screen illustrated in FIG. 4E. Then, upon selecting the button labeled "SET UP LOCK PIN" in FIG. 4E, the user 109 may be taken to the screen illustrated in FIG. 4F, where the user 109 can confirm the initial four-digit lock PIN (e.g., the lock PIN of "2468") by again against selecting the same four-digit lock PIN. Then, upon selecting the button labeled "CONFIRM LOCK PIN" in FIG. 4F, the user 109 may be taken to the screen illustrated in FIG. 4G, where the user 109 is informed that the initial four-digit lock PIN is active. Then, by selecting the button labeled "OKAY" in FIG. 4G, the user 109 may be taken back to the screen illustrated in FIG. 4H, where the "Set up Lock PIN" option of FIG. 4C has been replaced with a "Lock PIN Settings"

option. Later, if the user 109 desires to change their lock PIN, the user can select the "Lock PIN Settings" option in FIG. 4H, which may take the user 109 to the screen illustrated in FIG. 4I. From the screen illustrated in FIG. 4I, the user 109 can toggle between using and not using the lock PIN, the user 109 can view the current lock PIN (e.g., the lock PIN "2468"), the user 109 can change the lock PIN, and the user can get help with the lock PIN. In some embodiments, any attempt by the user to make changes on the screen illustrated in FIG. 4I may result in the user being taken to the screen illustrated in FIG. 4J, where the user 109 is required to first enter the current lock PIN associated with the treadmill 120a, or first enter the password associated with the iFIT account of the user 109, prior to being allowed to make any changes on the screen illustrated in FIG. 4I. Alternatively, in other embodiments, any attempt by the user to make changes on the screen illustrated in FIG. 4I may result in the user being taken to the screen illustrated in FIG. 4K, where the user 109 is required to first enter password associated with the iFIT account of the user 109, prior to being allowed to make any changes on the screen illustrated in FIG. 4I. Where the user 109 has selected the "Change lock PIN" option on FIG. 4I, the user 109 may be taken to the screens of FIGS. 4L, 4M, and 4N, where the user can enter a new lock PIN (i.e., to change the current lock PIN to the new lock PIN).

Figure 4P:
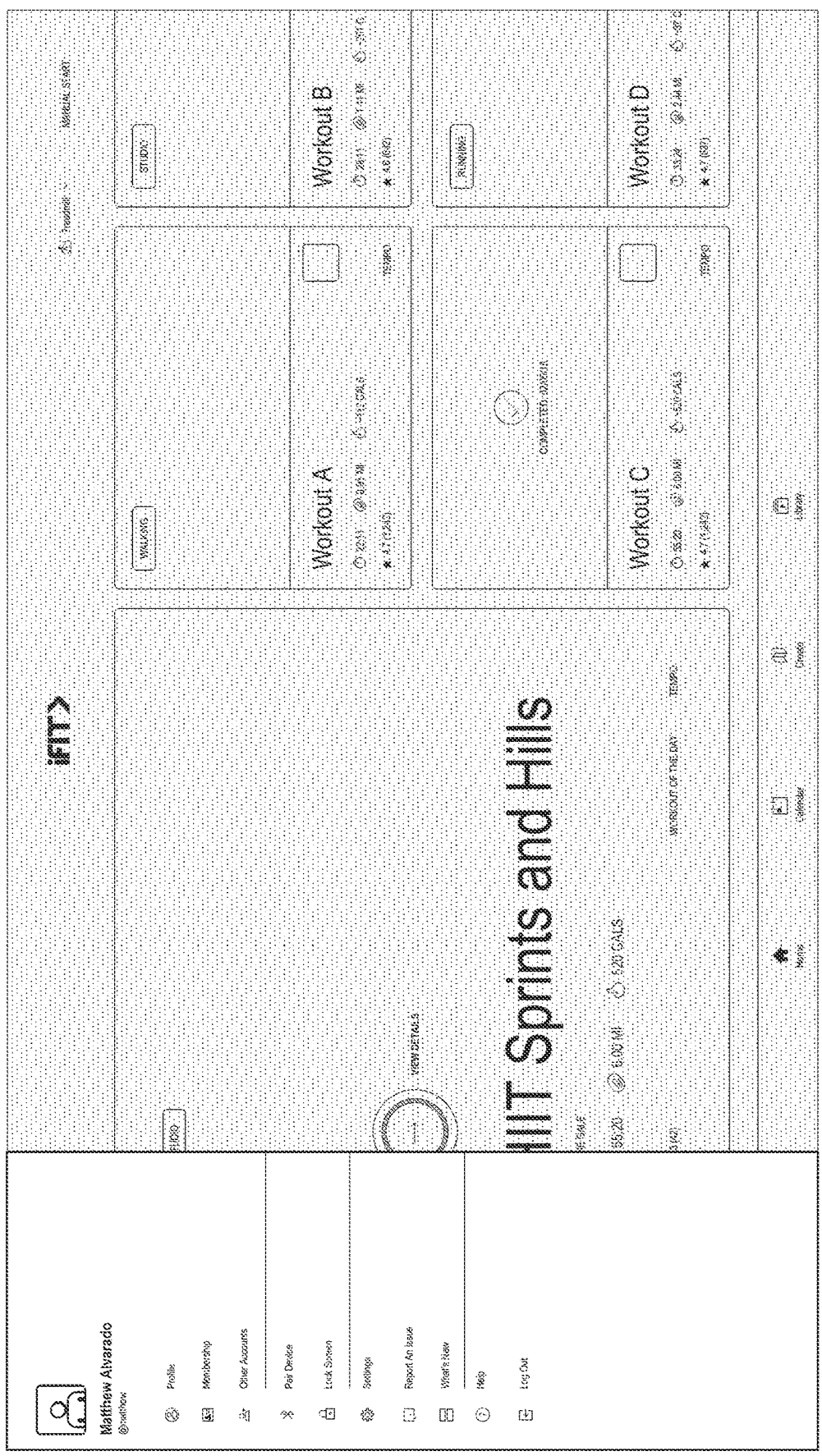
Figure 4Q:
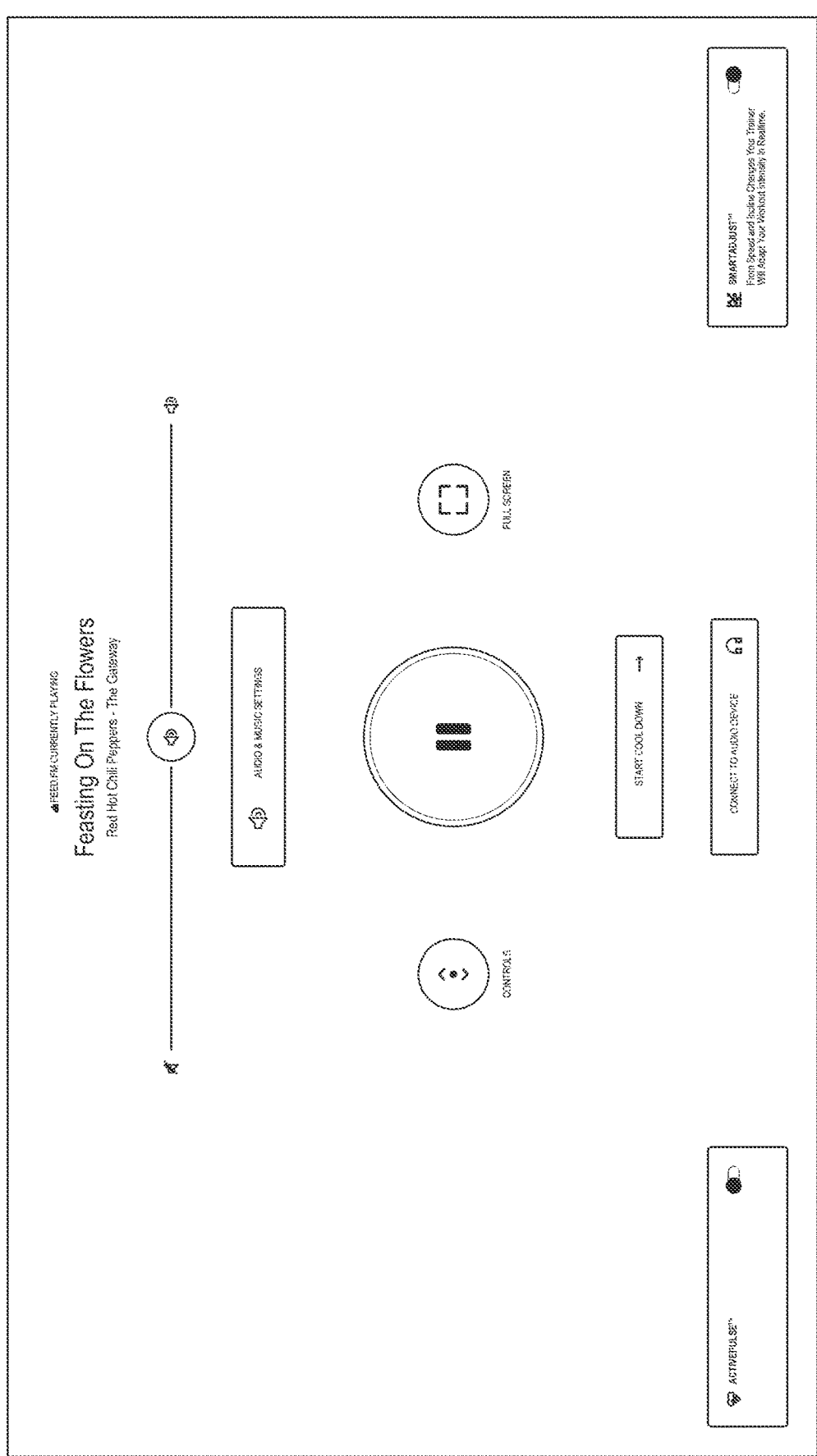
Figure 4R:
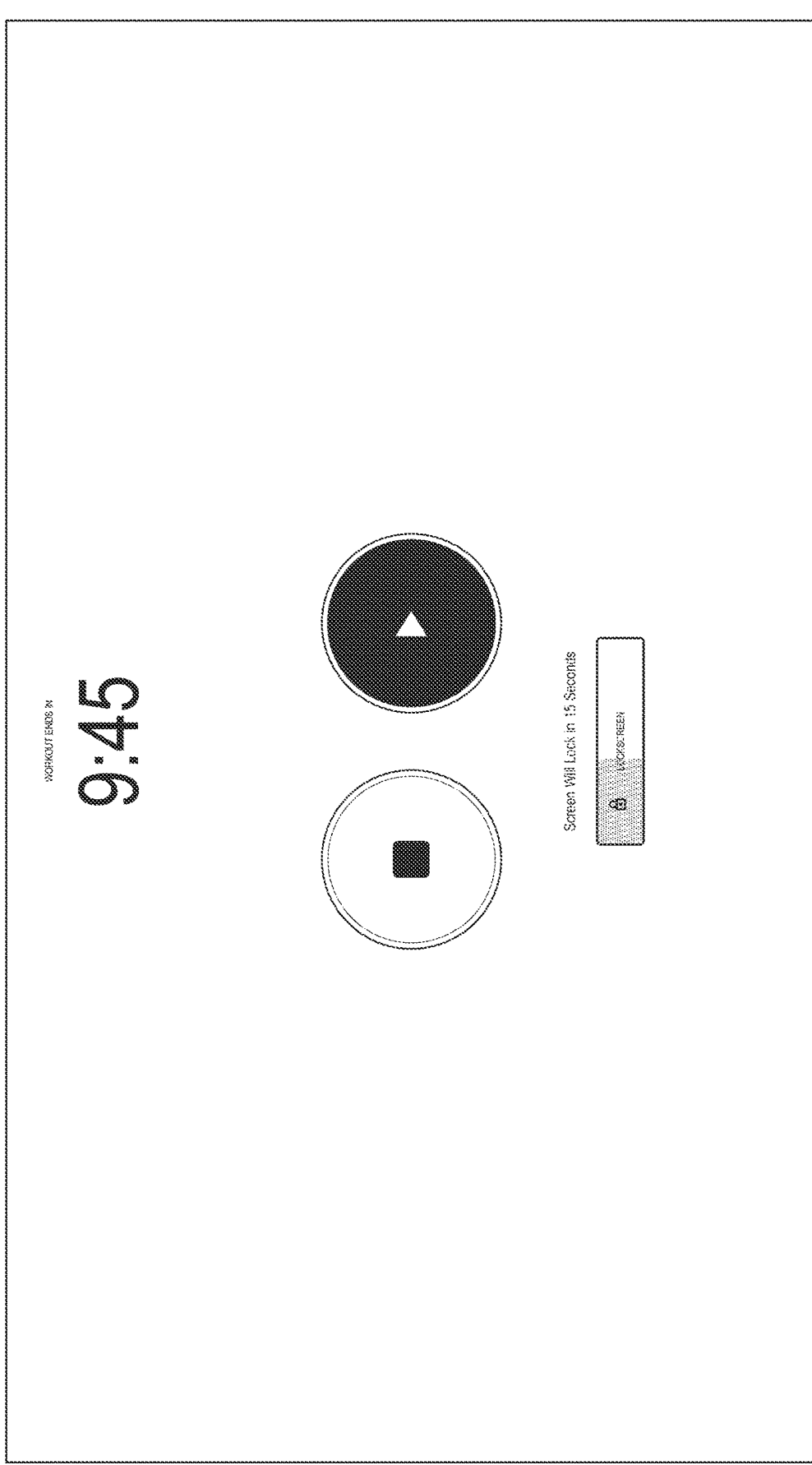

Continuing with the above treadmill lock PIN example, the running belt 126a and/or the running deck 126b of the treadmill 120a may be automatically locked at action 304. This automatic locking may result from various triggers. For example, as disclosed in the screen illustrated in FIG. 4O, this automatic locking may result from a safety key of the treadmill 120a being removed. Alternatively, this automatic locking may result from a timeout on the treadmill 120a (e.g., no user movement, and/or no machine movement, for 5 minutes or 10 minutes). Alternatively, the user 109 may manually lock the treadmill 120a at action 304 rather than the treadmill 120a being automatically locked. For example, from the home screen of the treadmill 120a illustrated in FIG. 4A, the user 109 may select the icon next to the "Hi, Samuel!" label, which may result in the screen of the treadmill 120a illustrated in FIG. 4P that allows the user 109 to choose a "Lock Screen" option that will manually lock the treadmill 120a. In another example, during a workout the user 109 can pause the workout, such as by hitting the pause button in the middle of the screen illustrated in FIG. 4Q. Upon hitting the pause button, the user 109 may be taken to the screen illustrated in FIG. 4R, where the user 109 may manually lock the treadmill 120a by selecting the "LOCK SCREEN" button, or by waiting 15 seconds (or some other timeout period) for the treadmill 120a to automatically lock after the treadmill 120a is manually paused (or automatically paused due to lack of user movement, for example).

Figure 4S:
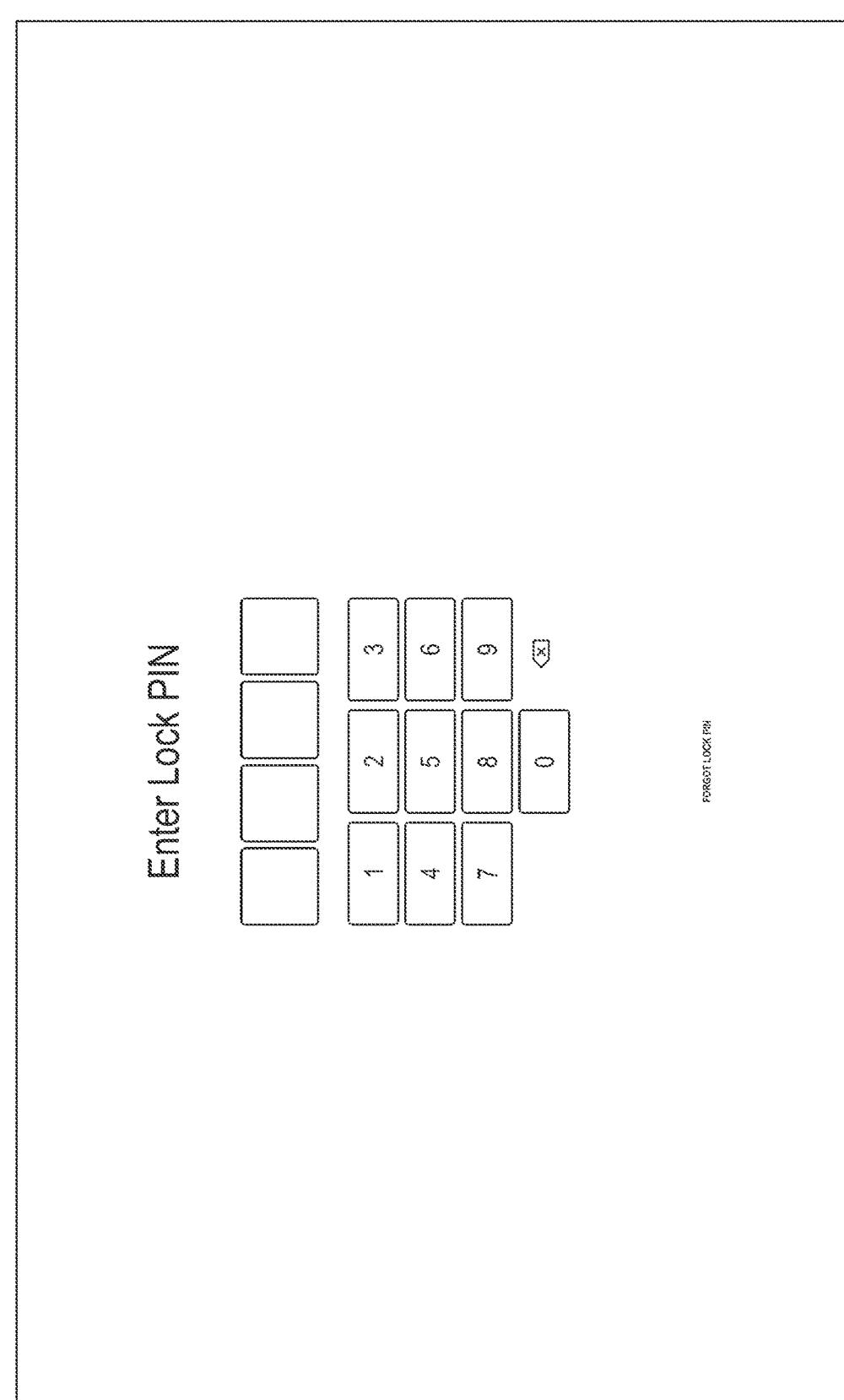

Continuing with the above treadmill lock PIN example, automatically determining whether one of the one or more authorized users is proximate to the treadmill 120a at action 308 may include determining whether the lock PIN is entered correctly. For example, after a safety key has been pulled from the treadmill 120a, resulting in the screen illustrated in FIG. 4O at action 304, the user 109 may reinsert the safety key, which may result in the user 109 being taken to the screen illustrated in FIG. 4S. Alternatively, after the treadmill 120a has been automatically or manually locked, the user 109 may be taken to the screen illustrated in FIG. 4S in response to the user 109 selecting any button or other control of the treadmill 120a, or making any attempt to use the treadmill 120a, such as by the user

Figure 4T:
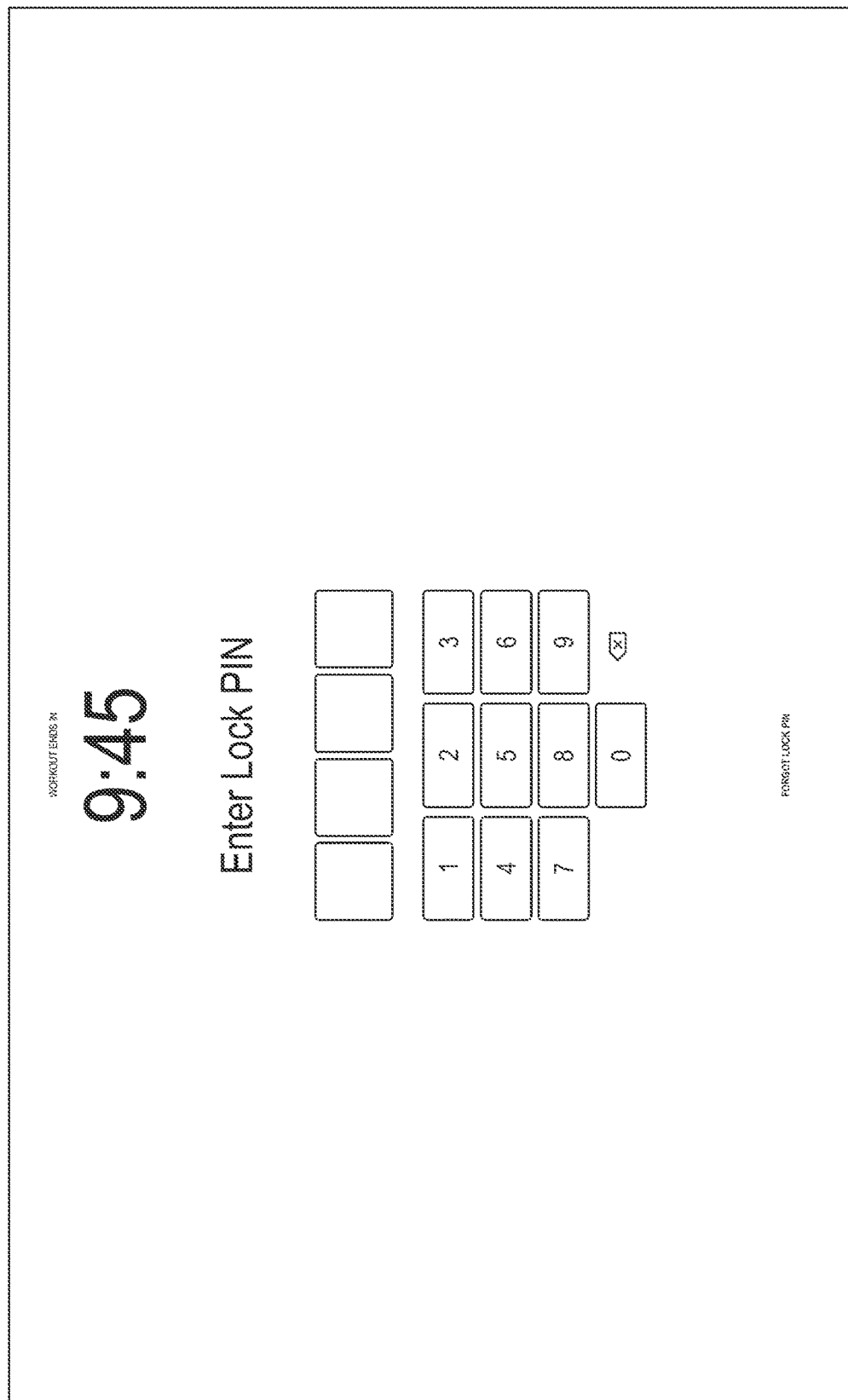
Figure 4U:
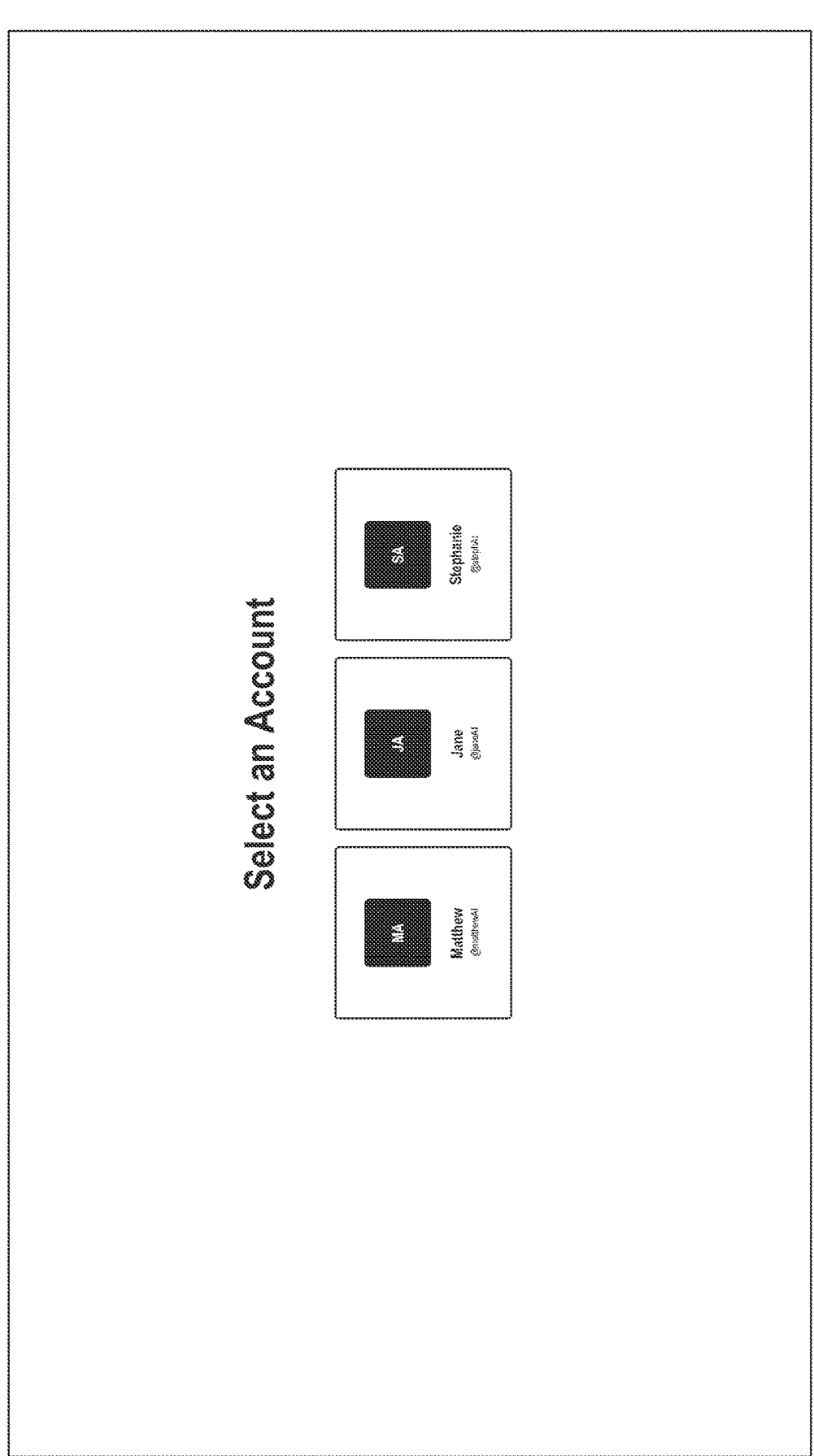
Figure 4V:
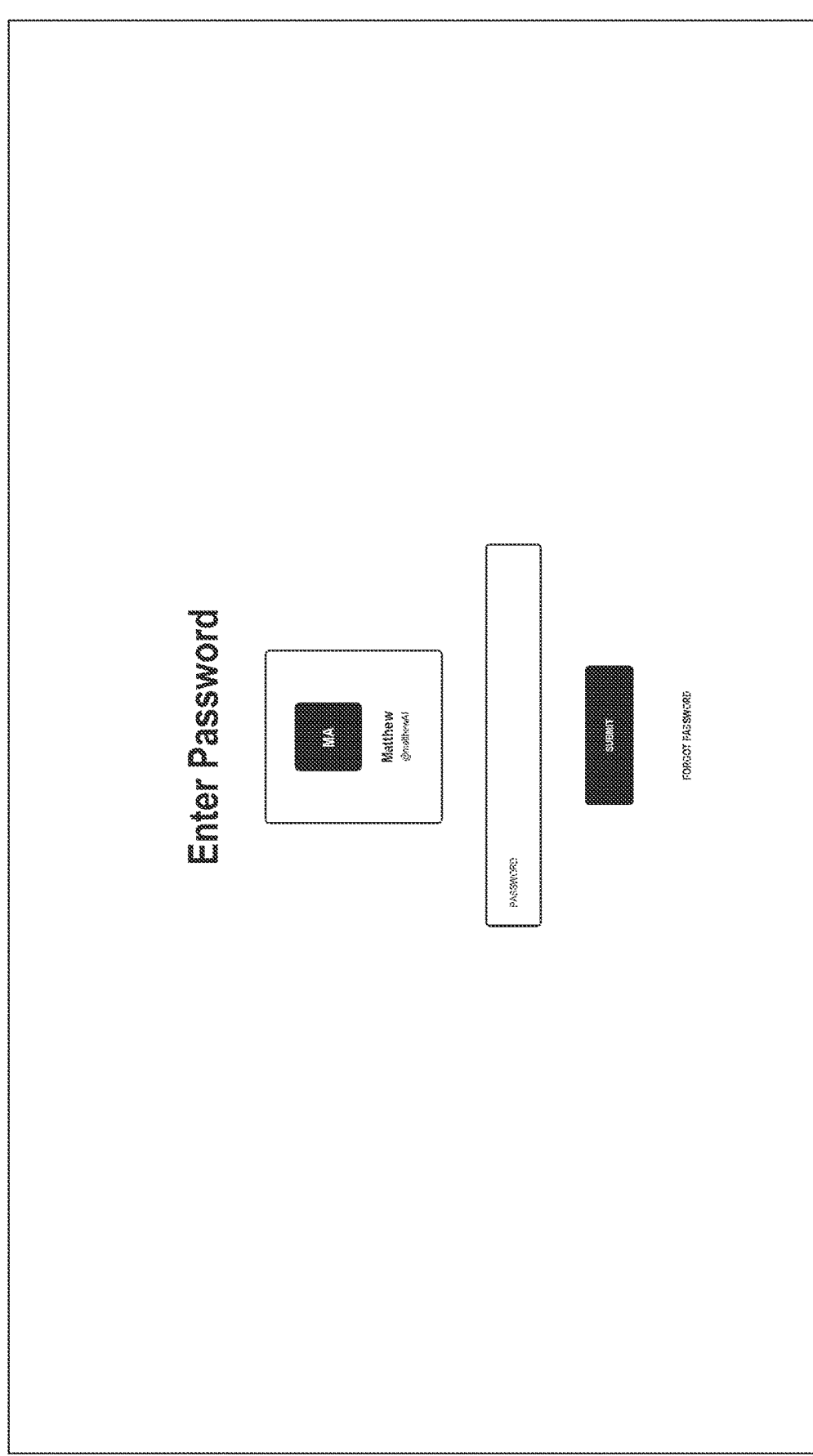

109 attempting to perform a workout at action 306. Then, upon the user 109 correctly entering the lock PIN in the screen illustrated in FIG. 4S, one of the one or more authorized users may be determined to be proximate to the treadmill 120a at action 308, and the method 300 may proceed to action 310, resulting in the unlocking of the treadmill 120a and a return to the workout screen (not shown) or to the home screen illustrated in FIG. 4A. In another example, after the treadmill 120a has been paused and manually or automatically locked, as discussed in connection with FIG. 4R, the user 109 may be presented with the screen illustrated in FIG. 4T, at least until the countdown timer under the "WORKOUT END IN" label at the top of the screen. Then, upon the user 109 correctly entering the lock PIN in the screen illustrated in FIG. 4T, one of the one or more authorized users may be determined to be proximate to the treadmill 120a at action 308, and the method 300 may proceed to action 310, resulting in the unlocking of the treadmill 120a and a return to the workout screen (not shown) or to the home screen illustrated in FIG. 4A. In either FIG. 4S or 4T, if the user 109 selects the "FORGOT LOCK PIN" label, the user 109 may be taken to the screen illustrated in FIG. 4U, where the user 109 can select the account of the user 109, and then taken the screen illustrated in FIG. 4V, where the user 109 may be required to enter their iFIT password prior to the user 109 being allowed to change or reset the lock PIN for the treadmill 120a, such as by being taken to the screen illustrated in FIG. 4I.

Thus, in the above treadmill lock PIN example, a lock PIN may be created and then required in order to unlock the running belt 126a and/or the running deck 126b of the treadmill 120a. In some embodiments, the lock PIN may be specific to the treadmill 120a, or any other stationary exercise machine with a console and an embedded iFIT application (e.g., having screens similar to the screens illustrated in FIGS. 4A-4V). Further, in some embodiments, the lock PIN may be fewer than four digits, or more than four digits, and may include characters other than numbers such as alphanumeric characters and/or emojis. Also, in some embodiments, the lock PIN may be machine-specific, or may be used for multiple machines, such as all machines tied to a particular iFIT account of a particular user. Further, other events may trigger the automatic locking or manually locking of the stationary exercise machine, such as a power cycle (e.g., where the power is turned off and then turned back on), or a screen timeout (e.g., a 5 minute or a ten minute timeout) that may also result in a screen saver being displayed. The lock PIN may be required as the very first screen upon powering up the stationary exercise machine, such as prior to any screen that allows the user to select their iFIT account. In some embodiments, the lock PIN may be removed by a factory reset and/or by an app reset of the stationary exercise machine. Further, although discussed in terms of a treadmill, any other moveable member may be locked, such as pedals and/or a flywheel on an exercise bike or elliptical, handles and/or a flywheel on a rowing machine, etc. Also, in some embodiments, both primary and secondary account holders may set up a lock PIN. Further, in addition to locking a display on a console and moveable members of the stationary exercise machine, the locking of the stationary exercise machine may further lock and/or deactivate (until the lock pin is correctly enters) other physical controls of the stationary exercise machine such as physical buttons, physical switches, physical dials, etc.

Figure 5:
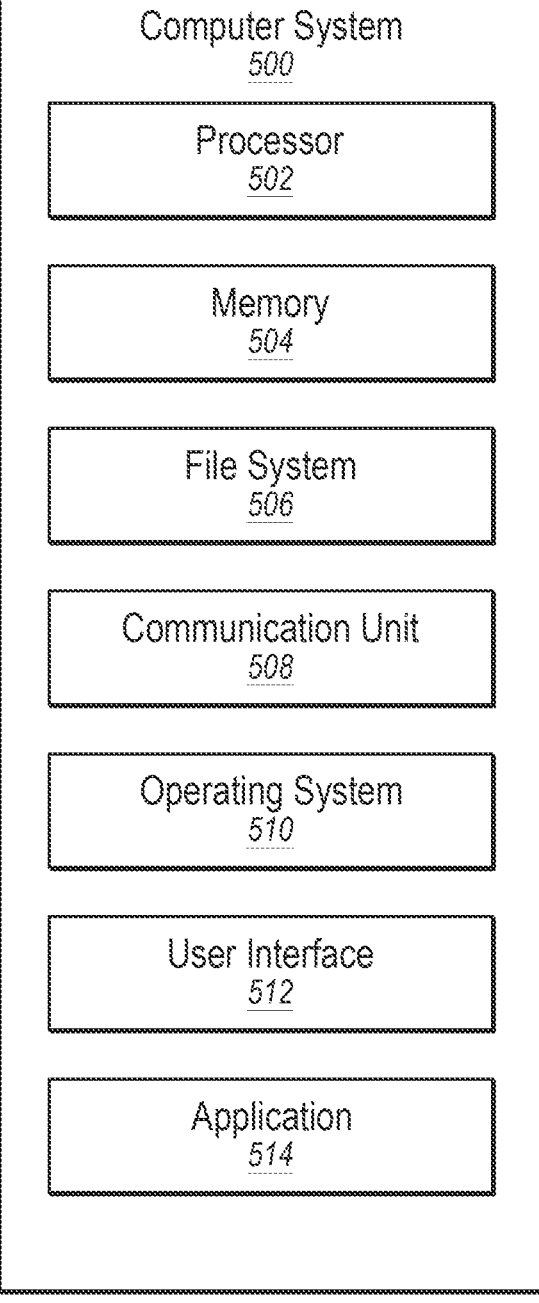
FIG. 5 illustrates an example computer system that may be employed in controlling access to a stationary exercise machine.

FIG. 5 illustrates an example computer system 500 that may be employed in controlling access to a stationary exercise machine. In some embodiments, the computer system 500 may be part of any of the systems or devices described in this disclosure. For example, the computer system 500 may be part of any of the remote server 112, the local server 116, the exercise machines 120*a*-120*d*, the consoles 122*a*-122*d*, or the smartphone 124 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, an exercise machine console, a video camera, or any other computer system.

Generally, the processor 502 may include any computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more actions of the methods disclosed herein.

The memory 504 and the file system 506 may include computer-readable storage media for carrying or having stored thereon computer-executable instructions or data structures. Such computer-readable storage media may be any available non-transitory media that may be accessed by a computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a computer. Combinations of the above may also be included within the scope of computer-readable storage media. Computer-executable instructions may include, for example, instructions and data configured to cause the processor 502 to perform a certain operation or group of operations, such as one or more actions of the methods disclosed herein. These computer-executable instructions may be included, for example, in the operating system 510, in one or more applications, or in some combination thereof.

The communication unit 508 may include any component, device, system, or combination thereof configured to transmit or receive information over a network, such as the network 118 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more actions of the methods disclosed herein. In some embodiments, the application 514 may be part of the operating system 510 or may be part of an application of the computer system 500, or may be some combination thereof. In some embodiments, the application 514 may include a machine learning model. In general, the machine learning model may be trained based on sample data, known as training data, in order to make predictions or decisions without being explicitly programmed to do so. The machine learning model may employ machine learning algorithms, and may be supervised or unsupervised. The machine learning model may be trained over time to become more and more accurate. The machine learning model may be trained, for example, using a Decision Tree, Naive Bayes Classifier, K-Nearest Neighbors, Support Vector Machines, or Artificial Neural Networks. The machine learning model may be employed in any of the methods herein to perform actions with increasing effectiveness and accuracy over time, as the machine learning model learns and is periodically retrained to make more accurate predictions or decisions. For example, any of the actions in the methods disclosed herein, or any other action, may be performed by the machine learning model in order to perform these actions with increasing effectiveness and accuracy over time as the machine learning model learns.

Figure 6:
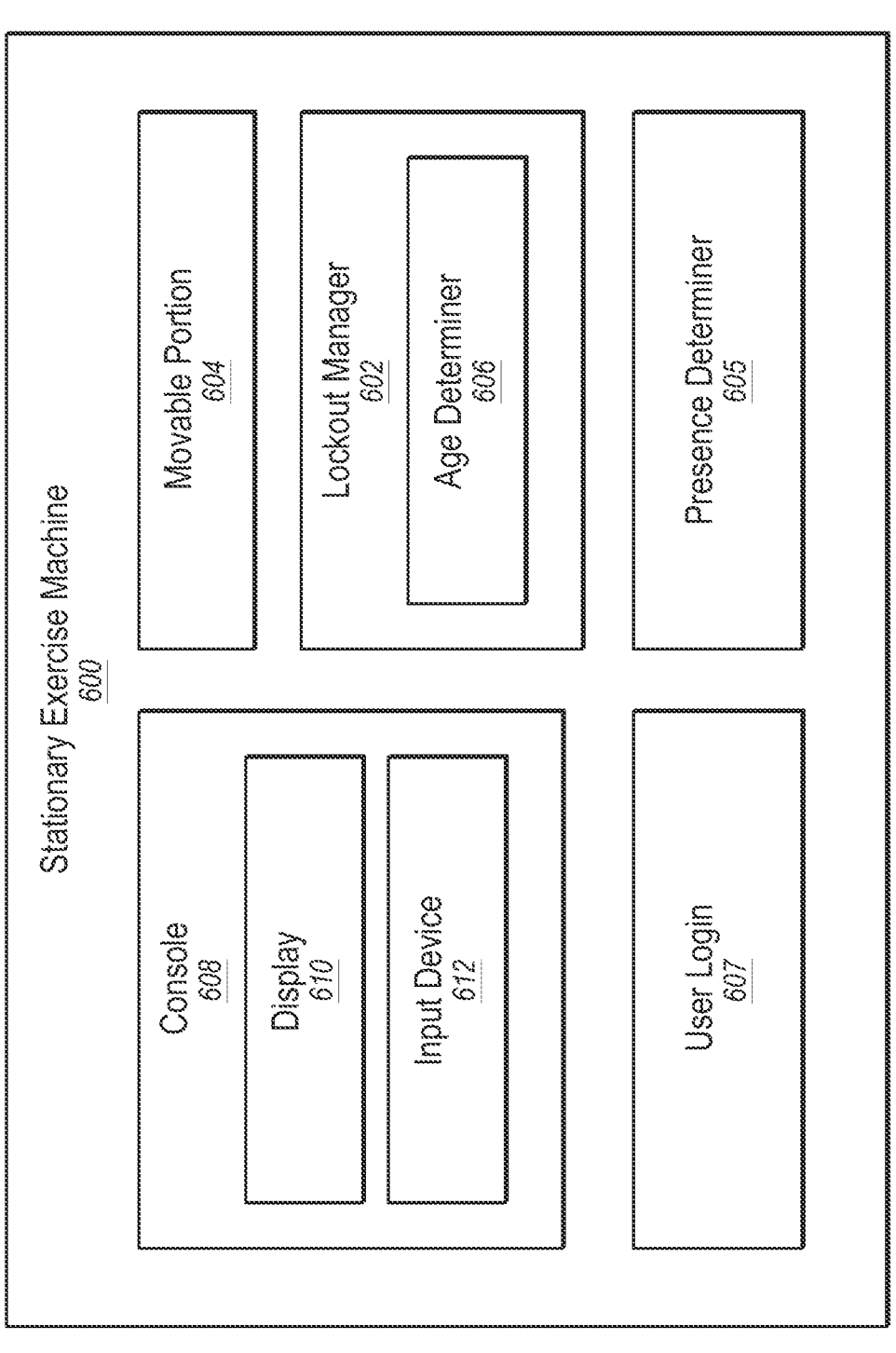
FIG. 6 is a schematic diagram of an stationary exercise machine, according to at least one embodiment of the present disclosure.

FIG. 6 is a representation of a stationary exercise machine 600 having a lockout manager 602 to improve access control, according to at least one embodiment of the present disclosure. The stationary exercise machine 600 may be any type of stationary exercise machine. For example, and as discussed at least partially herein with respect to FIG. 10 through FIG. 13, the stationary exercise machine 600 may be a treadmill, a stationary bicycle, an elliptical device, a rower, a cable machine, any other type of stationary exercise machine 600, and combinations thereof.

The stationary exercise machine 600 may include a movable portion 604. The movable portion 604 may be a portion of the stationary exercise machine that moves when performing an exercise. For example, the movable portion 604 may be a flywheel. In some examples, the movable portion 604 may be a pedal. In some examples, the movable portion 604 may be a handle. In some examples, the movable portion 604 may be a cable. In some examples, the movable portion 604 may be a tread belt. In some examples, the movable portion 604 may be a pulley. In some examples, the movable portion 604 may be a motor. In some examples, the movable portion 604 may be any part of a stationary exercise machine 600 that moves, either during use or otherwise. In some embodiments, a stationary exercise machine 600 may include more than one movable portion 604. For example, a stationary bicycle may include pedals and a flywheel. While embodiments of the present disclosure may discuss locking or lockouts with respect to a movable portion 604 or a single movable portion, it should be understood that the lockout manager 602 may lockout any number of movable portions 604 on the stationary exercise machine 600.

In some embodiments, when the stationary exercise machine 600 is not in use, the lockout manager 602 may lock the movable portion 604 to prevent the movable portion 604 from moving while the stationary exercise machine 600 is not in use. For example, when the stationary exercise machine 600 is in a standby mode, the lockout manager 602 may prevent the movable portion 604 from moving. A standby mode may be a low power mode. For example, in the standby mode, the stationary exercise machine 600 may draw less than 1 W of power. In some embodiments, in the standby mode, the stationary exercise machine 600 may not draw any power. In some embodiments, the stationary exercise machine 600 may automatically enter the standby mode if no input has been received on the stationary exercise machine for a standby period or timeout period, such as 5 s, 10 s, 20 s, 30 s, 1 min, 2 min, 5 min, 10 min, 15 min, 30 min, 1 hour, or longer. In some embodiments, the stationary exercise machine 600 may enter the standby mode after the user has finished an exercise program. In some embodiments, the stationary exercise machine 600 may enter the standby mode after receiving an instruction from the user to enter the standby mode. In some embodiments, the stationary exercise machine 600 may enter the standby mode after receiving an instruction from a remote device, such as a mobile device, a cloud computing server, or other remote device.

In some embodiments, a presence determiner 605 may be configured to detect the presence of a user. The stationary exercise machine may begin to wake up out of the standby mode if the presence determiner 605 determines that a user is present on or near the stationary exercise machine 600. In some embodiments, the presence determiner 605 may utilize input information from the user to determine whether the user is present and/or ready to use the stationary exercise machine. For example, the user may provide an input in an input device 612 on a console 608. The presence determiner 605 may determine that the user is present when the user provides input through the input device 612. In some examples, the presence determiner 605 may receive a signal from a mobile device or other remote computing device indicating that the user will be using the stationary exercise machine. The user may login to the stationary exercise machine 600 remotely using the remote computing device, and the presence determiner may wake up the stationary exercise machine 600 out of standby based on the remotely received login information.

In some embodiments, the presence determiner 605 may include one or more sensors and the presence of the user may be detected using the one or more sensors. For example, the presence determiner 605 may determine that a user is present if a pressure or weight sensor on the stationary exercise machine senses the weight of the user. In some examples, the presence determiner 605 may determine that a user is present if an optical sensor on the stationary exercise machine determines that the user is present based on image recognition patterns of received images. In some examples, the presence determiner 605 may determine that a user is present using any other mechanism.

To prevent a child (or other unauthorized user) from accessing the stationary exercise machine 600 before a user begins an exercise program, the user may verify his or her age with the lockout manager 602. An age determiner 606 on the lockout manager 602 may determine whether the user is above a threshold age (e.g., authorized) to use the stationary exercise machine. If the user is above the threshold age, then the lockout manager 602 may unlock the movable portion 604. This may allow the user to begin his or her exercise program. In many instances, age is associated with maturity and/or good judgment. If the user is above a threshold age, then it is likely that the user will be able to interact with the stationary exercise machine 600 responsibly. In some embodiments, the threshold age may be 6 years, 7 years, 8 years, 9 years, 10 years, 11 years, 12 years, 13 years, 14 years, 15 years, 16 years, 17 years, 18 years, or any value therebetween. In some embodiments, the threshold age may be the same for each stationary exercise machine. In some embodiments, the threshold age may be different for different stationary exercise machines. For example, the threshold age may be higher for a stationary bicycle than for a treadmill, or vice versa.

In some embodiments, the threshold age may be determined by the manufacturer. In some embodiments, the user may set the threshold age using the lockout manager 602. For example, the user may be able to set the threshold age based on any factor, including which children (and their respective ages) may have access to the stationary exercise machine 600, the maturity and judgment of children who have access to the stationary exercise machine 600, the perceived risks of the stationary exercise machine, any other factor, and combinations thereof.

In some embodiments, the age determiner 606 may use any mechanism to determine the age of the user. In some embodiments, the age determiner 606 may determine the age of the user by consulting a database of users. The database of users may have an age or a birthdate associated with each user. When a particular user wishes to use the stationary exercise machine, the user may login to the stationary exercise machine using a user login 607. After logging in, the age determiner 606 may receive the login information and compare the user ID to the age database. If the user is above the threshold age, then the lockout manager 602 may unlock the stationary exercise machine.

In some embodiments, the user login 607 may be any type of user login. For example, the user login 607 may include a user ID and a password or PIN number. In some examples, the user login 607 may include a login device, such as an RFID key fob or other login device. In some examples, the user login 607 may communicate with a mobile device, such as a mobile phone. The user may login to the stationary exercise machine 600 by sending a login request from the mobile device, which may be received at the user login 607. In some embodiments, the user login 607 may be a biometric identifier, such as a fingerprint analyzer, a voice analyzer, a retinal scan, facial scan, any other biometric identifier, and combinations thereof.

In some embodiments, the age determiner 606 may use the biometric identifier to verify the age of the user. For example, the age determiner 606 may use a fingerprint analyzer, a voice analyzer, a retinal scan, facial scan, weight, height, any other biometric identifier, and combinations thereof. When the user registers his or her biometric information with the age determiner 606, the age determiner may identify the user and compare the user's identity with a database including the ages of registered users. In some embodiments, the biometric identifier may not positively identify a user. The biometric identifier may analyze the biometric information for age-based characteristics included within the biometric information provided by the user.

For example, the stationary exercise machine 600 may include a sensor used to measure the user's weight. The age determiner 606 may compare a measured weight of the user against a threshold weight (e.g., 50 lb., 60 lb., 70 lb., 80 lb., 90 lb., 100 lb.,). If the user's weight is not above the threshold weight, the age determiner 606 may determine that the user is not above the threshold age to utilize the stationary exercise machine. In some examples, the stationary exercise machine may include a sensor used to measure the user's height. The age determiner 606 may compare a measured height of the user against a threshold height (e.g., 4 ft., 4.25 ft., 4.5 ft., 4.75 ft., 5.0 ft.). If the user's height is not above the threshold height, the age determiner 606 may determine that the user is not above the threshold height to analyze the stationary exercise machine.

In some embodiments, the age determiner 606 may determine the age of the user by querying the user. In some embodiments, the age determiner 606 may query the user using a console 608 of the stationary exercise machine 600. In some embodiments, the age determiner 606 may query the user using a display 610 of the console 608. For example, the age determiner 606 may provide a graphic on the display 610 that prompts the user to input his or her birthdate. The user may provide the input using an input device 612 on the console 608. If the user's birthdate indicates that the user is above the threshold age, then the lockout manager 602 may unlock the movable portion 604 of the stationary exercise machine 600.

In some embodiments, the query may include any type of query used to determine the age of the user. For example, the query may include a knowledge-based question. The knowledge-based question may include knowledge generally known by people above the threshold age, but generally not known by children below the threshold age. For example, a typical eight-year-old may not know the state capital of various states, and the knowledge-based question may include a query to input state capital for a given state. Other examples of knowledge-based questions include questions about popular culture figures and/or entertainers, science-based questions, questions regarding the government, any other type of knowledge-based question, and combinations thereof.

In some embodiments, the query may include a logic-based question. For example, the logic-based question may include a mathematical problem (e.g., a multiplication, division, simple algebra solve-for-x problem), a riddle, any other logic-based question, and combinations thereof.

In some embodiments, the age determiner 606 may verify the age of the user each time the user wishes to use the stationary exercise machine 600. In some embodiments, the age determiner 606 may verify the age of the user a single time. When the age determiner 606 has verified the user's age, the age determiner 606 may store the verification information. After the user has verified his or her age, the user may login to the stationary exercise machine 600 using the user login 607. When the user logins, the age determiner 606 may receive the user login information from the user login 607 and verify the user's age using the previously stored verification information. This may simplify the verification process while still preventing children from using the stationary exercise machine.

Figure 7:
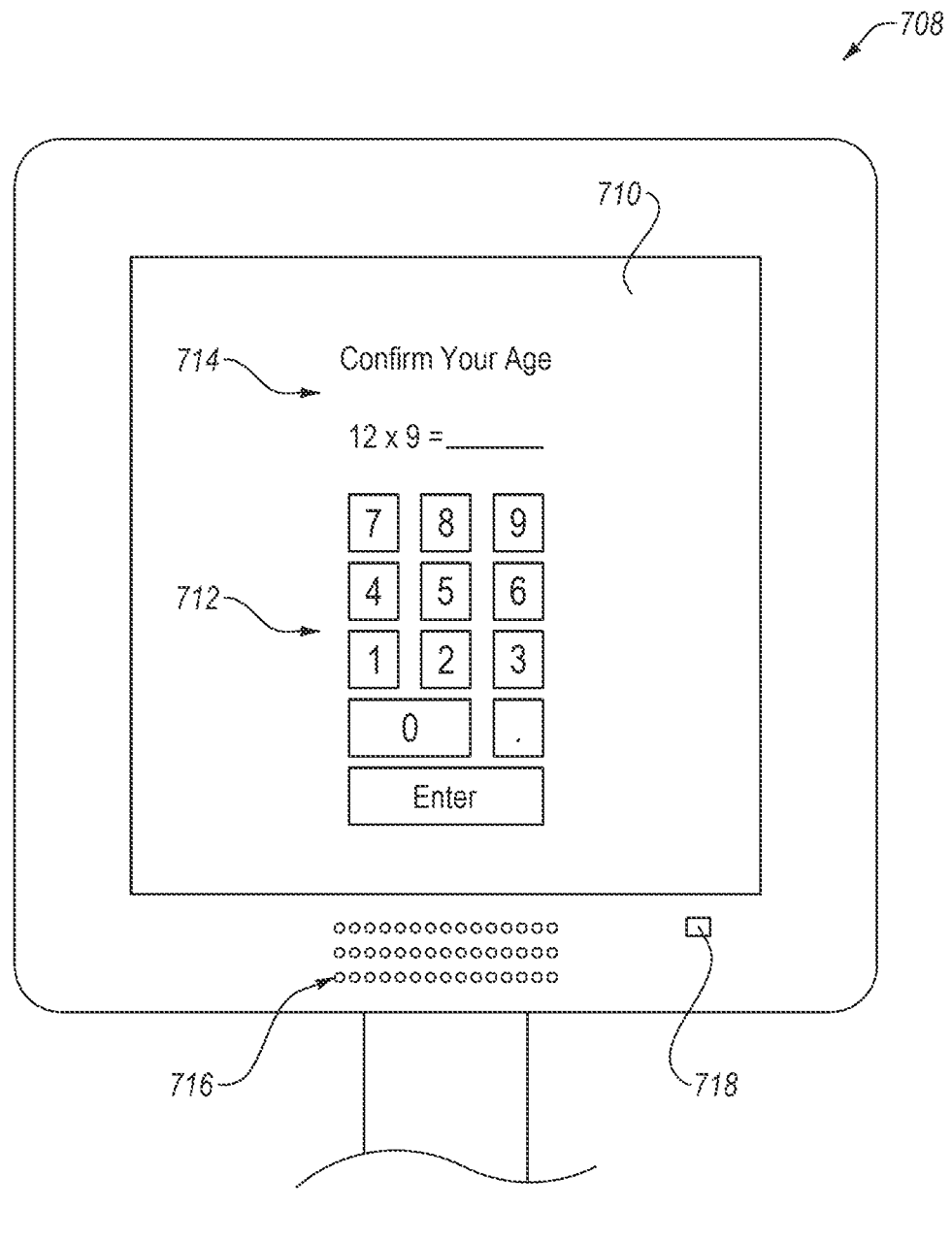
FIG. 7 is a representation of a console, according to at least one embodiment of the present disclosure.

FIG. 7 is a representation of a console 708 for a stationary exercise machine, according to at least one embodiment of the present disclosure. The console 708 includes a display 710. The display 710 shown includes a query 714, which is a mathematical question used to verify the age of the user. To respond to the query 714, the user may input the answer on an input device 712. In the embodiment shown, the display 710 is a touchscreen display, and the input device 712 is a portion of the display 710 that includes interactive icons. To input the answer to the query 714, the user may press on the appropriate portion of the input device 712. For example, in the view shown, the query is a mathematical problem to multiply 12 times 9. To input the answer to this problem, the user may simply press on the 1, the 0, and the 8 symbols, in that order. In some embodiments, this may cause the number 608 to appear on the answer line in the query 714. The age determiner (e.g., the age determiner 606) may then analyze the inputted answer and determine if the user is above the threshold age.

In some embodiments, the console may include one or more speakers 716. In some embodiments, the query 714 may be administered or applied through the speakers 716. For example, the query 714 may include a vocalization (pre-recorded and/or electronically generated) of the words "Confirm your age" and the multiplication problem. In some examples, the query may include instructions regarding how to respond to the query 714.

In some embodiments, the input device may be a microphone 718 and the user may respond to the query using the microphone 718. In some embodiments, the user may respond to the audible query 714 using the microphone 718. In some embodiments, the user may respond to the visual query 714 using the microphone 718.

Figure 8:
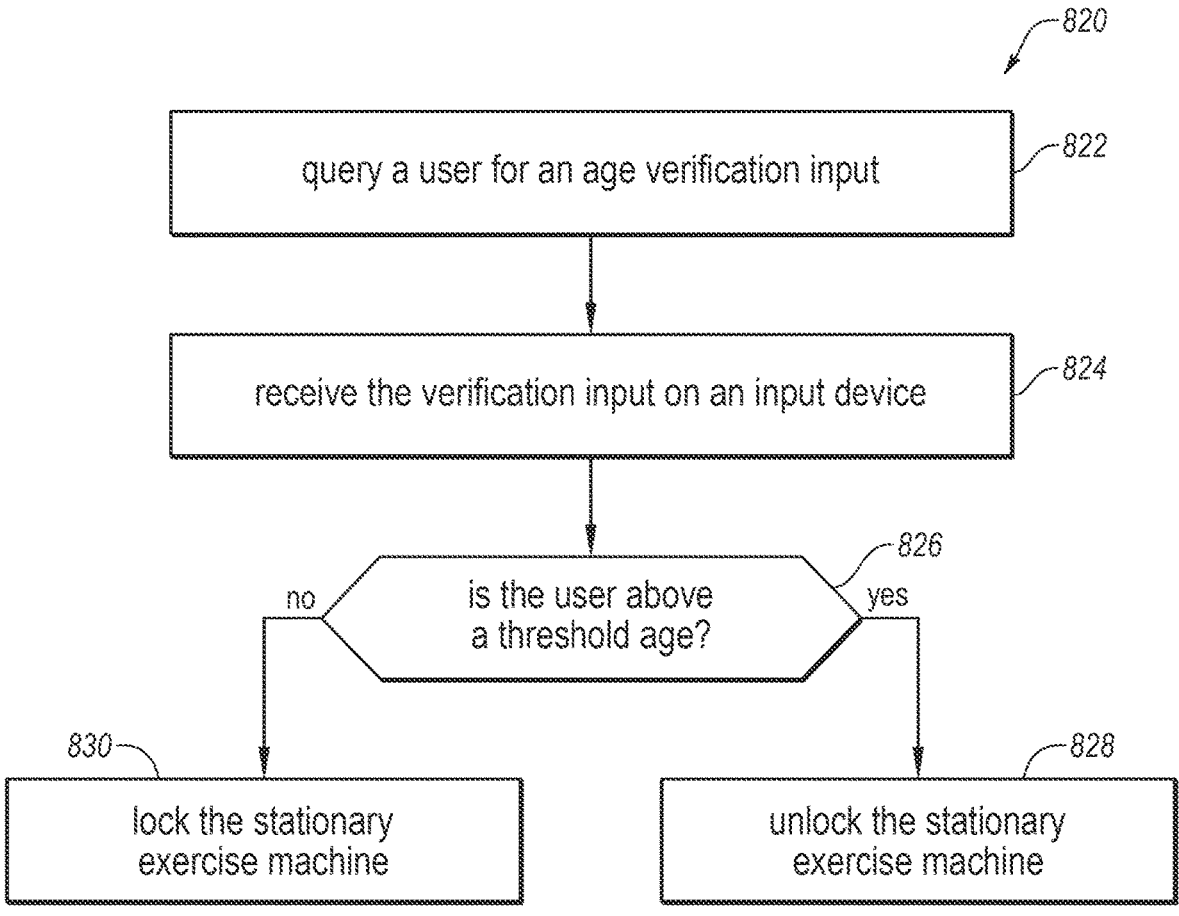
FIG. 8 is a representation of a method for controlling access to an stationary exercise machine, according to at least one embodiment of the present disclosure.

FIG. 8 is a flowchart of a method 820 for controlling access to a stationary exercise machine, according to at least one embodiment of the present disclosure. In accordance with embodiments of the present disclosure, the method 820 may be performed on the stationary exercise machine 600 of FIG. 6. Put another way, the stationary exercise machine 600 of FIG. 6 may implement the method 820 shown in FIG. 8.

The method 820 includes querying a user for an age verification input (e.g., the stationary exercise machine may provide an age verification query) at 822. The query may be presented on a display of the stationary exercise machine and/or presented through a speaker on the stationary exercise machine. In response to the query, a user may provide an age verification input using an input device at 824. In some embodiments, the input device may be any input device, such as a keyboard, a mouse, a touchscreen display, a button on a console, a microphone, a biometric sensor, any other sensor, and combinations thereof. After the user has responded to the query with the age verification input, the stationary exercise machine may determine 826 whether use user is above the threshold age based on the age verification input. For example, the stationary exercise machine may compare the age verification input with a database of potential responses. If the age verification input corresponds with input associated with the threshold age or older, then the stationary exercise machine may determine that the user is above the threshold age.

If the user is above the threshold age, then the stationary exercise machine may be unlocked at 828. For example, the stationary exercise machine may remove a physical block that is preventing a movable portion of the stationary exercise machine from moving. In some embodiments, unlocking the stationary exercise machine may include closing an electrical connection to a motor or a motorized component. If the user is not above the threshold age, then the stationary exercise machine may lock (maintain locked) the stationary exercise machine at 830. In some embodiments, the stationary exercise machine may add a lock or may lock another portion of the stationary exercise machine if the user is not above the threshold age.

Figure 9:
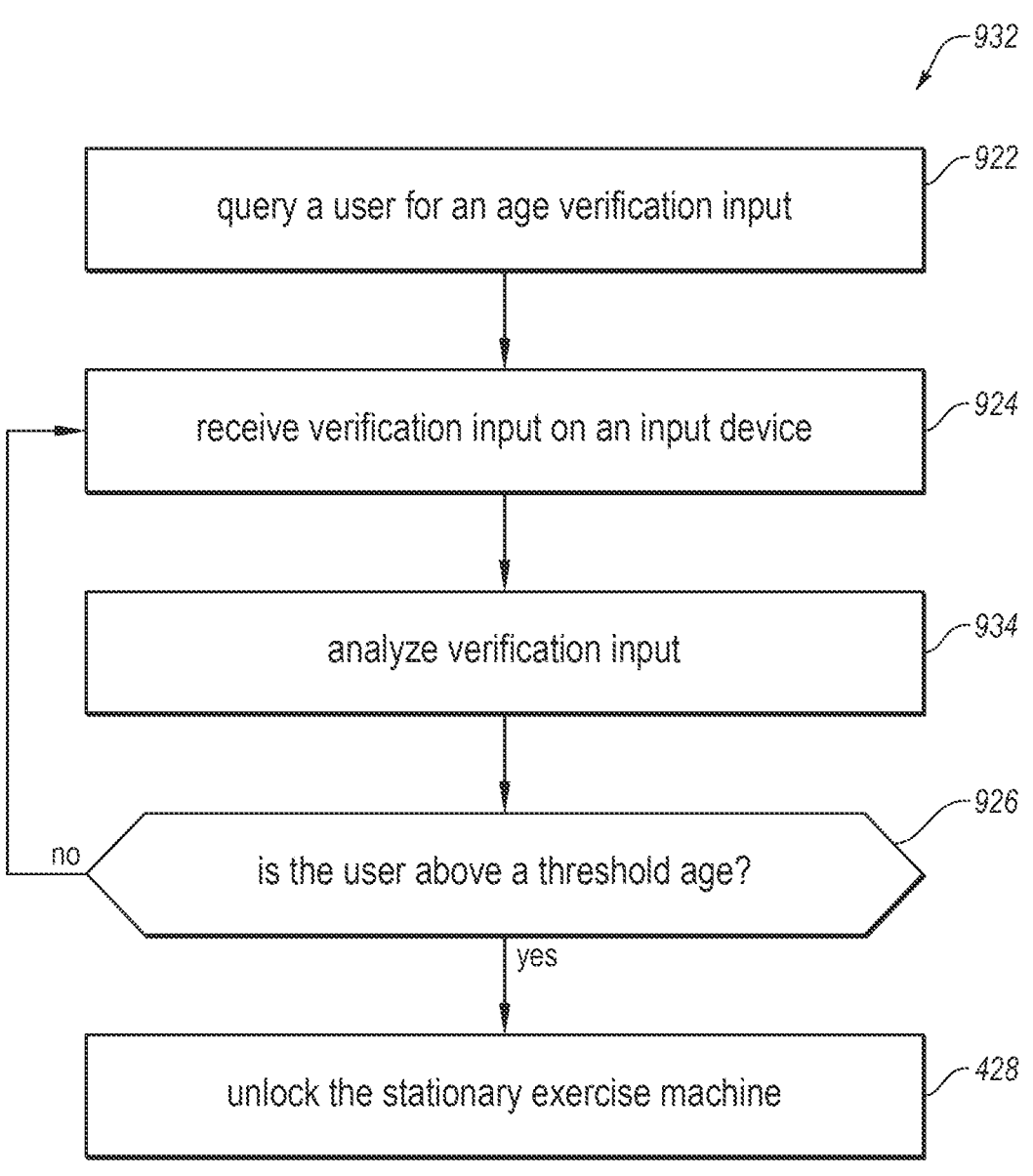
FIG. 9 is a representation of another method for controlling access to an stationary exercise machine, according to at least one embodiment of the present disclosure.

FIG. 9 is a flowchart of a method 942 for controlling access to a stationary exercise machine, according to at least one embodiment of the present disclosure. In accordance with embodiments of the present disclosure, the method 942 may be performed on the stationary exercise machine 600 of FIG. 6. Put another way, the stationary exercise machine 600 of FIG. 6 may implement the method 942 shown in FIG. 9.

The method 942 includes querying a user for an age verification input (e.g., the stationary exercise machine may provide an age verification query) at 922. The query may be presented on a display of the stationary exercise machine and/or presented through a speaker on the stationary exercise machine. In response to the query, a user may provide an age verification input using an input device at 924. In some embodiments, the input device may be any input device, such as a keyboard, a mouse, a touchscreen display, a button on a console, a microphone, a voice activated controller, a biometric sensor, any other sensor, and combinations thereof.

The stationary exercise machine may then analyze the verification input at 944. In some embodiments, analyzing the verification input may include comparing the verification input to a database. In some embodiments, analyzing the verification input may include analyzing elements of the verification input for age-related characteristics (such as threshold weights and/or heights). Based on the analysis, the stationary exercise machine may then determine 926 whether the user is above a threshold age. If the user is above the threshold age, then the stationary exercise machine may be unlocked at 926.

If the user is not above the threshold age, then the stationary exercise machine may provide the user with another query for age verification input at 922. The method 942 may be repeated until the user is verified to be above the threshold age. In some embodiments, the age verification query may be the same at each query. In some embodiments, the age verification query may include different questions or queries. For example, the stationary exercise machine may include a list of age verification questions to ask, and may cycle through the age verification questions.

Figure 10:
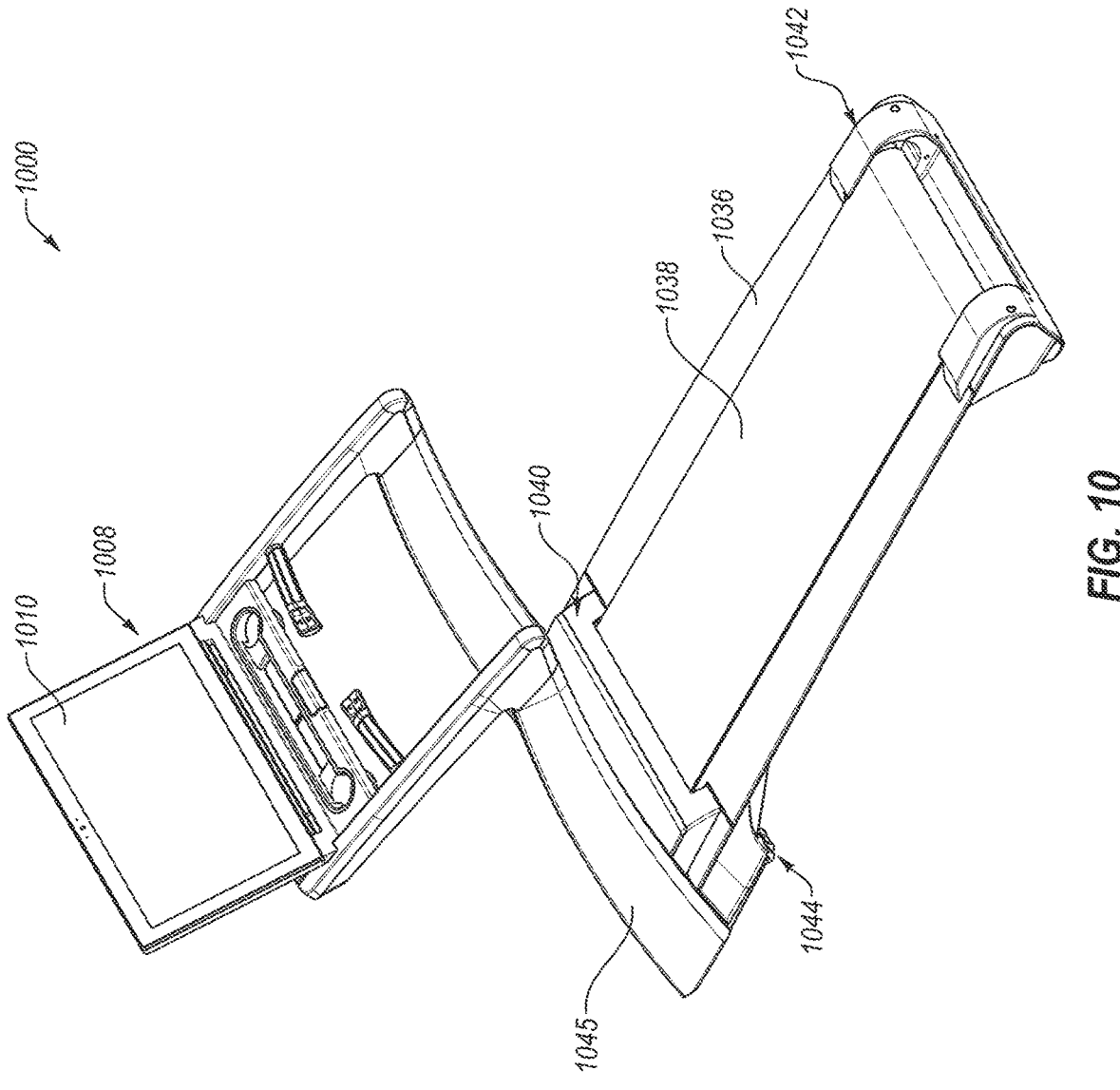
FIG. 10 is a representation of a treadmill, according to at least one embodiment of the present disclosure.

FIG. 10 is a representation of a treadmill 1000, according to at least one embodiment of the present disclosure. The treadmill 1000 includes a tread deck 1036. A tread belt 1038 is strung around the tread deck 1036 between a front end 1040 and a rear end 1042. A console 1008 is supported above the tread deck 1036 using one or more posts 1045. The console 1008 includes a display 1010.

During use, the tread belt 1038 may rotate about the tread deck 1036. A user standing on the tread belt 1038 may walk or run forward to avoid falling off the rear end 1042. The tread belt 1038 may rotate about one or more pulleys. For example, a front pulley may be located at the front end 1040 and a rear pulley may be located at the rear end 1042. During operation, to rotate the tread belt 1038, a motor may rotate one or both of the front pulley at the front end 1040 or the rear pulley at the rear 1042. The incline angle of the deck relative to the surface on which the treadmill 1000 is placed may be adjusted using an incline mechanism 1044. Thus, as may be seen, the treadmill 1000 includes multiple movable portions, including the tread belt 1038, the front pulley, the rear pulley, the motor, any linkages between the motor and the pulleys, the incline mechanism 1044, any other movable portion of the treadmill 1000, and combinations thereof.

While the treadmill 1000 is in a standby mode, the movable portions discussed above may be locked to prevent movement. In some embodiments, the lock may be a physical lock. For example, the lock may be a physical obstruction (e.g., a brake, a rod inserted into a hole or a detent) on the pulleys, the tread belt 1038, the motor, the lift mechanism 1044, any other movable portion, and combinations thereof. In some embodiments, the lock may be an electrical lock. For example, the motor may have an electrical circuit, and the circuit to power the motor may be closed when the treadmill 1000 verifies the user's age (e.g., when the age determiner 606 of FIG. 6 determines that the user's age is above the threshold age). This may help prevent the treadmill 1000 from being operated by an underage child.

Figure 11:
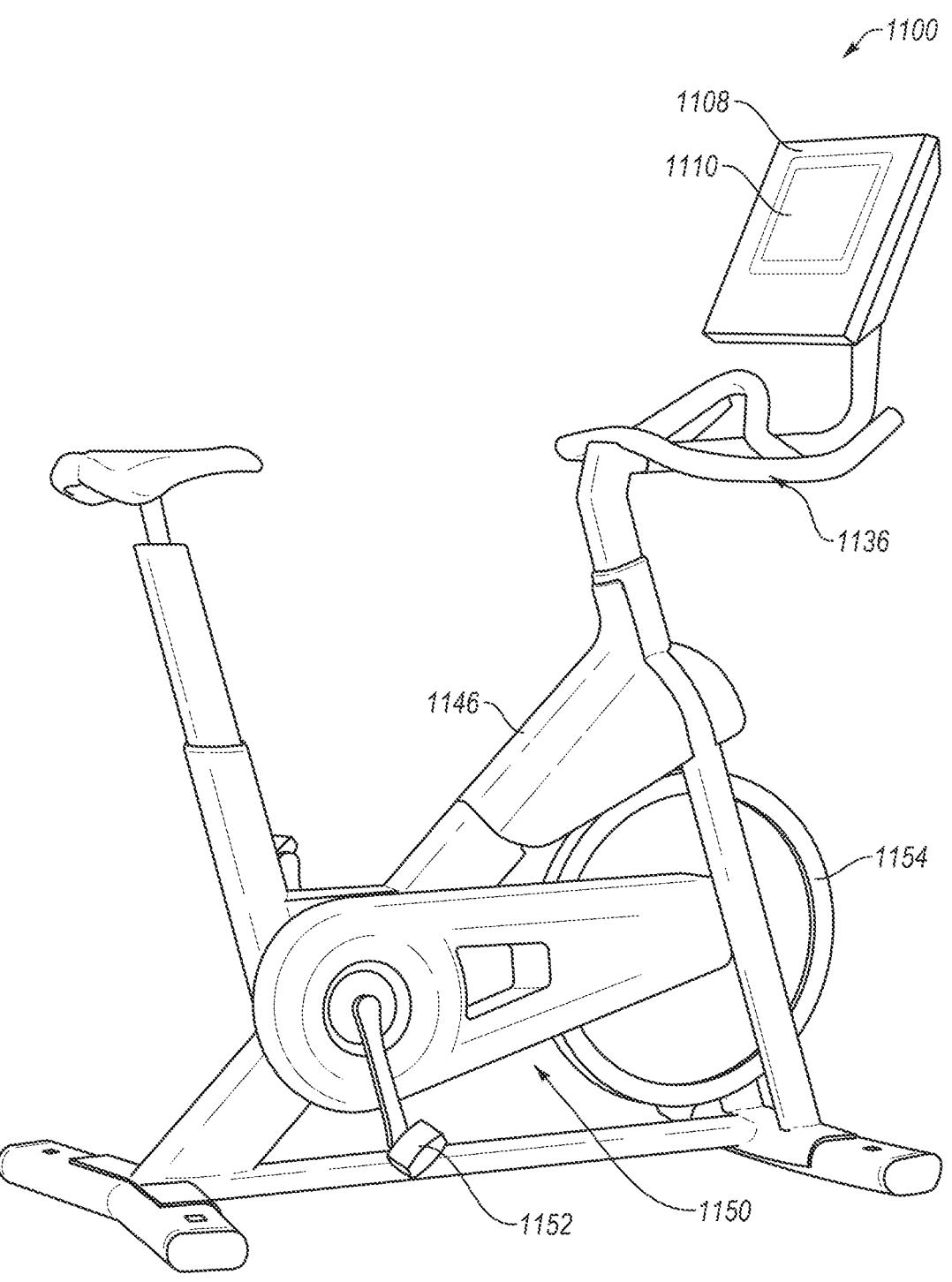
FIG. 11 is a representation of a stationary bicycle, according to at least one embodiment of the present disclosure.

FIG. 11 is a representation of a stationary bicycle 1100, according to at least one embodiment of the present disclosure. The stationary bicycle includes a frame 1146. A console 1108 having a display 1110 may be connected to the frame 1146. The console 1108 may be located at or include the handlebars 1136. A drivetrain 1150 may include one or more pedals 1152 that rotate a flywheel 1154.

During use, a user may apply a torque to the pedals 1152, which may cause the flywheel 1154 to rotate. The torque applied to the pedals 1152 may be varied by changing the resistance to rotation of the flywheel 1154 and/or by changing a gear ratio in the drivetrain 1150 between the pedals 1152 and the flywheel 1154. Thus, the stationary bicycle 1100 includes movable portions, including the drivetrain 1150, the pedals 1152, the flywheel 1154, any other movable portion, and combinations thereof.

When the stationary bicycle 1100 is in a standby mode, the movable portions discussed above may be locked. In some embodiments, the lock may be a physical lock. For example, a resistance mechanism for the flywheel 1154 may be applied to significantly reduce or prevent rotation of the flywheel 1154. Put another way, the lock prevents rotation of the flywheel 1154. In some embodiments, the lock may include an obstruction inserted into the flywheel 1154, the pedals 1152, or other portion of the drivetrain 1150 to prevent rotation of the movable portions. When the stationary bicycle 1100 verifies the user's age (e.g., when the age determiner 606 of FIG. 6 determines that the user's age is above the threshold age), the lock may be removed such that the movable portions may be moved and the stationary bicycle 1100 used.

Figure 12:
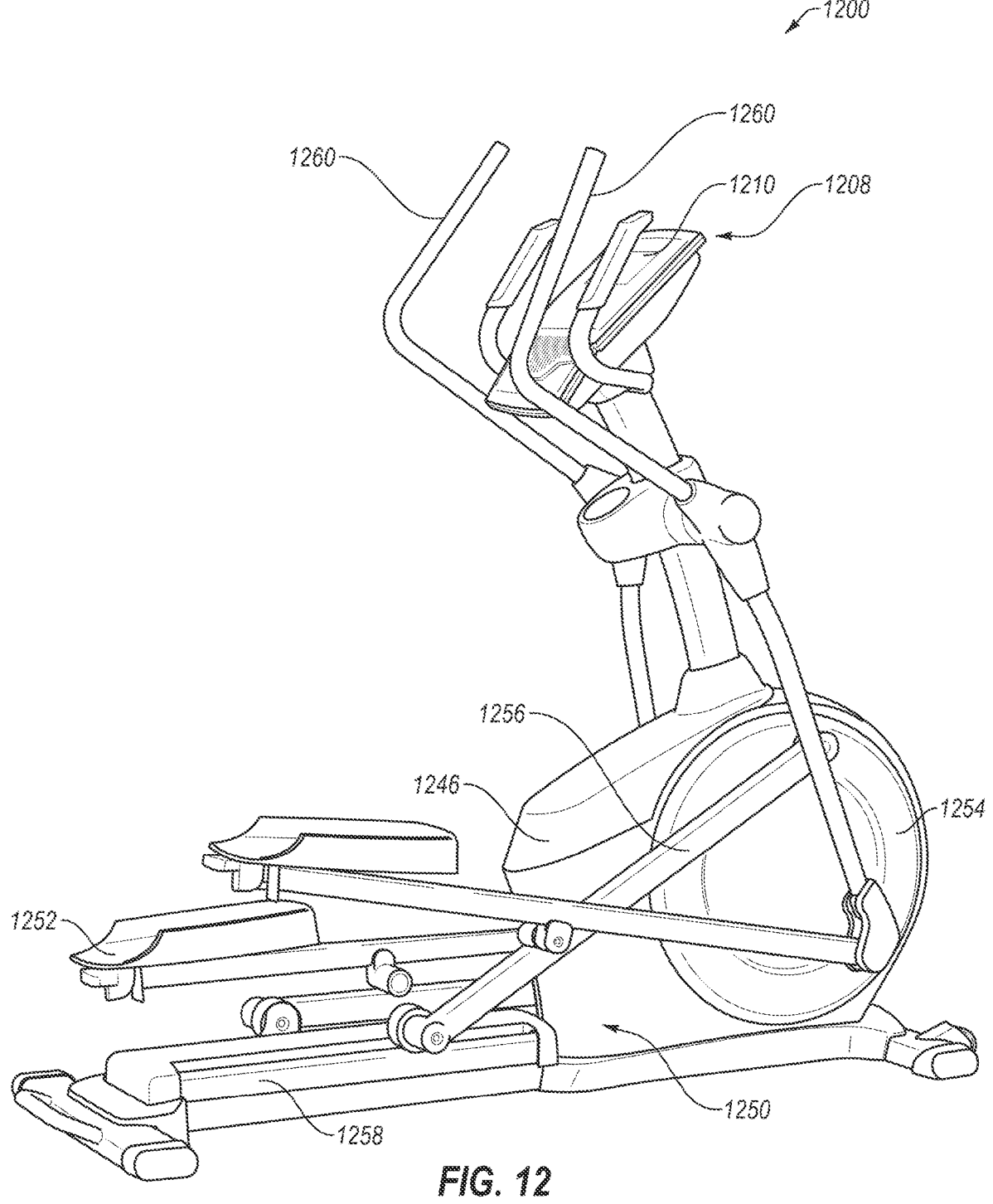
FIG. 12 is a representation of an elliptical machine, according to at least one embodiment of the present disclosure.

FIG. 12 is a representation of an elliptical machine 1200, according to at least one embodiment of the present disclosure. The elliptical machine 1200 includes a frame 1246. A drivetrain 1250 may include one or more pedals 1252 connected to a flywheel 1254 via one or more linkages 1256. As the pedals 1252 are depressed, the pedals may slide back and forth on a track 1258. One or more handles 1260 may be connected to the linkages 1256 and move in concert with the pedals 1252.

During operation, the user may depress the pedals 1252. This may cause the flywheel 1254 to rotate and the handles 1260 to move back and forth. The force required to depress the pedals may be varied by changing the resistance to rotation of the flywheel. Thus, the elliptical machine 1200 includes multiple movable portions, including the drivetrain 1250, the pedals 1252, the flywheel 1254, the linkages 1256, the handles 1260, any other movable portion, and combinations thereof.

When the elliptical machine 1200 is in a standby mode, the movable portions discussed above may be locked. For example, a resistance mechanism for the flywheel 1254 may be applied to significantly reduce or prevent rotation of the flywheel 1254. Any movement of the flywheel 1254 is reflected throughout the drivetrain. Preventing movement of the flywheel 1254 may help to prevent movement of the pedals 1252, the linkages 1256, the handles 1260, any other movable portion, and combinations thereof. When the elliptical machine 1200 verifies the user's age (e.g., when the age determiner 606 of FIG. 6 determines that the user's age is above the threshold age), the lock may be removed such that the movable portions may be moved and the elliptical machine 1200 may be used.

Figure 13:
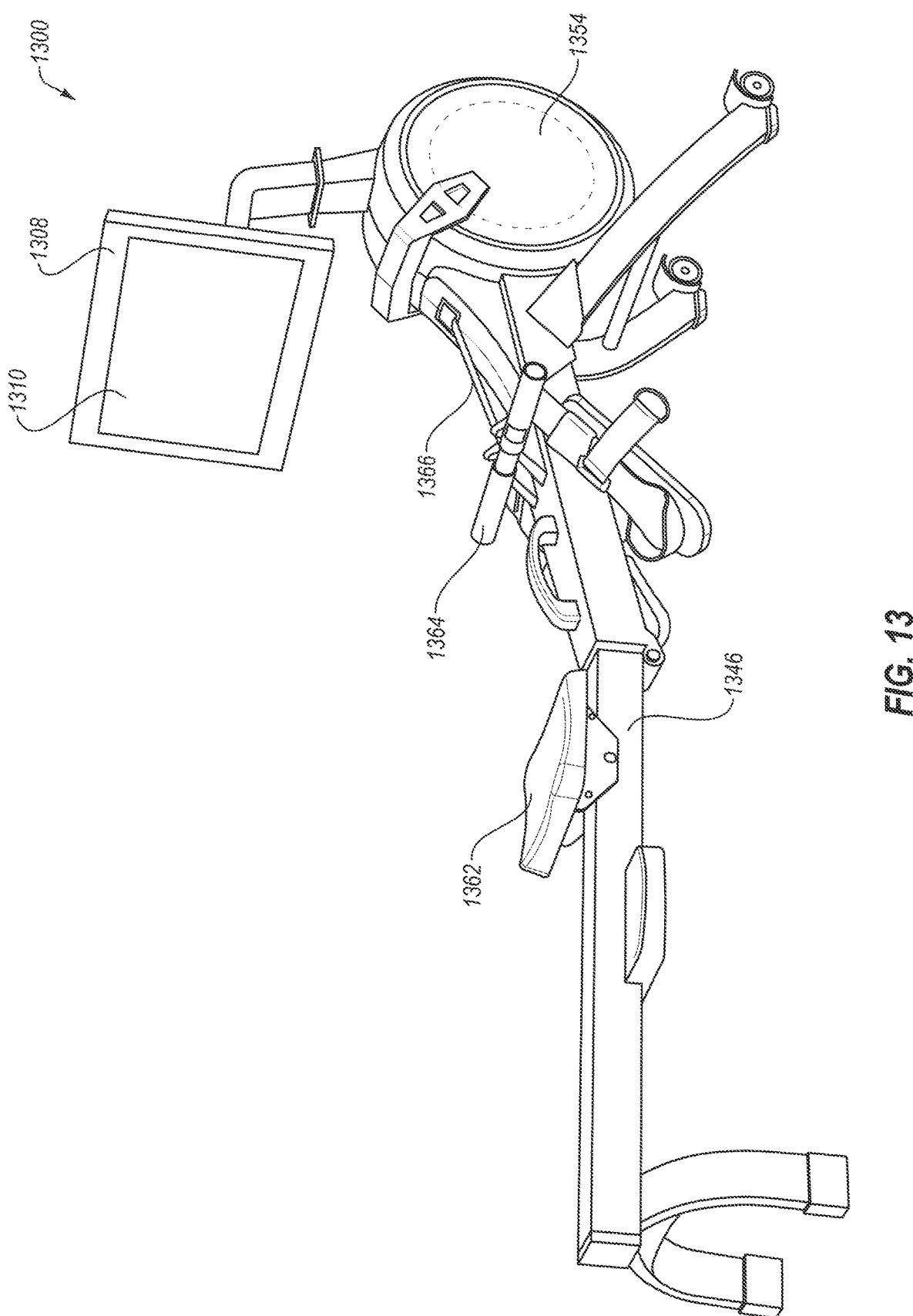
FIG. 13 is a representation of a rower, according to at least one embodiment of the present disclosure.

FIG. 13 is a representation of a rower 1300, according to at least one embodiment of the present disclosure. The rower 1300 shown includes a frame 1346 with a console 1308 having a display 1310 connected to the frame 1346. A flywheel 1354 is connected to the frame 1346. A seat 1362 may slide back and forth on the frame 1346. A handle 1364 may be connected to a cable 1366, and the cable 1366 may be connected to the flywheel 1354 such that when the cable 1366 is extended, the flywheel 1354 may be rotated.

During operation, the user may sit on the seat 1362 and pull on the handle 1364. This may cause the cable 1366 to extend away from the flywheel 1354, thereby causing the flywheel 1354 to rotate. As the user extends the cable 1366, the user may slide backwards on the seat. Thus, the rower 1300 includes multiple movable portions, including the flywheel 1354, the seat 1362, the handle 1364, the cable 1366, any other movable portion, and combinations thereof.

When the rower 1300 is in a standby mode, the movable portions discussed above may be locked. For example, the seat 1362 may be locked with a lock to prevent the seat 1362 from moving. In some examples, a resistance mechanism may be applied to reduce or prevent the flywheel 1354 from rotating, which may prevent the handle 1364 from extending the cable 1366. In some embodiments, the handle 1364 and/or the cable 1366 may be secured to a portion of the frame 1346. When the rower 1300 verifies the user's age (e.g., when the age determiner 606 of FIG. 6 determines that the user's age is above the threshold age), the lock may be removed such that the movable portions may be moved and the rower 1300 may be used.

Figure 14:
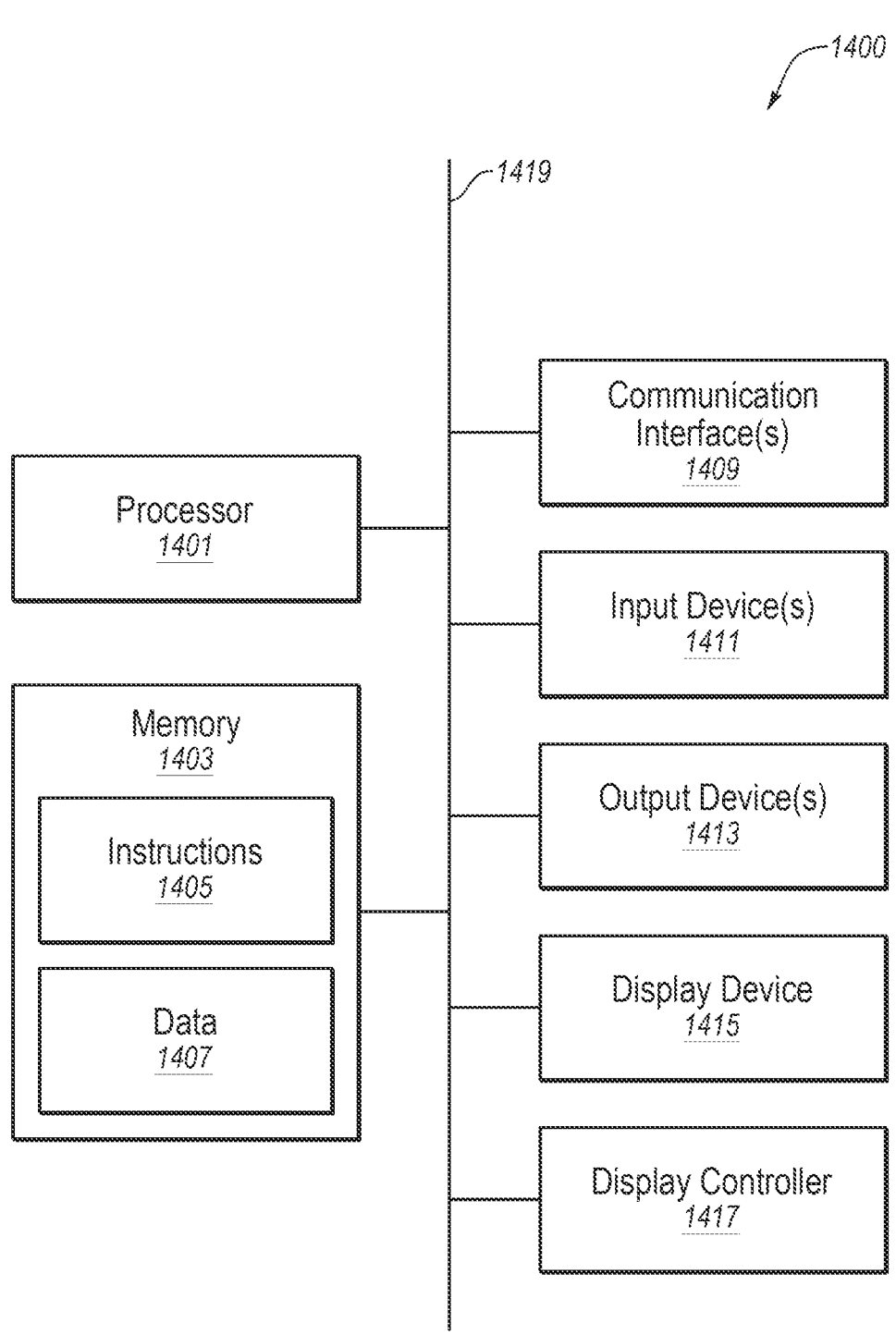
FIG. 14 is a representation of a computing system, according to at least one embodiment of the present disclosure.

FIG. 14 illustrates certain components that may be included within a computer system 1419. One or more computer systems 1419 may be used to implement the various devices, components, and systems described herein, such as by being integrated into any of the stationary exercise machines disclosed herein.

The computer system 1419 includes a processor 1401. The processor 1401 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1401 may be referred to as a central processing unit (CPU). Although just a single processor 1401 is shown in the computer system 1419 of FIG. 14, in an alternative configuration, a combination of processors (e.g., an ARM and DSP) could be used.

The computer system 1419 also includes memory 1403 in electronic communication with the processor 1401. The memory 1403 may be any electronic component capable of storing electronic information. For example, the memory 1403 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1405 and data 1407 may be stored in the memory 1403. The instructions 1405 may be executable by the processor 1401 to implement some or all of the functionality disclosed herein. Executing the instructions 1405 may involve the use of the data 1407 that is stored in the memory 1403. Any of the various examples of modules and components described herein may be implemented, partially or wholly, as instructions 1405 stored in memory 1403 and executed by the processor 1401. Any of the various examples of data described herein may be among the data 1407 that is stored in memory 1403 and used during execution of the instructions 1405 by the processor 1401.

A computer system 1419 may also include one or more communication interfaces 1409 for communicating with other electronic devices. The communication interface(s) 1409 may be based on wired communication technology, wireless communication technology, or both. Some examples of communication interfaces 1409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1419 may also include one or more input devices 1411 and one or more output devices 1413. Some examples of input devices 1411 include a keyboard, mouse, microphone, remote control device, button, joystick, trackball, touchpad, and lightpen. Some examples of output devices 1413 include a speaker and a printer. One specific type of output device that is typically included in a computer system 1419 is a display device 1415. Display devices 1415 used with embodiments disclosed herein may utilize any suitable image projection technology, such as liquid crystal display (LCD), light-emitting diode (LED), gas plasma, electroluminescence, or the like. A display controller 1417 may also be provided, for converting data 1407 stored in the memory 1403 into text, graphics, and/or moving images (as appropriate) shown on the display device 1415.

The various components of the computer system 1419 may be coupled together by one or more buses, which may include a power bus, a control signal bus, a status signal bus, a data bus, etc. For the sake of clarity, the various buses are illustrated in FIG. 14 as a bus system 1419.

IINDUSTRIAL APPLICABILITY

Various modifications to the embodiments illustrated in the drawings, and/or additional embodiments, will now be disclosed.

In general, some embodiments disclosed herein may include methods for controlling access to a stationary exercise machine. By only allowing one or more authorized users in proximity to a stationary exercise machine to unlock the one or more movable members of the stationary exercise machine, embodiments disclosed herein can prevent unauthorized users in close proximity to the stationary exercise machine from causing the one or more movable members to automatically move or to be moved by the unauthorized user. For example, in the case of a treadmill, example embodiments disclosed herein may only allow an authorized user to cause the running belt of the treadmill to be rotated, but prevent unauthorized children and/or pets who live in the home from intentionally or unintentionally causing the running belt of the treadmill to be rotated.

Although various actions of the methods disclosed herein are generally discussed in terms of being performed by a remote server (e.g., a remote server of IFIT.com), it is understood that various actions of the methods disclosed here disclosed herein may be performed by a local device or local application without necessarily having any communication with a remote server. For example, a local treadmill itself may run a local app that locally locks the local treadmill and only locally unlocks the local treadmill when the local app determines that an authorized user is proximate to the treadmill.

Further, although the example stationary exercise machines disclosed herein include a treadmill, an elliptical machine, a rower machine, and an exercise bike, it is understood that any other stationary exercise machine may benefit from the methods disclosed herein. Examples include Pilates machines, cable machines, stair climber machines, skier machines, and smart mirror machines.

Further, although the example methods disclosed herein are disclosed in terms of locking one or more moveable members of the stationary exercise machine, it is understood that other components associated with the stationary exercise machine may additionally or alternatively be locked. For example, a power supply may be locked (e.g., to prevent the stationary exercise machine from being powered on), a console of the stationary exercise machine may be locked (e.g., to prevent access to data displayed on a display of the console, or to prevent access to input controls of the console), speakers may be locked (e.g., to prevent the stationary exercise machine from making sounds), or a door to a room may be locked (e.g., to prevent a room in which the stationary exercise machine is located from being accessed).

Further, although the example methods disclosed herein are disclosed in terms of one or more particular authorized users, it is understood that in some embodiments the methods may be performed for any user that has authorized characteristics. In some embodiments, authorized characteristics may include a minimum user height, a minimum user weight, a minimum user age, a minimum user fitness level, or any other authorized characteristic. Then, the methods disclosed herein may be performed to determine whether any user with the one or more authorized characteristics is proximate to the stationary exercise machine, rather than whether one or more particular authorized users are proximate to the stationary exercise machine. For example, an authorized characteristic may be that a user must be at least 18 years old to use a treadmill. In this example, if it can be determined that any user that is at least 18 years old is proximate to the treadmill, then the treadmill may be unlocked to allow a workout to be performed on the treadmill.

Further, some embodiments disclosed herein relate to devices, systems, and methods for a child lock on a stationary exercise machine. When the stationary exercise machine senses that a user has mounted or attempted to begin using the stationary exercise machine, the stationary exercise machine may prompt the user to verify his or her age. If the user verifies his or her age, the stationary exercise machine may be unlocked and the user may begin an exercise. If the user fails to verify his or her age, the stationary exercise machine may remain locked until the user is able to verify his or her age. This may help to prevent a child from playing on the stationary exercise machine, thereby limiting access to the child.

In some embodiments, the age verification prompt may be any mechanism for age verification. For example, the age verification prompt may be a prompt for the user to enter his or her age. In some examples, the age verification prompt may be a prompt for the user to enter a password. In some examples, the age verification prompt may be a quiz, such as a knowledge-based and/or a logic-based quiz. In some embodiments, the age verification prompt may be a biometric prompt, such as a retinal scan, a voice analyzer, a fingerprint analyzer, any other biometric prompt, and combinations thereof. In some embodiments, the age verification prompt may be any other prompt, and any combination of the prompts discussed herein.

Providing age verification before use of the stationary exercise machine may help to improve the access control of the stationary exercise machine. For example, the stationary exercise machine may be locked out such that any moving part on the stationary exercise machine is prevented from moving. Thus, while the stationary exercise machine is not in use, accidental or unintended movement of the stationary exercise machine by a child may be prevented. In this manner, a home user may be able to store the stationary exercise machine without worry about children accessing the stationary exercise machine.

In some embodiments, a stationary exercise machine having a lockout manager to improve user access control, may be any type of stationary exercise machine. For example, the stationary exercise machine may be a treadmill, a stationary bicycle, an elliptical device, a rower, a cable machine, any other type of stationary exercise machine, and combinations thereof.

The stationary exercise machine may include a movable portion. The movable portion may be a portion of the stationary exercise machine that moves when performing an exercise. For example, the movable portion may be a flywheel. In some examples, the movable portion may be a pedal. In some examples, the movable portion may be a handle. In some examples, the movable portion may be a cable. In some examples, the movable portion may be a tread belt. In some examples, the movable portion may be a pulley. In some examples, the movable portion may be a motor. In some examples, the movable portion may be any part of a stationary exercise machine that moves, either during use or otherwise. In some embodiments, a stationary exercise machine may include more than one movable portion. For example, a stationary bicycle may include pedals and a flywheel. While embodiments of the present disclosure may discuss locking or lockouts with respect to a movable portion or a single movable portion, it should be understood that the lockout manager may lockout any number of movable portions on a stationary exercise machine.

In some embodiments, when the stationary exercise machine is not in use, the lockout manager may lock the movable portion to prevent the movable portion from moving while the stationary exercise machine is not in use. For example, when the stationary exercise machine is in a standby mode, the lockout manager may prevent the movable portion from moving. A standby mode may be a low power mode. For example, in the standby mode, the stationary exercise machine may draw less than 1 W of power. In some embodiments, in the standby mode, the stationary exercise machine may not draw any power. In some embodiments, the stationary exercise machine may automatically enter the standby mode if no input has been received on the stationary exercise machine for a standby period, such as 5 s, 10 s, 20 s, 30 s, 1 min, 2 min, 5 min, 10 min, 15 min, 30 min, 1 hour, or longer. In some embodiments, the stationary exercise machine may enter the standby mode after the user has finished an exercise program. In some embodiments, the stationary exercise machine may enter the standby mode after receiving an instruction from the user to enter the standby mode. In some embodiments, the stationary exercise machine may enter the standby mode after receiving an instruction from a remote device, such as a mobile device, a cloud computing server, or other remote device.

In some embodiments, a presence determiner may be configured to detect the presence of a user. The stationary exercise machine may begin to wake up out of the standby mode if the presence determiner determines that a user is present on or near the stationary exercise machine. In some embodiments, the presence determiner may utilize input information from the user to determine whether the user is present and/or ready to use the stationary exercise machine. For example, the user may provide an input in an input device on a console. The presence determiner may determine that the user is present when the user provides input through the input device. In some examples, the presence determiner may receive a signal from a mobile device or other remote computing device indicating that the user will be using the stationary exercise machine. The user may login to the stationary exercise machine remotely using the remote computing device, and the presence determiner may wake up the stationary exercise machine out of standby based on the remotely received login information.

In some embodiments, the presence determiner may include one or more sensors and the presence of the user may be detected using the one or more sensors. For example, the presence determiner may determine that a user is present if a pressure or weight sensor on the stationary exercise machine senses the weight of the user. In some examples, the presence determiner may determine that a user is present if an optical sensor on the stationary exercise machine determines that the user is present based on image recognition patterns of received images. In some examples, the presence determiner may determine that a user is present using any other mechanism.

To prevent a child (or other unauthorized user) from accessing the stationary exercise machine 600 before a user begins an exercise program, the user may verify his or her age with the lockout manager. An age determiner on the lockout manager may determine whether the user is above a threshold age (e.g., authorized) to use the stationary exercise machine. If the user is above the threshold age, then the lockout manager may unlock the movable portion. This may allow the user to begin his or her exercise program. In many instances, age is associated with maturity and/or good judgment. If the user is above a threshold age, then it is likely that the user will be able to interact with the stationary exercise machine responsibly. In some embodiments, the threshold age may be 6 years, 7 years, 8 years, 9 years, 10 years, 11 years, 12 years, 13 years, 14 years, 15 years, 16 years, 17 years, 18 years, or any value therebetween. In some embodiments, the threshold age may be the same for each stationary exercise machine. In some embodiments, the threshold age may be different for different stationary exercise machines.

For example, the threshold age may be higher for a stationary bicycle than for a treadmill.

In some embodiments, the threshold age may be determined by the manufacturer. In some embodiments, the user may set the threshold age using the lockout manager. For example, the user may be able to set the threshold age based on any factor, including which children (and their respective ages) may have access to the stationary exercise machine, the maturity and judgment of children who have access to the stationary exercise machine, the perceived risks of the stationary exercise machine, any other factor, and combinations thereof.

In some embodiments, the age determiner may use any mechanism to determine the age of the user. In some embodiments, the age determiner may determine the age of the user by consulting a database of users. The database of users may have an age or a birthdate associated with each user. When a particular user wishes to use the stationary exercise machine, the user may login to the stationary exercise machine using a user login. After logging in, the age determiner may receive the login information and compare the user ID to the age database. If the user is above the threshold age, then the lockout manager may unlock the stationary exercise machine.

In some embodiments, the user login may be any type of user login. For example, the user login may include a user ID and a password or PIN number. In some examples, the user login may include a login device, such as an RFID key fob or other login device. In some examples, the user login may communicate with a mobile device, such as a mobile phone. The user may login to the stationary exercise machine by sending a login request from the mobile device, which may be received at the user login. In some embodiments, the user login may be a biometric identifier, such as a fingerprint analyzer, a voice analyzer, a retinal scan, facial scan, any other biometric identifier, and combinations thereof.

In some embodiments, the age determiner may use the biometric identifier to verify the age of the user. For example, the age determiner may use a fingerprint analyzer, a voice analyzer, a retinal scan, facial scan, weight, height, any other biometric identifier, and combinations thereof. When the user registers his or her biometric information with the age determiner, the age determiner may identify the user and compare the user's identity with a database including the ages of registered users. In some embodiments, the biometric identifier may not positively identify a user. The biometric identifier may analyze the biometric information for age-based characteristics included within the biometric information provided by the user.

For example, the stationary exercise machine may include a sensor used to measure the user's weight. The age determiner may compare a measured weight of the user against a threshold weight (e.g., 50 lb., 60 lb., 70 lb., 80 lb., 90 lb., 100 lb.,). If the user's weight is not above the threshold weight, the age determiner 606 may determine that the user is not above the threshold age to utilize the stationary exercise machine. In some examples, the stationary exercise machine may include a sensor used to measure the user's height. The age determiner may compare a measured height of the user against a threshold height (e.g., 4 ft., 4.25 ft., 4.5 ft., 4.75 ft., 5.0 ft.). If the user's height is not above the threshold height, the age determiner may determine that the user is not above the threshold height to analyze the stationary exercise machine.

In some embodiments, the age determiner may determine the age of the user by querying the user. In some embodiments, the age determiner may query the user using a console of the stationary exercise machine. In some embodiments, the age determiner may query the user using a display of the console. For example, the age determiner may provide a graphic on the display that prompts the user to input his or her birthdate. The user may provide the input using an input device on the console. If the user's birthdate indicates that the user is above the threshold age, then the lockout manager may unlock the movable portion of the stationary exercise machine.

In some embodiments, the query may include any type of query used to determine the age of the user. For example, the query may include a knowledge-based question. The knowledge-based question may include knowledge generally known by people above the threshold age, but generally not known by children below the threshold age. For example, a typical eight-year-old may not know the state capital of various states, and the knowledge-based question may include a query to input state capital for a given state. Other examples of knowledge-based questions include questions about popular culture figures and/or entertainers, science-based questions, questions regarding the government, any other type of knowledge-based question, and combinations thereof.

In some embodiments, the query may include a logic-based question. For example, the logic-based question may include a mathematical problem (e.g., a multiplication, division, simple algebra solve-for-x problem), a riddle, any other logic-based question, and combinations thereof.

In some embodiments, the age determiner may verify the age of the user each time the user wishes to use the stationary exercise machine. In some embodiments, the age determiner may verify the age of the user a single time. When the age determiner has verified the user's age, the age determiner may store the verification information. After the user has verified his or her age, the user may login to the stationary exercise machine using the user login. When the user logins, the age determiner may receive the user login information from the user login and verify the user's age using the previously stored verification information. This may simplify the verification process while still preventing children from using the stationary exercise machine.

In some embodiments, a console for a stationary exercise machine includes a display. In some embodiments, the display may include a query, which may be a mathematical question used to verify the age of the user. To respond to the query, the user may input the answer on an input device. In some embodiments, the display may be a touchscreen display, and the input device is a portion of the display that includes interactive icons. To input the answer to the query, the user may press on the appropriate portion of the input device. For example, the query may be a mathematical problem to multiply 12 times 9. To input the answer to this problem, the user may simply press on the 1, the 0, and the 8 symbols, in that order. In some embodiments, this may cause the number 608 to appear on the answer line in the query. The age determiner may then analyze the inputted answer and determine if the user is above the threshold age.

In some embodiments, the console may include one or more speakers. In some embodiments, the query may be administered or applied through the speakers. For example, the query may include a vocalization (pre-recorded and/or electronically generated) of the words "Confirm your age" and the multiplication problem. In some examples, the query may include instructions regarding how to respond to the query.

In some embodiments, the input device may be a microphone and the user may respond to the query using the microphone. In some embodiments, the user may respond to the audible query using the microphone. In some embodiments, the user may respond to the visual query using the microphone.

In some embodiments, a method 820 controlling access to a stationary exercise machine, includes querying a user for an age verification input (e.g., the stationary exercise machine may provide an age verification query). The query may be presented on a display of the stationary exercise machine and/or presented through a speaker on the stationary exercise machine. In response to the query, a user may provide an age verification input using an input device. In some embodiments, the input device may be any input device, such as a keyboard, a mouse, a touchscreen display, a button on a console, a microphone, a biometric sensor, any other sensor, and combinations thereof. After the user has responded to the query with the age verification input, the stationary exercise machine may determine whether use user is above the threshold age based on the age verification input. For example, the stationary exercise machine may compare the age verification input with a database of potential responses. If the age verification input corresponds with input associated with the threshold age or older, then the stationary exercise machine may determine that the user is above the threshold age.

If the user is above the threshold age, then the stationary exercise machine may be unlocked. For example, the stationary exercise machine may remove a physical block that is preventing a movable portion of the stationary exercise machine from moving. In some embodiments, unlocking the stationary exercise machine may include closing an electrical connection to a motor or a motorized component. If the user is not above the threshold age, then the stationary exercise machine may lock the stationary exercise machine. In some embodiments, the stationary exercise machine may maintain the lock on the stationary exercise machine. In some embodiments, the stationary exercise machine may add a lock or may lock another portion of the stationary exercise machine if the user is not above the threshold age.

In some embodiments, a method for controlling access to a stationary exercise machine includes querying a user for an age verification input (e.g., the stationary exercise machine may provide an age verification query). The query may be presented on a display of the stationary exercise machine and/or presented through a speaker on the stationary exercise machine. In response to the query, a user may provide an age verification input using an input device. In some embodiments, the input device may be any input device, such as a keyboard, a mouse, a touchscreen display, a button on a console, a microphone, a biometric sensor, any other sensor, and combinations thereof.

The stationary exercise machine may then analyze the verification input. In some embodiments, analyzing the verification input may include comparing the verification input to a database. In some embodiments, analyzing the verification input may include analyzing elements of the verification input for age-related characteristics (such as threshold weights and/or heights). Based on the analysis, the stationary exercise machine may then determine whether the user is above a threshold age. If the user is above the threshold age, then the stationary exercise machine may be unlocked.

If the user is not above the threshold age, then the stationary exercise machine may provide the user with another query for age verification input. The method may be repeated until the user is verified to be above the threshold age. In some embodiments, the age verification query may be the same at each query. In some embodiments, the age verification query may include different questions or queries. For example, the stationary exercise machine may include a list of age verification questions to ask, and may cycle through the age verification questions.

In accordance with embodiments of the present disclosure, a treadmill includes a tread deck. A tread belt is strung around the tread deck between a front end and a rear end. A console is supported above the tread deck using one or more posts. The console includes a display.

During use, the tread belt may rotate about the tread deck. A user standing on the tread belt may walk or run forward to avoid falling off the rear end. The tread belt may rotate about one or more pulleys. For example, a front pulley may be located at the front end and a rear pulley may be located at the rear end. During operation, to rotate the tread belt, a motor may rotate one or both of the front pulley at the front end or the rear pulley at the rear. The incline angle of the deck relative to the surface on which the treadmill is placed may be adjusted using an incline mechanism. Thus, the treadmill includes multiple movable portions, including the tread belt, the front pulley, the rear pulley, the motor, any linkages between the motor and the pulleys, the incline mechanism, any other movable portion of the treadmill, and combinations thereof.

While the treadmill is in a standby mode, the movable portions discussed above may be locked to prevent movement. In some embodiments, the lock may be a physical lock. For example, the lock may be a physical obstruction (e.g., a brake, a rod inserted into a hole or a detent) on the pulleys, the tread belt, the motor, the lift mechanism, any other movable portion, and combinations thereof. In some embodiments, the lock may be an electrical lock. For example, the motor may have an electrical circuit, and the circuit to power the motor may be closed when the treadmill verifies the user's age (e.g., when the age determiner determines that the user's age is above the threshold age). This may help prevent the treadmill from being operated by an underage child.

In some embodiments, a stationary bicycle includes a frame. A console having a display may be connected to the frame. The console may be located at or include the handlebars. A drivetrain may include one or more pedals that rotate a flywheel.

During use, a user may apply a torque to the pedals, which may cause the flywheel to rotate. The torque applied to the pedals may be varied by changing the resistance to rotation of the flywheel and/or by changing a gear ratio in the drivetrain between the pedals and the flywheel. Thus, the stationary bicycle includes movable portions, including the drivetrain, the pedals, the flywheel, any other movable portion, and combinations thereof.

When the stationary bicycle is in a standby mode, the movable portions discussed above may be locked. In some embodiments, the lock may be a physical lock. For example, a resistance mechanism for the flywheel may be applied to significantly reduce or prevent rotation of the flywheel. Put another way, the lock prevents rotation of the flywheel. In some embodiments, the lock may include an obstruction inserted into the flywheel, the pedals, or other portion of the drivetrain to prevent rotation of the movable portions. When the stationary bicycle verifies the user's age (e.g., when the age determiner determines that the user's age is above the threshold age), the lock may be removed such that the movable portions may be moved and the stationary bicycle used.

In some embodiments, an elliptical machine includes a frame. A drivetrain may include one or more pedals connected to a flywheel via one or more linkages. As the pedals are depressed, the pedals may slide back and forth on a track. One or more handles may be connected to the linkages and move in concert with the pedals.

During operation, the user may depress the pedals. This may cause the flywheel to rotate and the handles to move back and forth. The force required to depress the pedals may be varied by changing the resistance to rotation of the flywheel. Thus, the elliptical machine includes multiple movable portions, including the drivetrain, the pedals, the flywheel, the linkages, the handles, any other movable portion, and combinations thereof.

When the elliptical machine is in a standby mode, the movable portions discussed above may be locked. For example, a resistance mechanism for the flywheel may be applied to significantly reduce or prevent rotation of the flywheel. Any movement of the flywheel is reflected throughout the drivetrain. Preventing movement of the flywheel may help to prevent movement of the pedals, the linkages, the handles, any other movable portion, and combinations thereof. When the elliptical machine verifies the user's age (e.g., when the age determiner determines that the user's age is above the threshold age), the lock may be removed such that the movable portions may be moved and the elliptical machine may be used.

In some embodiments, a rower includes a frame with a console having a display connected to the frame. A flywheel is connected to the frame. A seat may slide back and forth on the frame. A handle may be connected to a cable, and the cable may be connected to the flywheel such that when the cable is extended, the flywheel may be rotated.

During operation, the user may sit on the seat and pull on the handle. This may cause the cable to extend away from the flywheel, thereby causing the flywheel to rotate. As the user extends the cable, the user may slide backwards on the seat. Thus, the rower includes multiple movable portions, including the flywheel, the seat, the handle, the cable, any other movable portion, and combinations thereof.

When the rower is in a standby mode, the movable portions discussed above may be locked. For example, the seat may be locked with a lock to prevent the seat from moving. In some examples, a resistance mechanism may be applied to reduce or prevent the flywheel from rotating, which may prevent the handle from extending the cable. In some embodiments, the handle and/or the cable may be secured to a portion of the frame. When the rower verifies the user's age (e.g., when the age determiner determines that the user's age is above the threshold age), the lock may be removed such that the movable portions may be moved and the rower may be used.

In some embodiments, a computer system includes a processor. The processor may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor may be referred to as a central processing unit (CPU). Although just a single processor is described herein, in an alternative configuration, a combination of processors (e.g., an ARM and DSP) could be used.

The computer system also includes memory in electronic communication with the processor. The memory may be any electronic component capable of storing electronic information. For example, the memory may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions and data may be stored in the memory. The instructions may be executable by the processor to implement some or all of the functionality disclosed herein. Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor.

A computer system may also include one or more communication interfaces for communicating with other electronic devices. The communication interface(s) may be based on wired communication technology, wireless communication technology, or both. Some examples of communication interfaces include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system may also include one or more input devices and one or more output devices. Some examples of input devices include a keyboard, mouse, microphone, remote control device, button, joystick, trackball, touchpad, and lightpen. Some examples of output devices include a speaker and a printer. One specific type of output device that is typically included in a computer system is a display device. Display devices used with embodiments disclosed herein may utilize any suitable image projection technology, such as liquid crystal display (LCD), light-emitting diode (LED), gas plasma, electroluminescence, or the like. A display controller may also be provided, for converting data stored in the memory into text, graphics, and/or moving images (as appropriate) shown on the display device.

The various components of the computer system may be coupled together by one or more buses, which may include a power bus, a control signal bus, a status signal bus, a data bus, etc.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

Following are sections in accordance with the present disclosure:

A1. A method for controlling access to a stationary exercise machine, comprising:
  querying a user for an age verification input;
  receiving the age verification input on an input device;
  based on the age verification input, determining whether the user is above a threshold age; and
  if the user is above the threshold age, unlocking the stationary exercise machine.
A2. The method of section A1, wherein unlocking the stationary exercise machine includes removing a lock from a movable portion of the stationary exercise machine.
A3. The method of section A2, wherein the movable portion is a flywheel, and wherein the lock prevents rotation of the flywheel.
A4. The method of any of sections A1-A3, wherein unlocking the stationary exercise machine includes closing an electrical connection to a motor of the stationary exercise machine.
A5. The method of any of sections A1-A4, wherein querying the user for the age verification input includes providing a knowledge-based question to the user.
A6. The method of any of sections A1-A5, wherein determining whether the user is above the threshold age includes comparing the received age verification input to a database.

A7. The method of any of sections A1-A6, wherein querying the user for the age verification input includes presenting a visual query on a display of a console of the stationary exercise machine.
A8. The method of any of sections A1-A7, wherein receiving the age verification input includes receiving the age verification input from an input device on a console of the stationary exercise machine.
A9. The method of any of sections A1-A8, wherein querying the user for the age verification input includes presenting an audible query through a speaker of the stationary exercise machine.
A10. The method of any of sections A1-A9, wherein receiving the age verification input includes receiving the age verification input through a microphone on the stationary exercise machine.
B1. A stationary exercise machine, comprising:
  a console including:
    a display; and
    an input device;
  a movable portion; and
  a processor and memory, the memory including instructions which, when executed by
    the processor, cause the processor to:
    provide an age verification prompt on the display;
    receive an age verification from the input device in response to the age verification prompt;
    determine if the age verification input is associated with a threshold age; and
    if the age verification input is associated with the threshold age, unlock the movable portion.
B2. The device of section B1, wherein the display and the input device are a touchscreen display.
B3. The device of section B1 or B2, wherein the age verification prompt is a logic-based quiz.
B4. The device of any of sections B1-B3, wherein the movable portion includes a tread belt.
B5. The device of any of sections B1-B4, wherein the movable portion includes a flywheel.
B6. The device of any of sections B1-B5, wherein the input device is a microphone.
B7. The device of any of sections B1-B6, wherein the age verification input is a biometric identifier.
B8. The device of any of sections B1-B7, wherein the instructions further cause the processor to, before providing the age verification prompt, detect a presence of a user.
B9. The device of any of sections B1-B8, wherein the presence of the user is detected using a weight sensor.
C1. An access control system for a stationary exercise machine, comprising:
  a display;
  an input device; and
  a lockout manager, the lockout manager being configured to prevent movement of a movable portion of the stationary exercise machine, wherein the movable portion is unlocked based on an age verification input received from the input device.

The invention claimed is:
1. A method for controlling access to a stationary exercise machine, the method comprising:
  establishing, by a remote server, a plurality of authorized users of the stationary exercise machine, the stationary exercise machine having a motor, wherein establishing the plurality of authorized users comprises storing a profile that is associated with the plurality of authorized users at the remote server;

automatically locking, by the remote server, the stationary exercise machine;

determining, using a first sensor, that a user is within a proximity of the stationary exercise machine, wherein determining that the user is within the proximity of the stationary exercise machine comprises:

automatically sending an electronic proximity confirmation request to one or more electronic addresses of the user; and automatically determining that the user is within the proximity of the stationary exercise machine based at least in part on a positive electronic proximity confirmation response received from any of the one or more electronic addresses;

receiving a request to perform a workout on the stationary exercise machine;

in response to receiving the request to perform the workout on the stationary exercise machine, determining, by the remote server, whether the user within the proximity of the stationary exercise machine is an authorized user of the plurality of authorized users, wherein determining whether the user is the authorized user comprises:

querying the user for an age verification input signal via an audio query output by a speaker of the stationary exercise machine, the audio query requesting information associated with an age-related characteristic of the user;

receiving the age verification input signal, wherein receiving the age verification input signal comprises detecting, with a microphone of the stationary exercise machine, the age-related characteristic of the user; and determining that the age-related characteristic is associated with an age above a threshold age and that voice recognition data gathered using the microphone matches to one of the plurality of authorized users;

in response to determining that the user is within the proximity of the stationary exercise machine, that the voice recognition data gathered using the microphone matches to one of the plurality of authorized users, and that the age-related characteristic is associated with the age above the threshold age, automatically closing, by the remote server, an electrical circuit to power the motor of the stationary exercise machine to enable the workout to be performed on the stationary exercise machine; and periodically and automatically opening, by the remote server, the electrical circuit to disable workouts from being performed on the stationary exercise machine.

2. The method of claim 1, wherein determining that the user is within the proximity of the stationary exercise machine comprises:

automatically determining whether any of one or more wireless mobile devices of the user is paired with the stationary exercise machine over a wireless personal area network (WPAN); and determining that the user is within the proximity of the stationary exercise machine if it is determined that any of the one or more wireless mobile devices of the plurality of authorized users is paired with the stationary exercise machine over the WPAN.

3. The method of claim 2, wherein automatically determining whether any of the one or more wireless mobile devices of the user is paired with the stationary exercise machine over the WPAN comprises:

automatically determining whether any of the one or more wireless mobile devices of the user that is paired with the stationary exercise machine is also in an unlocked state.

4. The method of claim 3, wherein the one or more wireless mobile devices of the user include one or more smartphones of the user.

5. The method of claim 2, wherein the one or more wireless mobile devices of the user include one or more wireless mobile heart rate monitors of the plurality of authorized users.

6. The method of claim 1, wherein:

detecting the age-related characteristic of the user comprises automatically gathering, at the stationary exercise machine, biometric data of the user; and determining whether the user is the authorized user comprises automatically determining, at the stationary exercise machine, that the biometric data matches the user.

7. The method of claim 6, wherein automatically gathering the biometric data of the user comprises:

automatically gathering the voice recognition data of the user using the microphone that is proximate to the stationary exercise machine and that is in communication with the stationary exercise machine.

8. The method of claim 6, wherein automatically gathering the biometric data of the user comprises:

automatically gathering facial recognition data or iris recognition data of the user using a camera that is proximate to the stationary exercise machine and that is in communication with the stationary exercise machine.

9. The method of claim 6, wherein automatically gathering the biometric data of the user comprises:

automatically gathering fingerprint data of the user that is within the proximity of the stationary exercise machine using a fingerprint scanner that is proximate to the stationary exercise machine and that is in communication with the stationary exercise machine.

10. The method of claim 6, wherein automatically gathering the biometric data of the user comprises:

automatically gathering handprint data of the user using a handprint scanner that is proximate to the stationary exercise machine and that is in communication with the stationary exercise machine.

11. The method of claim 6, wherein automatically gathering the biometric data of the user includes comprises:

automatically gathering weight data of the user using a scale that is proximate to the stationary exercise machine and that is in communication with the stationary exercise machine.

12. The method of claim 6, wherein automatically gathering the biometric data of the user comprises:

automatically gathering height data of the user using a camera that is proximate to the stationary exercise machine and that is in communication with the stationary exercise machine.

13. The method of claim 1, wherein:

the one or more electronic addresses of the plurality of authorized users includes one or more cellular telephone numbers of the user;

the electronic proximity confirmation request is included in a text message sent to the one or more cellular telephone numbers; and the positive electronic proximity confirmation response is included in a reply text message received from one of the one or more cellular telephone numbers.

14. The method of claim 1, wherein:

the one or more electronic addresses of the user includes one or more email addresses of the user;

the electronic proximity confirmation request is included in an email sent to the one or more email addresses; and the positive electronic proximity confirmation response is included in a reply email received from one of the one or more email addresses.

15. The method of claim 1, wherein determining that the user is within the proximity of the stationary exercise machine comprises:

automatically sending a confirmation hyperlink to the user; and determining that the user is within the proximity of the stationary exercise machine if the confirmation hyperlink is selected.

16. The method of claim 1, wherein determining that the user is within the proximity of the stationary exercise machine comprises:

automatically sending the electronic proximity confirmation request to one or more apps of the user; and determining that the user is within the proximity of the stationary exercise machine if the positive electronic proximity confirmation response is received from any of the one or more apps.

17. The method of claim 1, wherein determining that the user is within the proximity of the stationary exercise machine comprises:

automatically sending a one-time-passcode to the user; and determining that the user is within the proximity of the stationary exercise machine if the one-time-passcode is manually entered at the stationary exercise machine.

18. The method of claim 1, wherein determining that the user is within the proximity of the stationary exercise machine comprises:

automatically presenting, at the stationary exercise machine, an identity confirming challenge question; and automatically determining that the user is within the proximity of the stationary exercise machine if a correct response to the identity confirming challenge question, corresponding to any of the plurality of authorized users, is received.

19. The method of claim 1, wherein the user includes one of the plurality of authorized users, and wherein determining that the user is within the proximity of the stationary exercise machine comprises:

automatically determining that the user is within the proximity of the stationary exercise machine if a login credential corresponding to any of the plurality of authorized users is entered at the stationary exercise machine.

20. A method for controlling access to a stationary exercise machine, comprising:

establishing, by a remote server, a plurality of authorized users of the stationary exercise machine, the stationary exercise machine having a motor, wherein establishing the plurality of authorized users comprises storing a profile that is associated with the plurality of authorized users at the remote server;

detecting, with a first sensor, whether a user is within a proximity of the stationary exercise machine, wherein detecting the user is within the proximity of the stationary exercise machine comprises:

automatically sending an electronic proximity confirmation request to one or more electronic addresses of the user; and automatically determining that the user is within the proximity of the stationary exercise machine based at least in part on a positive electronic proximity confirmation response received from any of the one or more electronic addresses;

determining, by the remote server, whether the user within the proximity of the stationary exercise machine is an authorized user of the plurality of authorized users, wherein determining whether the user is the authorized user comprises:

querying the user for an age verification input signal via an audio query output by a speaker of the stationary exercise machine, the audio query requesting information associated with an age-related characteristic of the user;

receiving the age verification input signal via a microphone of the stationary exercise machine;

detecting, with the microphone, the age-related characteristic of the user;

determining that the age-related characteristic is associated with an age above a threshold age and that voice recognition data gathered using the microphone matches to one of the plurality of authorized users; and based on whether the user is within the proximity of the stationary exercise machine, the age verification input signal, that the voice recognition data gathered using the microphone matches to one of the plurality of authorized users, and that the age-related characteristic is associated with the age above the threshold age, determining whether the user is above the threshold age;

if the user is above the threshold age, closing, by the remote server, an electrical circuit to power the motor of the stationary exercise machine; and periodically and automatically opening, by the remote server, the electrical circuit to disable workouts from being performed on the stationary exercise machine.

21. The method of claim 20, wherein querying the user for the age verification input signal comprises:

providing a knowledge-based question to the user.

22. The method of claim 20, wherein determining whether the user is above the threshold age comprises:

comparing the received age verification input signal to a database.

23. The method of claim 20, wherein querying the user for the age verification input signal comprises:

presenting a visual query on a display of a console of the stationary exercise machine.

24. The method of claim 20, wherein receiving the age verification input signal comprises:

receiving the age verification input signal from the microphone on a console of the stationary exercise machine.

25. A stationary exercise machine, comprising:

a speaker;

a microphone;

a motor; and a processor and memory, the memory including instructions which, when executed by the processor, cause the processor to:

establish, by a remote server, a plurality of authorized users of the stationary exercise machine, wherein establishing the plurality of authorized users comprises storing a profile that is associated with the plurality of authorized users at the remote server;

detect whether a user is within a proximity of the stationary exercise machine using a first sensor, wherein, to detect whether the user is within the proximity of the stationary exercise machine, the instructions cause the processor to:

automatically send an electronic proximity confirmation request to one or more electronic addresses of the user; and automatically determine that the user is within the proximity of the stationary exercise machine based at least in part on a positive electronic proximity confirmation response received from any of the one or more electronic addresses;

determine by the remote server, whether the user within the proximity of the stationary exercise machine is an authorized user of the plurality of authorized users, wherein, to determine whether the user is the authorized user, the instructions cause the processor to:

query the user for an age verification input signal with an age verification prompt via an audio query output by the speaker of the stationary exercise machine, wherein the audio query requests information associated with an age-related characteristic of the user;

receive the age verification input signal via the microphone in response to the age verification prompt;

determine if the age verification input signal is associated with a threshold age and if voice recognition data gathered using the microphone matches to one of the plurality of authorized users;

detect the age-related characteristic of the user; and determine that the age-related characteristic is associated with an age above the threshold age;

if the age verification input signal is associated with the threshold age, if the voice recognition data gathered using the microphone matches to one of the plurality of authorized users, and if the age-related characteristic is associated with the age above the threshold age, close, by the remote server, an electrical circuit to power the motor of the stationary exercise machine; and periodically and automatically open, by the remote server, the electrical circuit to disable workouts from being performed on the stationary exercise machine.

26. The stationary exercise machine of claim 25, wherein the stationary exercise machine further comprises a console including a touchscreen display.

27. The stationary exercise machine of claim 25, wherein the age verification prompt is a logic-based quiz.

28. The stationary exercise machine of claim 25, wherein the stationary exercise machine includes a tread belt.

29. The stationary exercise machine of claim 25, wherein the stationary exercise machine includes a flywheel.

30. The stationary exercise machine of claim 25, wherein the age verification input signal is a biometric identifier.

31. The stationary exercise machine of claim 25, wherein the instructions further cause the processor to:

before providing the age verification prompt, detect a presence of the user.

32. The stationary exercise machine of claim 31, wherein the presence of the user is detected using a weight sensor.

33. The method of claim 1, wherein the age-related characteristic includes weight, height, or both.

\* \* \* \* \*